US012226925B2

(12) United States Patent
Baratta

(10) Patent No.: US 12,226,925 B2
(45) Date of Patent: Feb. 18, 2025

(54) SPACERS FOR CUTTING AND GRINDING BLADES, BLADE AND SPACER ASSEMBLIES, AND GANG BLADE ASSEMBLIES AND METHODS RELATING TO SAME

(71) Applicant: Baron Investments LLC, Oxnard, CA (US)

(72) Inventor: Anthony Baratta, Oak Park, CA (US)

(73) Assignee: BARON INVESTMENTS, LLC, Oxnard, CA (US)

(*) Notice: Subject to any disclaimer, the term of this patent is extended or adjusted under 35 U.S.C. 154(b) by 268 days.

(21) Appl. No.: 17/168,088

(22) Filed: Feb. 4, 2021

(65) Prior Publication Data

US 2021/0237294 A1 Aug. 5, 2021

Related U.S. Application Data

(60) Provisional application No. 62/969,826, filed on Feb. 4, 2020.

(51) Int. Cl.
*B28D 1/04* (2006.01)
*B26D 1/00* (2006.01)
*B26D 3/06* (2006.01)
*B28D 1/12* (2006.01)

(52) U.S. Cl.
CPC ............. *B26D 1/0006* (2013.01); *B26D 3/06* (2013.01); *B28D 1/048* (2013.01); *B28D 1/121* (2013.01); *B26D 2001/0033* (2013.01)

(58) Field of Classification Search
CPC ................................ B28D 1/048; B28D 1/121
USPC ....... 299/39.3; 404/93, 94; 144/237; 125/15; 451/353, 359
See application file for complete search history.

(56) References Cited

U.S. PATENT DOCUMENTS

| | | | | |
|---|---|---|---|---|
| 2,592,382 | A * | 4/1952 | Blais | B27G 13/007 144/237 |
| 3,221,728 | A * | 12/1965 | Lindblad | B28D 1/122 451/541 |
| 3,585,761 | A | 6/1971 | Hughes et al. | |
| 3,608,969 | A | 9/1971 | Fowkes | |
| 3,612,611 | A | 10/1971 | Ellis | |
| 3,700,849 | A | 10/1972 | Zuzelo | |
| 3,779,607 | A | 12/1973 | Staab | |
| 3,802,742 | A | 4/1974 | Zuzelo | |
| 3,986,543 | A * | 10/1976 | Slayton | B27G 13/12 144/237 |
| 4,188,934 | A | 2/1980 | Reinhardt et al. | |
| 4,236,356 | A | 12/1980 | Ward | |
| 4,714,294 | A | 12/1987 | Swan | |
| 4,827,559 | A | 5/1989 | Norland | |
| 5,020,280 | A | 6/1991 | O'Reilly | |
| 5,197,453 | A | 3/1993 | Messina | |
| 5,709,200 | A | 1/1998 | Mertes | |
| 6,099,080 | A | 8/2000 | Hirashita et al. | |
| 6,390,086 | B1 | 5/2002 | Collins et al. | |

(Continued)

*Primary Examiner* — Sunil Singh
(74) *Attorney, Agent, or Firm* — Henricks Slavin LLP

(57) ABSTRACT

A spacer, blade core, assembly and methods for blade and blade core assemblies, including gang blade heads, include openings in blade cores for receiving spacers. A spacer and its opening can be the same shape or different shapes, and spacers can be interconnected or disconnected from each other. A spacer can be in contact or engaged with two blades, three blades, or more.

21 Claims, 28 Drawing Sheets

(56) References Cited

U.S. PATENT DOCUMENTS

| | | | |
|---|---|---|---|
| 6,769,423 B1 | 8/2004 | Zhang | |
| 6,877,502 B2 | 4/2005 | Register | |
| 8,056,549 B1 | 11/2011 | Fleetwood | |
| 9,039,495 B2 | 5/2015 | Baratta | |
| 9,506,207 B2 | 11/2016 | Nishida | |
| 10,323,366 B2 | 6/2019 | Redich | |
| 2002/0190569 A1 | 12/2002 | Wyser | |
| 2008/0251061 A1 | 10/2008 | Baratta | |
| 2011/0018333 A1 | 1/2011 | Hall et al. | |
| 2019/0161923 A1 | 5/2019 | Mahaffey et al. | |

* cited by examiner

FIG. 79
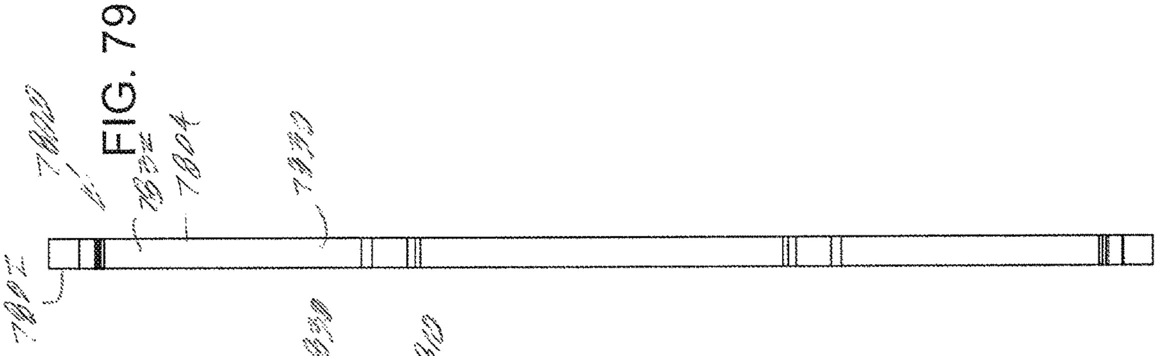
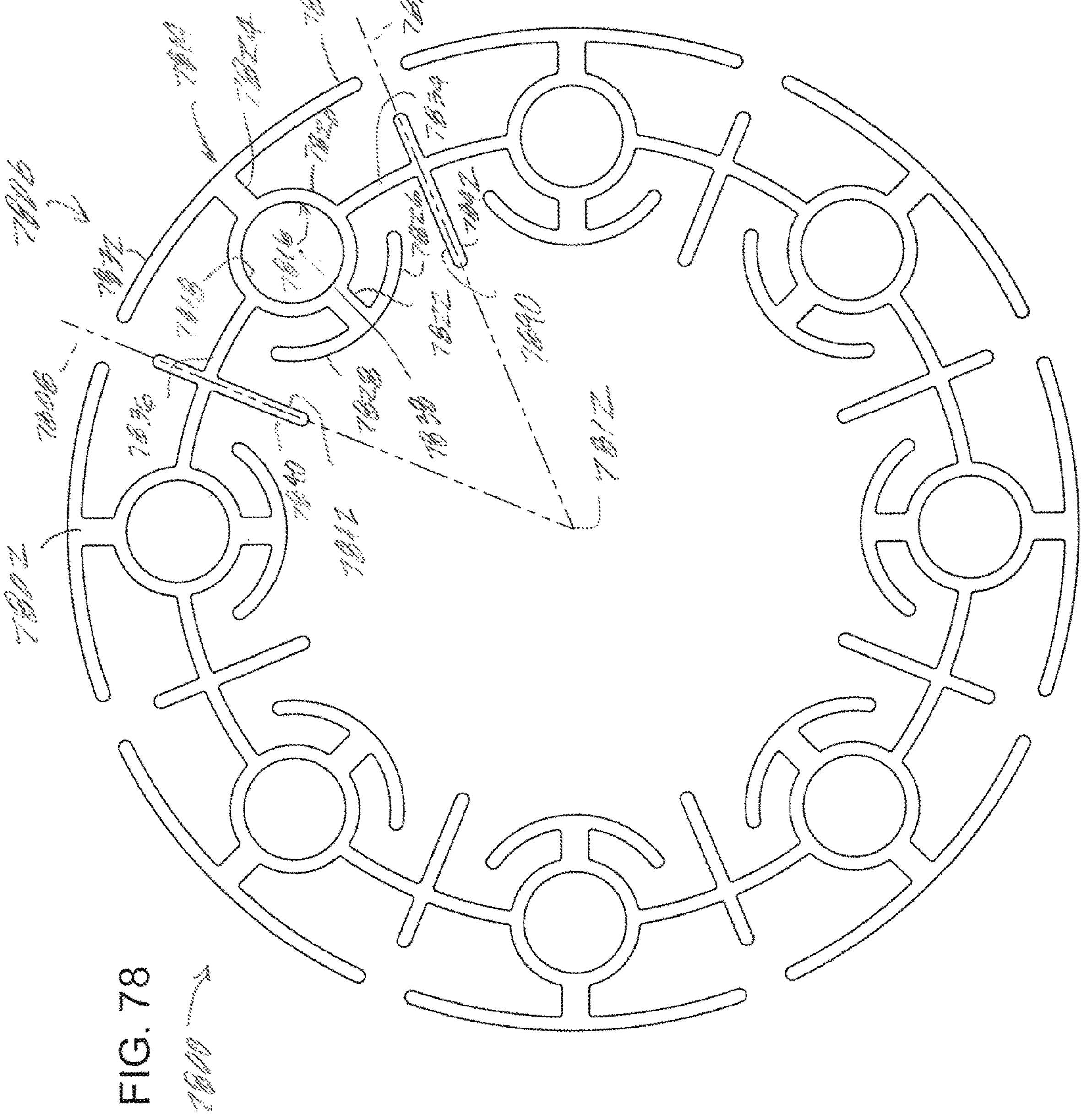
FIG. 78

SPACERS FOR CUTTING AND GRINDING BLADES, BLADE AND SPACER ASSEMBLIES, AND GANG BLADE ASSEMBLIES AND METHODS RELATING TO SAME

CROSS REFERENCE TO RELATED APPLICATIONS

This application claims the benefit of Provisional Application 62/969,826 filed Feb. 4, 2020, the entire content of which is incorporated herein by reference.

BACKGROUND

Field

These inventions relate to blade and blade core spacers, blade cores and blades, assemblies and methods for blades and blade core assemblies, including for gang blade heads, including blade cores having openings for spacers, and also including discrete spaces for blades and blade cores, for example where multiple discrete spacers separate two or more adjacent blades are blade cores.

Related Art

Blade assemblies often have narrow spacing between adjacent blades, making adequate cooling difficult. Air cooling may not be sufficient, and sometimes liquid cooling is required. Additionally, cooling limitations or other thermal management issues may limit blade speeds or efficiency. Blade assemblies with such thermal issues include wood, board and paper cutting blade assemblies, slitting assemblies, and pavement grooving and grinding assemblies. In pavement grooving and grinding assemblies, for example, cooling modalities are limited by the use of solid spacer discs positioned between adjacent blades and supported by the blade shaft or arbor supporting blades. The assembly is cooled by fluid flow.

SUMMARY

Spacers, blade cores, blade core assemblies, cutting assemblies and methods are described that can be used to improve the thermal characteristics of blade cores, blades and cutting assemblies. One or more of them can also decrease the weight of subassemblies and assemblies, and also can allow increasing operating speeds as well as possibly throughput, travel or similar project speeds or rates, as well as possibly eliminating the need for liquid cooling.

A spacer for a rotary working blade core can be configured to engage a portion of the blade core. In one example, the spacer can engage a blade core surface between oppositely-facing surfaces of the blade core. In another example, the spacer can engage or contact one or both of the oppositely facing surfaces of the blade core. The spacer can be reliably positioned relative to the blade core or secured to the blade core by any number of means, including fastening, adhesive, interference fit, and inter-engagement with the blade core or other components supported relative to the blade core.

In one example of a spacer for a rotary working blade core configured to engage a portion of the blade core, the spacer can include a first body portion that extends in a first direction, for example axially. The distance in the first direction or the thickness of the first body portion can be used to define a spacing between adjacent blade cores, for example a maximum spacing between adjacent blade cores. The first body portion can be mounted on or supported by a first blade core, and the axial distance or thickness of the first body portion can be used as a spacer between the first blade core and an adjacent blade core to maintain a spacing between the two blade cores as determined by the first body portion. The first body portion includes a surface configured to face an adjacent blade core, and part or all of the surface can be used to contact an adjacent blade core for providing the spacing function. A second body portion extends away from, for example perpendicular to or in a direction opposite the first direction, the first body portion. The second body portion engages or interacts with a blade core structure for limiting movement of the spacer, including the first body portion, in a direction in a plane of the blade core. The second body portion can engage or interact with a blade core structure in the form of an opening through the blade core structure. The second body portion can extend to one side of the first body portion, or to both sides of the first body portion. Where the second body portion extends to both sides of the first body portion, the second body portion can extend continuously from one side of the first body portion to an opposite side of the first body portion, or the second body portion can be separated into first and second elements spaced apart from each other by the first body portion. The second body portion is configured to contact a portion of the blade core between oppositely-facing surfaces of the blade core.

In one example, the first body portion includes a face in contact with an adjacent one of the oppositely-facing surfaces of the blade core. In another example, the spacer includes a third body portion on a side of the second body portion opposite the first body portion. The third body portion can include a surface in contact with the other of the oppositely-facing surfaces of the blade core. In one example, the second body portion includes a cross-sectional geometry similar to a geometry of the first body portion, and in another example, the second body portion includes a cross-sectional geometry different from a geometry of the first body portion. For example, the first and second body portions can have a deltoid shape, and in another example, the first body portion can have a deltoid shape, and the second body portion can have a round or other geometric shape different from a deltoid shape. In a further example, the second body portion can be formed as hollow.

In a further example of a spacer for a rotary working blade core configured to engage a portion of the blade core, the spacer can include first and third body portions extending away from each other and away from a second body portion, and can serve as spacer structures. The second body portion is configured to engage an opening in the blade core, for example so that the blade core can support the spacer in a plane parallel to the blade core. In one example, the first and third body portions are mirror images of each other relative to a plane through the second body portion.

In another example of a spacer for a rotary working blade core configured to engage a portion of the blade core, the spacer can include a first body portion having a first surface configured to face a first blade core, and a second surface configured to face a second blade core when adjacent the first blade core, and at least one engagement surface between the first and second surfaces for contacting a wall of an opening in the second blade core. In one example, the first surface can have a surface area approximately the same as a surface area of the second surface, and in another example, the first surface can have a surface area larger than the surface area of the second surface. In one such example, for instance, the spacer fits into an opening in the first blade core that is approximately the same size as an opening in the second blade core, while in another such example, for instance, the spacer fits into an opening in the first blade core that is larger than the size of an opening in the second blade core. In one example of the at least one engagement surface, the at least one engagement surface can be a shoulder between the first and second surfaces, and in one instance facing in a direction different than the first and second surfaces. In another example of the at least one engagement surface, the at least one engagement surface can be a wall formed between the first and second surfaces, and approximately perpendicular to at least one of the first and second surfaces. In a further example of a spacer having at least one engagement surface between first and second surfaces, such spacer can include a third body portion on a side of a second body portion opposite the first body portion, and the third body portion can include a respective engagement surface, for example for engaging a surface in a third blade core when such third blade core is placed adjacent the first blade core. In one example, the first and third body portions are mirror images of each other relative to a plane through the second body portion.

In another example of a spacer for a rotary working blade core, configured to engage a portion of a blade core, the spacer can include an engagement surface for engaging a portion of a radially, arcuately or outwardly extending additional component. The additional component can be a spacer extending adjacent a surface of the blade core, for example radially outwardly or inwardly, tangentially, arcuately, or otherwise. Such additional component can extend between adjacent spacers and/or around a perimeter of the blade core.

In another example of a spacer for a rotary working blade core configured to engage a portion of the blade core through an opening in the blade core, the spacer includes first and third body portions positioned on opposite sides of a second body portion wherein the second body portion is configured to engage the opening in the blade core. The spacer can be monolithic or formed from multiple pieces. At least portions and in many examples all of the first and second, and in the configurations discussed herein all of the, body portions are formed from a material that can withstand high compressive loads, such as steel, aluminum and UHMW plastics, or similar materials. The spacer second body portion in cross section can be circular, polygonal, or a combination of circular or a curved surface or surfaces with polygon surfaces. The second body portion can be configured to match an opening in a blade core 100% or less than 100%, with an interference fit or with a clearance fit. The geometry of the second body portion can also be different than the geometry of the opening in a blade core. The first and third body portions can be configured to have surface areas facing outward from the second body portion similar or comparable to the cross-sectional area of the second body portion, or they can be significantly larger. In some configurations, the lengths of the perimeters of the first and third body portions are greater than the length of the perimeter of the second body portion, but one or the other or both need not be, for example where a spacer is held in place other than by inter-engagement. Similarly, the shortest perimeter lengths of the first and third body portions in some configurations are greater than the shortest perimeter length of the second body portion, but one or the other or both can be otherwise. (The shortest perimeter length of a five-pointed star, or virtual perimeter traced between the points, is less than the actual or linear perimeter length of the star traced along the edges.) The first and third body portions can have geometries the same as the cross-sectional geometry of the second body portion, or they can be different.

In a further example of a spacer for a rotary working blade core (including any of those described herein), the spacer can be formed from a single material, for example steel, aluminum, thermoplastic, thermosetting resin, engineered plastic, or a combination of materials. The spacer can be formed from different materials, for example materials having different durometers or hardnesses, or other characteristics. In the configurations described herein, the spacers are formed from a material suitable for withstanding high compressive loads, including for example steel and/or aluminum and/or ultrahigh molecular weight plastics (UHMW plastics).

In another example of a spacer for adjacent working blades, for example blades that are configured to be supported by a main shaft at the centers of the blades, the spacer may include one or more ring segments for extending partially around a rod or pin used in the assembly of blades. In one example, the ring segment forms a completely circular ring, and in another example, the ring segment is a partial circle. The spacer may include one or more branches extending from the ring segment, for example inward, outward or laterally from the ring segment relative to a center defined by the center of the main shaft. In one configuration, the ring segment and at least one of the branches falls within an envelope defined by pressure plates applying pressure to the stack of blades and spacers from the ends of the main shaft. The branches may include arms extending away from the branches, and the arms and/or branches may be straight, curved or other geometries. A spacer between two adjacent blade cores may be formed from a plurality of ring segments, for example assembled together from individual ring segment structures, such as substructures, for example forming a monolithic structure or contacting structures or spaced apart structures. A spacer between two adjacent blade cores can be formed to extend in a complete circle around a center formed by the center of the blade shaft, and adjacent ring segments can be fixed to each other by an arcuately extending arm or web element. A spacer can have a plurality of ring segments, for example four ring segments or eight ring segments for use on a blade assembly having 4 rods or 8 rods.

A blade core for a working blade can be configured to accommodate any one or more of the spacers described above or described herein. A plurality of blade cores can be assembled with a plurality of spacers to form a blade assembly, blade head or blade gang assembly with configurations as described herein or variations or combinations of such. In any final blade configuration or blade assembly for working one or more workpieces, one or more or all of the blades will have working components for working a workpiece, for example cutting segments, cutting elements, or the like. It will be understood that any of the blade cores as described herein will be finished or completed as necessary to form a final working blade, assembly or assembly of working blades for the desired purpose, even though blades are not illustrated herein as having such working surfaces. In wood, masonry, concrete and pavement working blades, blade cores will be fitted with carbide tips, or diamond or other cutting materials or matrices. Other working blades may be fitted with other working materials.

In all examples of a blade core assembly described herein, the blade core is configured to be fitted with a working component or material for working a workpiece, and the blade core assembly includes a spacer formed from a material other than the working component or material. For example, where the working material is a diamond matrix or carbide tips, the spacer is formed from steel or formed from aluminum, UHMW plastic or combination of materials other than diamond matrix or carbide.

In an example of a blade core, the blade core includes an opening for receiving a spacer in the opening, for example any of the spacers described herein. The opening can be positioned in an interior of the blade core, between an arbor or blade shaft opening at the center of the blade core and a perimeter of the blade core, at a perimeter of the blade core, or extending outward from the blade shaft opening of the blade core. In one example, the blade core has a central opening with a diameter of at least 3 inches, for example one that can be used as part of a grinding or grooving head. The blade core can include a plurality of cavities or openings, such as cavities formed around the central opening or around the perimeter of the blade core, or cavities or openings in the interior of the blade core between the central opening and the perimeter. In one example, the cavities in the blade core are noncircular, in another example they are circular, and in a further example some cavities are circular and some cavities are noncircular.

In a further example of a blade core, the blade core includes an opening for receiving a spacer in the opening, wherein the blade core includes a central opening having a diameter of at least 3 inches and the blade core extends from the central opening to a perimeter. The blade core includes a plurality of noncircular openings, at least one of which is configured to receive a spacer. If so configured, the central opening can also include one or more cavities configured to receive a positioning element of a driveshaft. In one example of a blade core with noncircular openings, the plurality of noncircular openings each extend outward from the central opening, and in another example the plurality of noncircular openings each extend inward from a perimeter, and in a further example extend from the central opening and the perimeter. In still another example, the plurality of noncircular openings are formed in the blade core at positions between the central opening and the perimeter, both between the central opening and the perimeter and outward from the central opening, both between the central opening and the perimeter and inward from the perimeter, and at all three regions namely between the central opening and the perimeter, outward from the central opening and inward from the perimeter.

In another example of the blade core, the blade core includes an opening for receiving a spacer in the opening, wherein the blade core includes a central opening having a diameter of at least 3 inches and the blade core extends from the central opening to a perimeter. The blade core includes a plurality of noncircular openings, at least one of which and preferably a plurality of which have a deltoid shape. The deltoid shape can have one straight side, two straight sides or all straight sides, and can have one angled corner, two angled corners or all angled corners between sides, or can have one or more curved corners. In another example, the blade core having a plurality of noncircular openings can have a first plurality of noncircular openings of a first size and a second plurality of noncircular openings of a second size different from the first size. There can be the same number of openings in the first plurality as in the second plurality. In one example, the first plurality of noncircular openings can be deltoid openings of a first surface area, and the second plurality of noncircular openings can be deltoid openings of a second surface area. In a further example, a first plurality of noncircular openings can be deltoid openings, and a second plurality of noncircular openings can be a different geometry, for example U shape, V shape, or other geometries.

In an additional example of a blade core, the blade core includes an opening for receiving a spacer in the opening and a central opening for supporting the blade core on an arbor or shaft wherein the central opening has a diameter of at least 3 inches, and wherein the core includes at least five cavities extending outward from the central opening, four of which are configured for engaging a registration component or structure on an arbor or shaft, and the fifth or more of which are configured for receiving a respective spacer. In one configuration, the fifth opening has a size and/or shape different from the first through fourth cavities, and in one configuration, the first through fourth cavities are semicircular cavities and the fifth and/or additional cavities are U-shaped cavities.

In a further example of a blade core, the core includes an opening for receiving a spacer in the opening and a central opening for supporting the blade core on an arbor or shaft wherein the central opening has a diameter of at least 3 inches, and a plurality of openings positioned in the core between the central opening and the perimeter. In one configuration, the blade core also includes a plurality of cavities extending outward from the central opening, and the plurality of openings positioned in the core between the central opening and the perimeter are either all circular, all non-circular or combination of both.

In another example of a blade core, the blade core includes a plurality of openings for receiving respective spacers in the openings and a central opening for supporting the blade core on an arbor or shaft and a spacer in respective ones of a plurality of the openings. In one configuration, some or all of the openings are circular, and in another configuration some or all of the openings are noncircular. In one configuration of a spacer for the blade core, at least one of the spacers has a groove extending in a body of the spacer, engaging a complementary wall in the respective blade core opening. In one example of a spacer with the groove, the groove can have entrance walls converging toward the groove. In another configuration of a spacer for the blade core, the spacer engages the respective opening in the blade core with an interference fit, and in another configuration the spacer engages the respective opening with a clearance fit until a portion of the blade opening contacts a stopping surface in the spacer. In a further configuration of a spacer for the blade core, the respective opening in the blade core is circular and the spacer includes a circular portion that engages the circular opening in the blade core, for example in a clearance fit or in an interference fit.

In an additional example of the blade core, the blade core includes a plurality of openings for receiving respective spacers in the openings and a central opening for supporting the blade core on an arbor or shaft and a spacer and respective ones of a plurality of the openings wherein the spacer includes at least one surface for engaging a surface on a second blade core when the second blade core is adjacent the first blade core. In one configuration, the at least one engaging surface fit into an opening in the second blade core, and in another configuration, the at least one engaging surface is a shoulder, at least part of which engages a wall formed in the second blade core. In a further configuration, the opening in the first blade core and the spacer in the opening have respective deltoid shapes, and the spacer includes an engaging surface having a deltoid shape for engaging a deltoid-shaped opening in an adjacent blade core. In one example, the spacer can engage the adjacent blade core with a close contact fit or with a loose fit.

In a further example of a blade core, the blade core includes a plurality of openings with respective spacers in the openings. In one configuration, a plurality of the openings receiving spacers are circular in shape, oval in shape, deltoid, U, V in shape, or other desired geometries. In one configuration where openings are circular, respective spacers can have circular body portions fitting in the openings and body portions outside the openings that are circular, or noncircular, including deltoid, or other polygonal geometry, or a more complex geometry, including for instance curved and straight surfaces. Examples of geometries of body portions outside the openings in the blade core include circular body portions, and non-circular body portions, including deltoid, U-shaped, V-shaped, and other geometries. The body portions outside the openings in the blade core can have beveled surfaces, square surfaces, rounded surfaces and other surface geometries. The body portions outside the openings can also have one or more external cavities, any one or more of which can be used to retain one or more additional elements, for example components extending away from the spacer and along one or more surface locations on the blade core. One or more of the spacers can be monolithic, or can be multiple pieces secured together for maintaining their position in the respective opening in the blade core.

In a further example of a blade core for a rotary working tool, the blade core includes a plurality of openings containing a respective spacer wherein one or more of the spacers include respective surfaces adjacent the blade core configured to direct fluid flow across the blade core when the blade core rotates. In one configuration, one or more of the spacers include respective flow elements extending at least one of the directions from the spacer toward a center of the blade core or from the spacer away from a center of the blade core. In one example, the flow elements are positioned so that the outermost surface on a flow element trails a surface on an innermost surface on the same flow element.

In any of the blade core and spacer configurations described herein, any or all of the spacers can be configured to extend outward or laterally from at least one side of the blade a distance greater than or equal to the distance a working element extends outward or laterally from the same blade surface. For example, the spacer can be configured so that working portions on adjacent blades are not contacting each other, or they are in contact without causing the blade core to be nonplanar.

It is understood that any of the spacers described herein can be used with any of the blade core configurations or blade head configurations described herein, and vice versa, without or without modifications in geometry. Any of the blade cores as described herein can be a solid monolithic blade core, non-laminated core or a laminated blade core.

During assembly of a spacer onto a blade core, the spacer can be positioned in or adjacent an opening in the blade core and secured in place, for example by fastening, adhesive, interference fit, inter-engagement with another component, or the like. Multiple spacers can be positioned in or adjacent respective openings in the blade core. In one configuration, spacers can be positioned so as to encourage airflow over the blade core during rotation of the blade core. In another configuration, spacers can be multiple component assemblies fit together in or adjacent a respective opening in the blade core by interference fit, inter-engagement, fastening, adhesive or the like.

During assembly of a plurality of blade cores having respective spacers, a first blade core can be placed on an arbor or blade shaft and rods, if present, with respective spacers already placed in respective openings in the blade core. Alternatively, one or more of the spacers for the blade core can be positioned after the blade core is placed on the arbor or shaft. A second blade core can be placed on the arbor or shaft, with respective rods if present, with respective spacers already placed on the second blade core, or spacing can be applied or determined based on the spacers on the first blade core, and if a third blade core is to be added, for example by respective spacers placed on the third blade core so that the second blade core is positioned based on spacers on the first blade core and the third blade core. In another configuration, each blade core will be positioned at least in part by one or more spacers placed on that same blade core. After positioning the second blade core, either with or without its own spacers, the assembly can be complete and secured with any additional components desired, for example clamp plates, securement rods, flanges, or other securement components. Alternatively, a third blade core can be added with or without respective spacers according to the desired configuration of the assembly, and likewise with additional blade cores as desired. A multiple-blade assembly can have as few as two blades, three blades, or more than three blades, and some blade heads have more than 30 or 40 blades.

These and other examples are set forth more fully below in conjunction with drawings, a brief description of which follows.

BRIEF DESCRIPTION OF THE DRAWINGS

FIG. 78 is a plan view of another example of a spacer.

FIG. 79 is a side elevation view of the spacer of FIG. 78.

DETAILED DESCRIPTION

Figure 1:
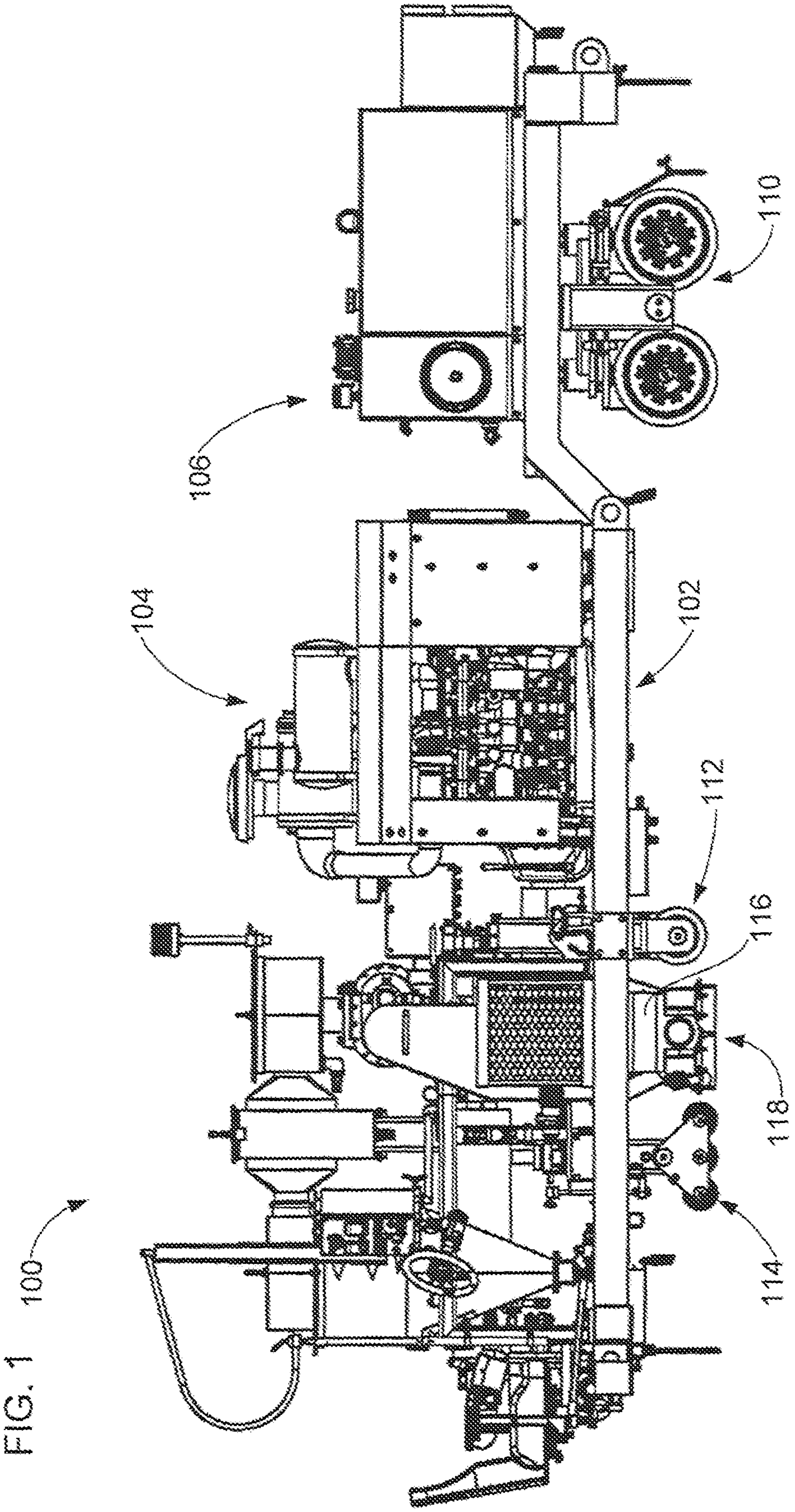
FIG. 1 is a side elevation and schematic of a grinding and grooving machine that can be used with the examples described herein.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of spacers and of blade cores and of methods of making and using the spacers and the blade cores are described. Depending on what feature or features are incorporated in a given structure or a given method, benefits can be achieved in the structure or the method. For example, spacers that can be inserted into an opening in a blade core by interference fit or sliding fit allow easy assembly of the spacers on a blade core. Additionally, spacers that are positioned on a blade core and configured to engage openings in adjacent blade cores when the blade cores are assembled next to each other provide a more stable assembly, and reduce the possibility variations in blade core positioning. Some spacer configurations can also help to direct airflow for cooling. Discrete spacers can also be used to support other components associated with the assembly. Blade cores using spacers can result in a lighter weight assembly, and an assembly that can allow better cooling of the blade cores during operation. Additionally, blade cores using discrete spacers distributed about the circumference of the blade core improve the weight characteristics and the cooling characteristics of the assembly.

In some configurations of blade cores, improvements can be achieved also in assembly, and in some configurations, interengaging spacers and blade cores provide a more stable and secure final assembly. For example, in a configuration where a single blade core is supported on an arbor and also by spacers positioned on adjacent blade cores, the entire assembly is more secure.

These and other benefits will become more apparent with consideration of the description of the examples herein. However, it should be understood that not all of the benefits or features discussed with respect to a particular example must be incorporated into a blade core, component or method in order to achieve one or more benefits contemplated by these examples. Additionally, it should be understood that features of the examples can be incorporated into a blade core, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of spacer configurations and of blade core configurations and of methods of making and using the spacers and the blade cores are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Blade cores are used as examples of a working tool that can incorporate one or more of the features and derive some of the benefits described herein, and in particular blade cores for grinding and grooving blades. Grinding and grooving blades typically operate on pavement at speeds generating significant heat, and are cooled with water. Grinders and groovers may be improved by providing a lighter weight blade assembly that can possibly be operated at higher speeds and possibly without requiring liquid cooling. However, blade cores and spacers for assemblies other than grinders and groovers can benefit from one or more of the present inventions, including for example without limitation gang blade heads, wood, board and paper cutting assemblies, slitting assemblies and the like.

As used herein, “substantially” and “approximately” shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

Grinders and groovers, for example and without limitation to application of the present configurations to other working tool assemblies, can benefit from use of one or more of the present configurations. In one example, a grinding and grooving machine 100 (FIG. 1) can be used to prepare or finish a working surface, for example pavement for highways, runways and other surfaces. The machine 100 includes a frame 102 supporting an engine 104, a hydraulic assembly 106 and a grinding or grooving head 108. Examples of grinding heads are described more fully below. The machine is supported, steered and advanced on the pavement work surface by bogies 110, and supported behind by wheel units 112. The depth of the grinding or grooving is controlled by a depth control 114. The engine 104 spins the grinding or grooving head 108 at the desired speed based on the heat limitations of the grinding head, the weight of the grinding head and any other relevant parameters. The bogies pull the machine forward at the desired feed rate or advance rate. A vacuum box 116 picks up debris from the cutting or grinding and sends it to a separator.

The rotational speed of the grinding head is determined by a combination of the weight of the grinding head and the engine size. The weight of conventional grinding heads limits the blade speed, as does heat generation and cooling limitations.

The grinding or grooving head 108 can take a number of configurations, which may depend on the size of the machine and the work to be done. In one configuration, the grinding or grooving head can include a shaft and blade assembly 200 (FIG. 2) having a blade shaft 202, a plurality of blades 204 represented schematically in FIG. 2 and a plurality of solid disc-shaped spacers 206, also represented schematically in FIG. 2. The blades and spacers are supported on the core of the blade shaft and positioned in registration with one or more keys 208. Typically, each blade is separated by a spacer so that blades and spacers alternate with each other, and a grinding or grooving head can have any number of blades, from fewer than 10 to more than 40, depending on the work to be done and the spacing desired for example in a grooving application. The assembly of blades and spacers are placed or stacked against a stop plate 210 at one end of the blade shaft, and secured in place by a pressure plate 212, positioned circumferentially by set-screws 214. Upon assembly, the blades and spacers are stacked against the stop plate 210 and in registration with the key 208 through one or another of a registration slot 216 in each blade or a registration slot 217 in the spacers, the pressure plate 212 placed against the last disc, and a compression plate 218 is threaded onto the end of the core of the blade shaft. A plurality of pressure screws 220 are then threaded into the compression plate and against the pressure plate 212 in order to place the blades and spacers under compression. The blade head can then be mounted on the machine for operation. All of the blade cores described herein are illustrated as being configured for mounting registration on a blade shaft or arbor such as that illustrated in FIG. 2 having one or more keys 208. However, it is understood that the blade cores, spacers and assemblies described herein can be configured for use on other blade shafts or arbors.

Figure 2:
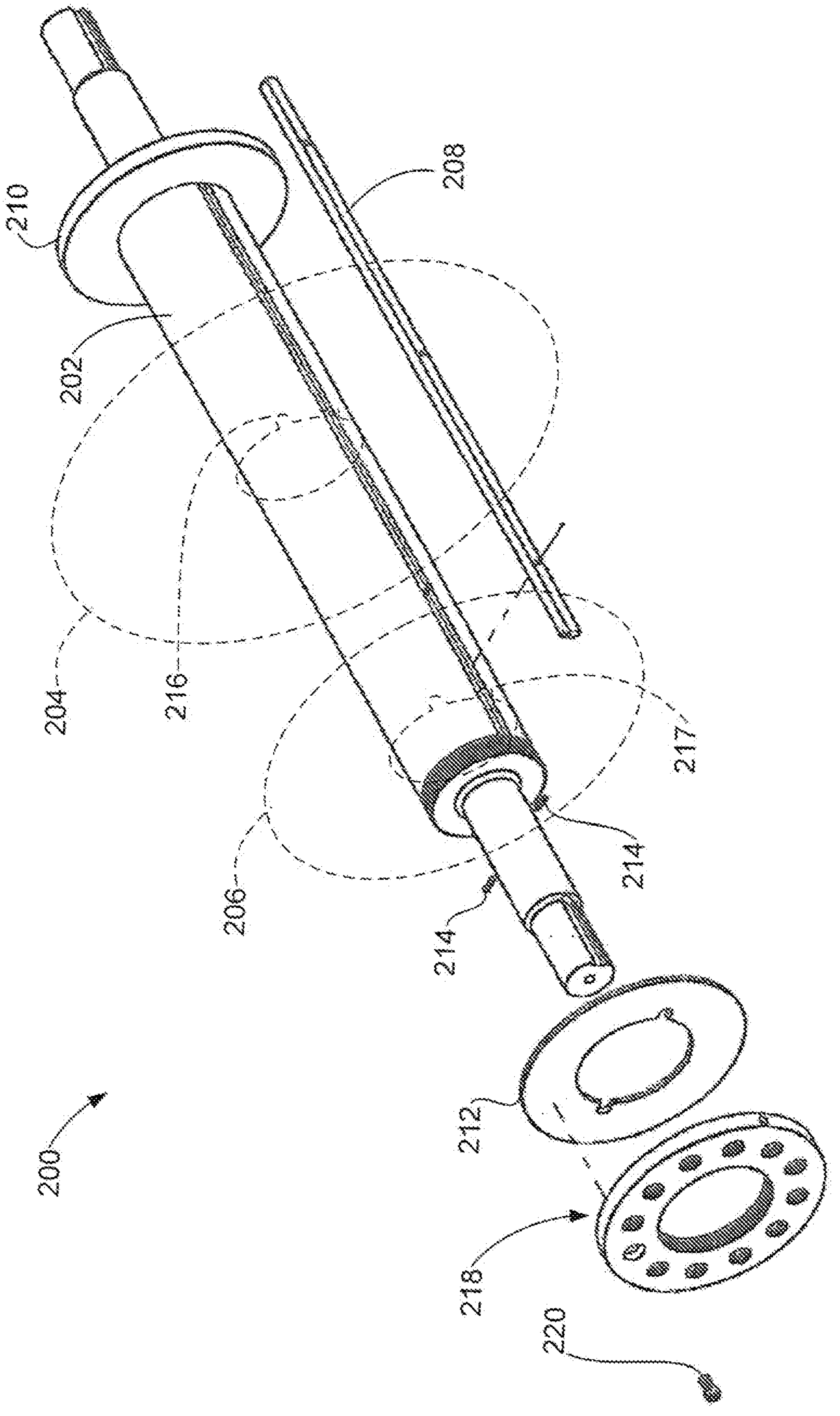
FIG. 2 is an upper isometric and schematic view of one type of blade shaft that can be used to support a plurality of blades, for example for use with the machine of FIG. 1.
Figure 3:
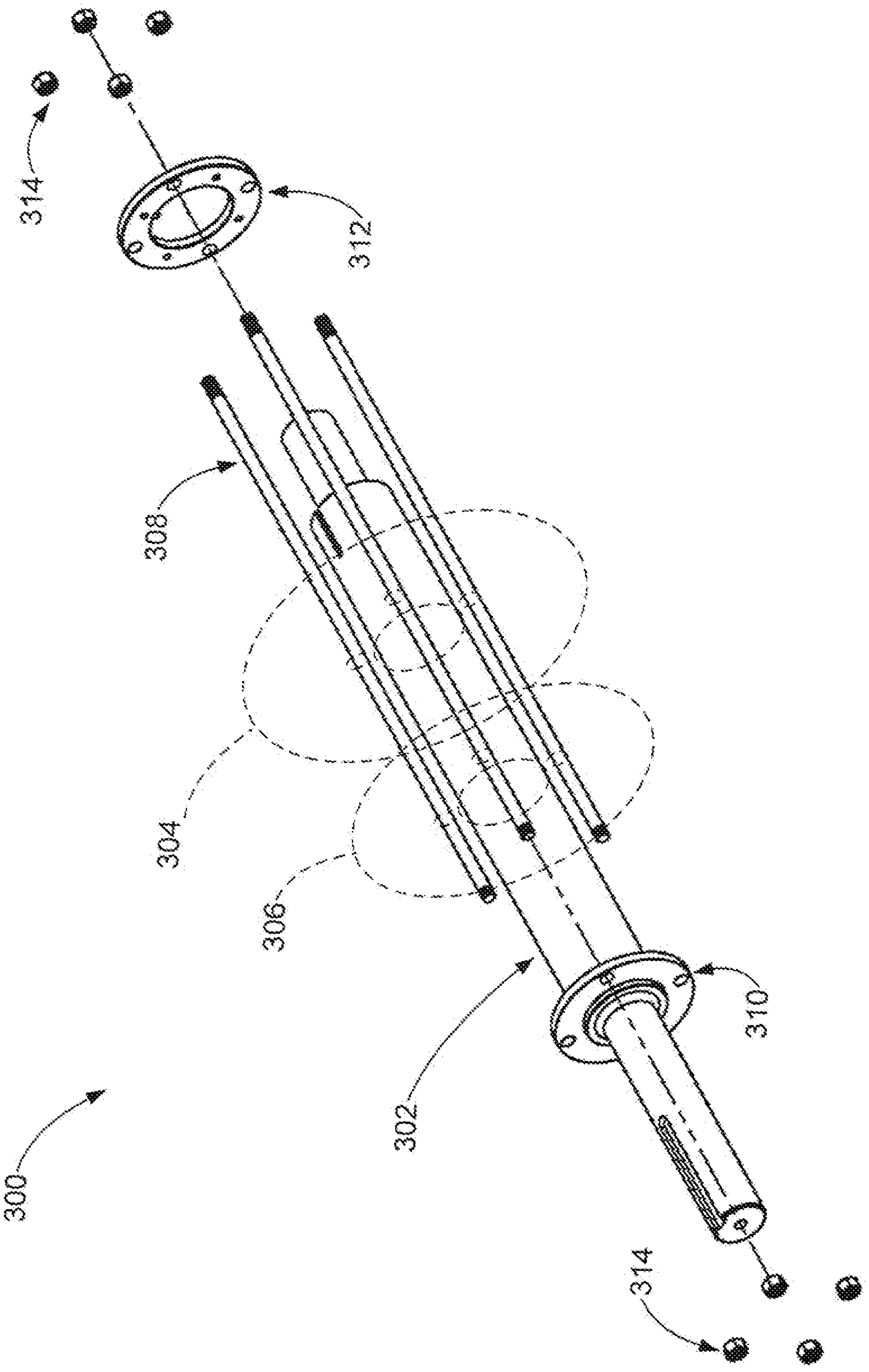
FIG. 3 is an upper isometric and schematic view of a second type of blade shaft that can be used to support a plurality of blades, for example for use with the machine of FIG. 1.

In another example of an assembly for a grinding or grooving head, they had can include a shaft and blade assembly 300 (FIG. 3 having a blade shaft 302, a plurality of blades 304 represented schematically in FIG. 3 and a plurality of solid disc-shaped spacers 306, also represented schematically in FIG. 3. The blades and spacers are supported on the core of the blade shaft and positioned circumferentially relative to each other by being positioned and placed over a plurality, in the present example 4, of threaded rods 308. As with the assembly illustrated in FIG. 2, each blade is separated by a spacer so that blades and spacers alternate with each other, and a grinding or grooving head can have any number of blades, depending on the design of the machine. The assembly of blades and spacers are placed or stacked against a first plate 310 on the threaded rods 308 and terminated with a second plate 312, and the assembly secured in compression by respective nuts 314. The blade head can then be mounted on the machine for operation.

Any of the blade core and spacer assemblies (with working tips or materials applied to the parameters of the blade cores) described herein can be assembled into a blade head for use with an arbor or blade shaft such as that described and illustrated with respect to FIG. 2. Such blade cores would include registration slots to accommodate keys on the blade shaft. Alternatively, or additionally, any of the blade cores described herein can be configured with working tips or materials to be mounted on an arbor or blade shaft such as that described and illustrated with respect to FIG. 3 along with any of the spacers described herein to form a working head. Either of the working heads can be placed on a grinding or grooving machine, for example one such as that described with respect to FIG. 1. Alternatively, blade cores with working surfaces and spacers as described herein can be assembled into blade heads for other applications, for example for cutting wood, board, paper or slitting applications. Examples of blade cores and spacers will be described herein in the context of blade cores for grinders and groovers, for example for use in the assemblies illustrated and described with respect to FIGS. 1-3, and modifications can be made to adapt the blade cores for other applications, for example by modifying the blade cores for how they are supported on a drive structure.

Figure 4:
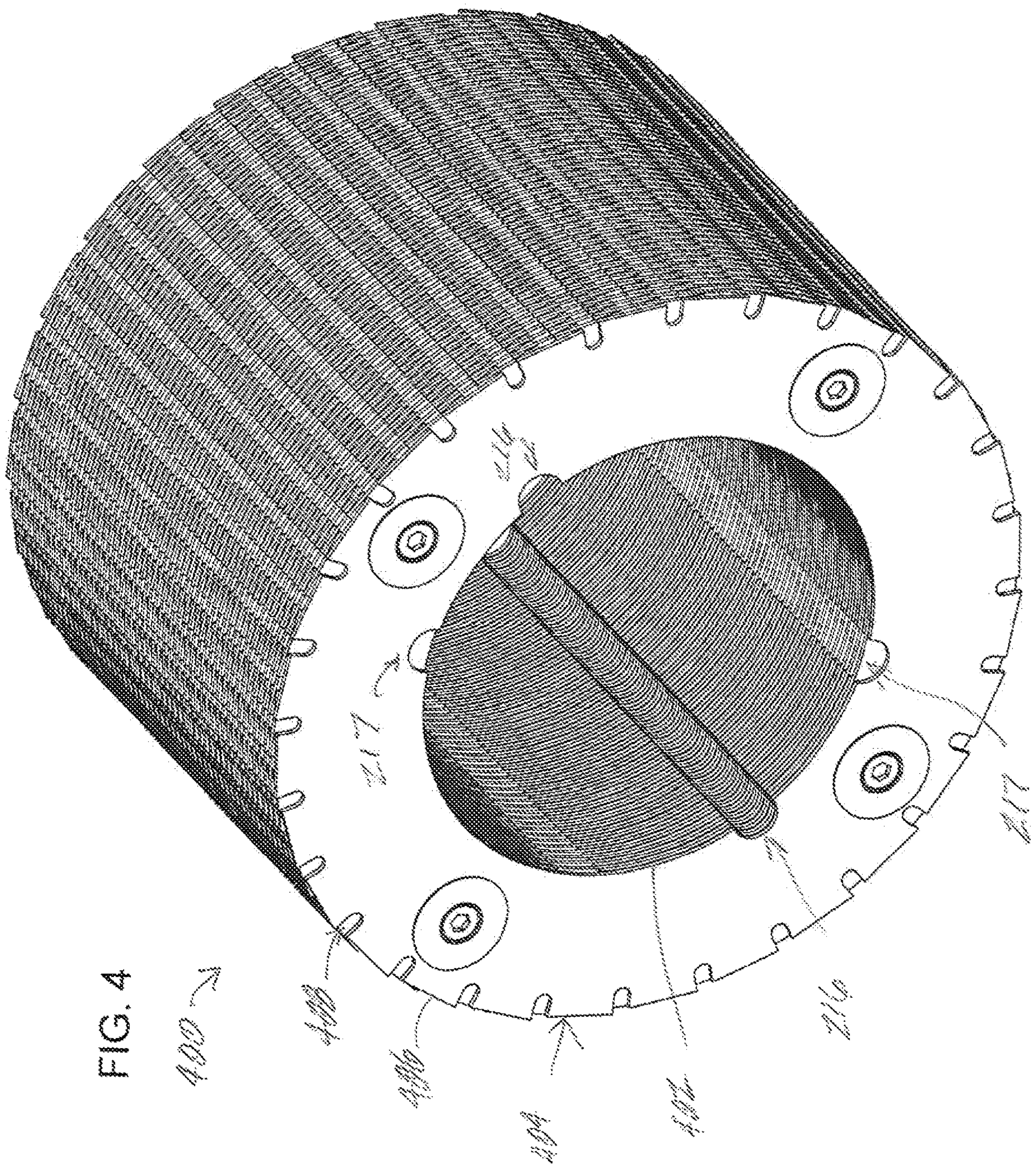
FIG. 4 is an upper isometric view of an assembly of blades that can be assembled on a shaft such as that shown in FIG. 2 having another example of spacers to position adjacent blades relative to each other.

Blade and spacer assemblies for applications identified herein can include anywhere from two or three blades up to as many as 40 or more in the assembly. Blade assemblies for grinders and groovers can have 10 or more blades all the way up to 40 or more, and are arranged to be coaxial with one another, as illustrated in FIG. 4, for being supported and controlled by a blade shaft or arbor. Other examples of blade assemblies described herein will show a plurality of blade cores, for example two blade cores, three blade cores or four blade cores, with the understanding that the desired blade assembly will have the desired number of blades for the application, additional blades for a given assembly being omitted from the illustrations for clarity. Configuration of additional blade cores will be a repetition of those described in a given example.

In one example of a blade assembly for groovers and grinders, a blade assembly 400 (FIG. 4) includes registration slots 216 and 217 for proper positioning on a blade shaft such as that illustrated in FIG. 2 with one or more keys 208. The blade assembly 400 is configured to be arranged on a blade shaft 200 with the registration slots 216, in the example illustrated, and each blade core (no working tips or working materials are illustrated on any of the blade cores illustrated herein, but it is understood that final working configurations include working tips or working materials as needed) includes an inner wall 402 defining an opening having an inside diameter suitable for reliably placing the blade core on the blade shaft to be supported during normal operation. Blade cores for grinders and groovers have openings with inside diameters ranging between 3 inches up to 10 or 12 inches or more, for example because of the size of the blade shaft designed to carry and drive the number of blades and spacers in a blade head, and to optimize the blade core configurations for such blade heads. The walls defining circular openings in all of the blade cores described herein for the blade shafts illustrated in FIG. 2, or if configured for the blade shaft illustrated in FIG. 3, are typically all concentric and have the same general inside diameter, excluding any cutouts or cavities described herein, for example the registration slots 216 and 217. Other blade shaft opening wall configurations can be used for blade cores, as desired, including those configurations described herein for accommodating spacers, for example.

The blade core extends from the wall 402 defining the opening for the blade shaft to a perimeter 404 of the blade core. The perimeter is generally circular but for straight sections 406 made linear for easier attachment of working segments, and for gullets 408 between straight sections. Other perimeter configurations can be used for blade cores, as desired, for example as a function of the work to be done with the blade assembly.

Generally, the blade cores described herein all will have the same blade shaft opening, registration slots, and perimeter configurations as described for the blade cores in the blade assembly 400 illustrated in FIG. 4, unless otherwise indicated. Elements assigned the same reference numeral herein will have the same structure and function as described herein, unless otherwise indicated.

At least one blade core in a blade assembly, and possibly every other blade core in a blade assembly, and in the configurations illustrated herein every blade core in a blade assembly, includes at least one spacer supported by a blade core. The spacer or spacers can have any one or more of the configurations described herein. In one example, including any of the examples in the foregoing two sentences, the at least one spacer is formed from a material other than a working material, where working material is a material applied to the perimeter area of the blade core for working a workpiece, examples of which include carbide tips and diamond matrix materials. As used herein, "supported by a blade core" means the spacer is limited or restricted in movement in a direction parallel to a plane of the blade core, including for example by engagement between at least a portion of the spacer and a surface on or in the blade core. In some examples, the spacer is supported by a blade in a direction parallel to a radial direction relative to the blade core, by an interaction between the spacer and the blade core. In the examples described herein, the interaction includes physical interaction, including for example engagement with a sidewall of the blade core, and magnetic interaction, but it is understood that other types of interactions between a spacer and a blade core limiting or restricting movement parallel to a plane of a blade core are included in the phrase "supported by a blade core". In the examples described and illustrated herein, the spacers are supported by a blade core through openings or cavities formed in the blade core, for example by openings extending outward from the blade shaft opening or extending inward from the blade core perimeter, or by openings formed in the blade core between the shaft opening and the perimeter and formed by a closed wall, or by cavities in a blade core formed partly into but not all the way through a blade core. In some of the examples described herein, the spacers are supported by the blade core and only a blade core and not by the blade shaft directly but only by a blade shaft indirectly through a blade core. Additionally, some examples of the spacers described herein have no working function with respect to a work surface such as pavement, concrete, wood or other works, and serve only a spacing function with respect to a blade core and its adjacent blade core or to adjacent blade cores. In other examples, the spacers may have only a spacing function and a fluid flow function to direct fluid based on surface configurations of the spacer. Also in the examples described and illustrated herein, the spacers are steel, aluminum, or may be thermoplastic, thermoset plastic, engineered plastic, UHMW plastic or similar materials other than working materials. Also in some of the examples described herein, the spacers are formed from a material other than a working material and are supported only by a blade core or a plurality of blade cores.

Figure 5:
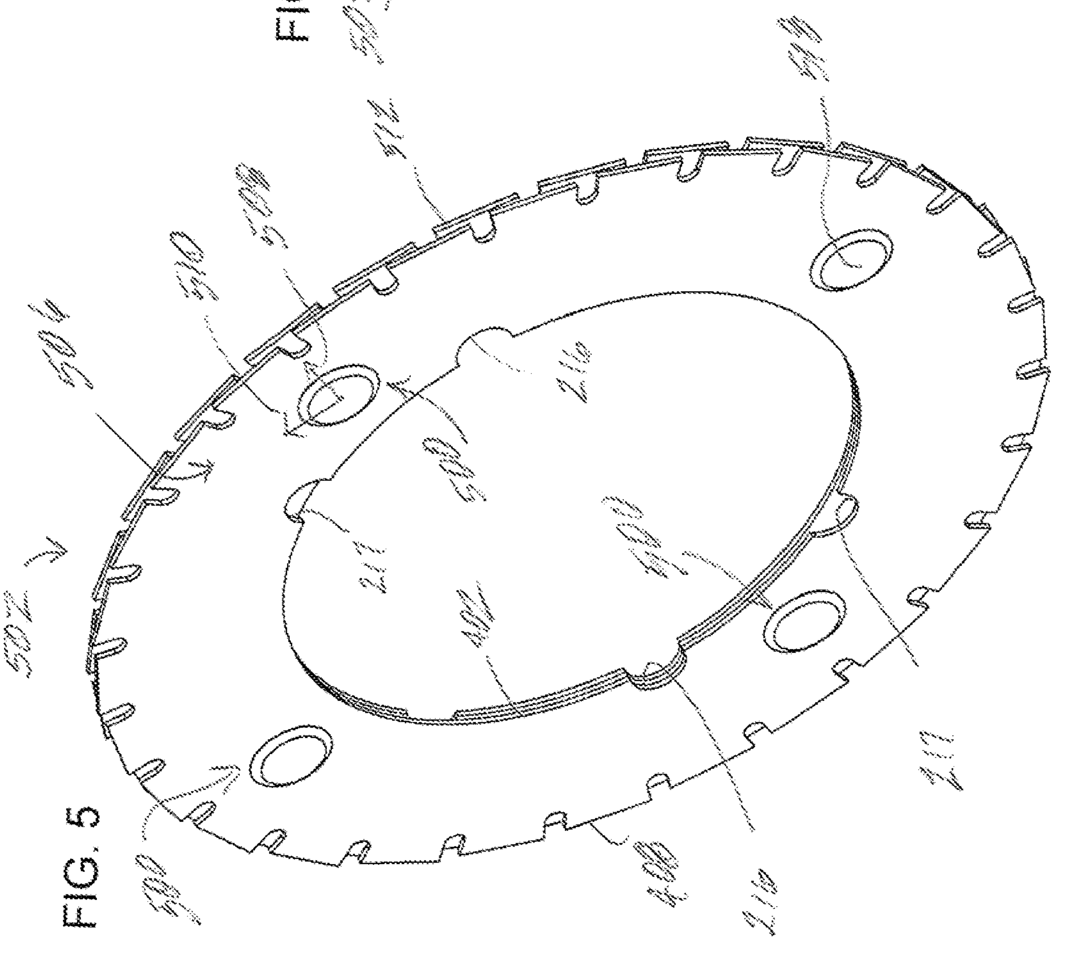
FIG. 5 is an upper isometric view of an example of a plurality of blades that can be assembled on a shaft such as that shown in FIG. 2 having spacers to position adjacent blades relative to each other.

A spacer can be used with a number of blade core configurations for blade assemblies, including those described herein. In one example, a spacer 500 can be used in a blade core assembly 502 (FIGS. 5-8). The spacer 500 can be used alone or in combination with identical spacers or with other spacers described herein. In the present example, the spacer includes a first body portion 504 extending in different directions in a plane, in the present example parallel to a plane of the blade core 506 in which the spacer is supported, which for example may be mutually perpendicular directions 508 and 510 (FIG. 5). The first body portion has a maximum height or thickness in a direction perpendicular to directions 508 and 510 an amount that is selected to be equal to the desired spacing between adjacent blades 506 and 512 (FIG. 5) in a final assembly. In the example illustrated, the first body portion includes a bevel surface 514 extending from an inside face 516 to an outside face 518 (FIG. 7), both of which are flat in the present example, and the thickness is defined by the spacing between the inside and outside faces. In the present example, the first body portion has a substantially circular or disc geometry, but the first body portion can take any number of geometric configurations providing the desired thickness and extension in different directions.

Figures 60, 61, 62, 63, 64, 65, 66, 67, 68:
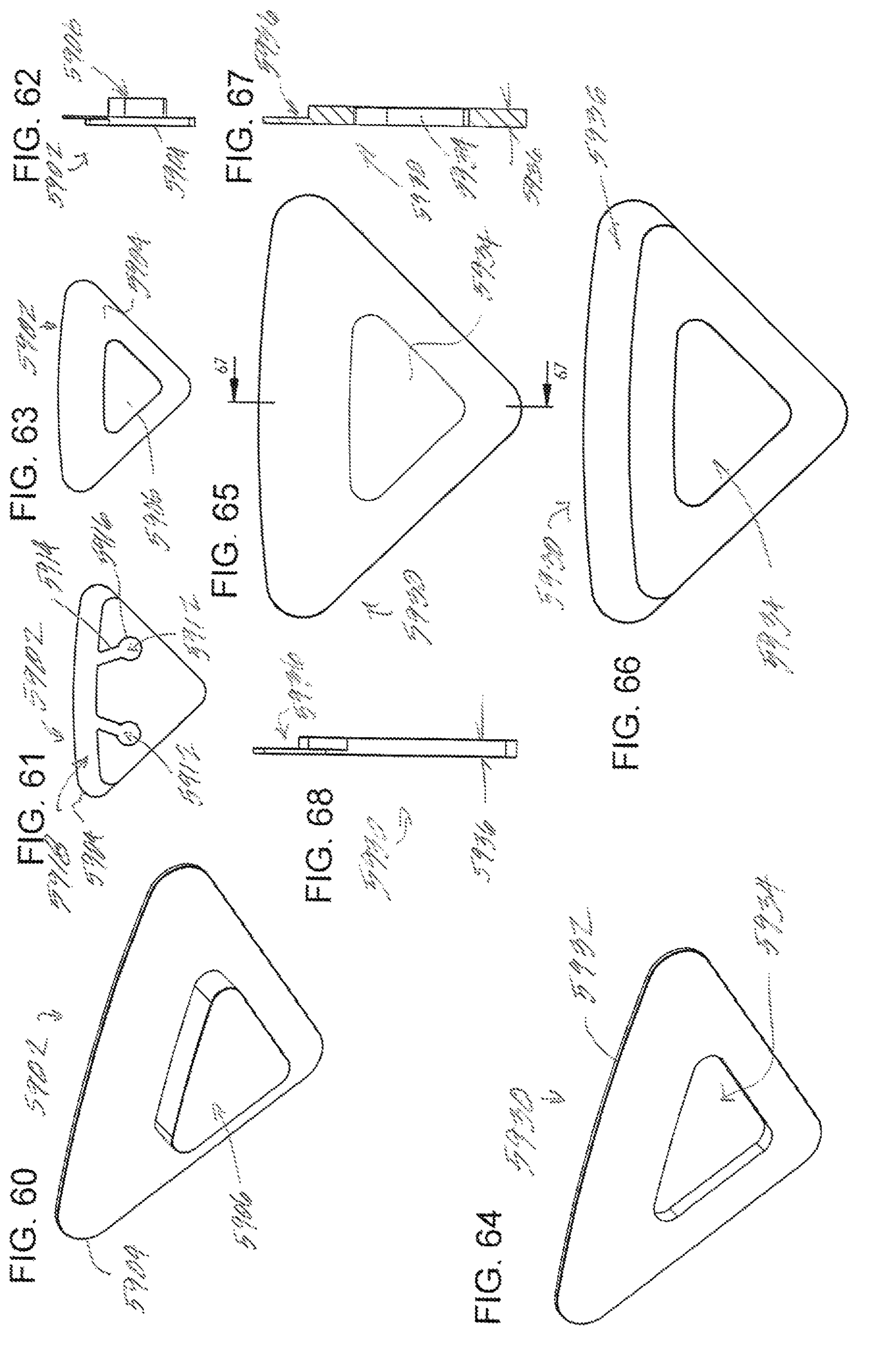
FIG. 60 is an upper rear isometric view of a first component of a spacer used in the assembly of FIG. 59.
FIG. 61 is a front elevation view of the spacer component of FIG. 65.
FIG. 62 is a side elevation view of the spacer component of FIG. 65.
FIG. 63 is a rear plan view of the spacer component of FIG. 65.
FIG. 64 is an upper isometric view of a second component of a spacer used in the assembly of FIG. 59.
FIG. 65 is a front elevation view of the spacer component shown in FIG. 64.
FIG. 66 is a rear elevation view of the spacer component of FIG. 64.
FIG. 67 is a vertical cross-section of the spacer component of FIG. 64 taken along the line 67-67 in FIG. 65.
FIG. 68 is a side elevation view of the spacer component of FIG. 64.

The spacer 500 also includes a second body portion 520 extending away from the first body portion, for example in a third direction perpendicular to the first body portion 504, in the present example perpendicular to the directions 508 and 510. The second body portion is configured to contact a portion of the blade core 506 between oppositely-facing surfaces of the blade core. In the present example, the second body portion passes into and through a circular opening in the blade core, and contacts at least part of a circular wall forming the circular opening in the blade core. As illustrated, the second body portion 520 is a right circular cylinder, but the second body portion can take other geometric configurations that can also permit the second body portion to contact a wall of an opening in the blade core, for example so that the blade core can support the spacer, such as in a direction parallel to a plane of the blade core. Also in the present example, the second body portion is solid, but need not be, and the first and second body portions have the same geometric profile in cross section, but can be otherwise. (All examples of spacers described herein with respect to FIGS. 5-60 are configured so that the respective blade cores can support the spacer in at least one direction parallel to a plane of the blade core.) In the example of a cylindrical second body portion and a circular opening in the blade core, the blade core supports the spacer in a radial direction relative to a center of the blade core, and in all 360° in a plane of the blade core. For a noncircular opening in a blade core, it is possible that the spacer would not be supported by contact at all 360° directions in a plane parallel to the blade core. The second body portion has a thickness approximately the same as a thickness of the blade core 506, taking into account tolerances and the like, and may have a thickness that accommodates easy positioning of the spacer in the opening in the blade core while still allowing the first body portion 504 to maintain the desired spacing between the blade core 506 and the next adjacent blade core which the face 518 of the spacer will contact when the blades are assembled together.

Figure 6:
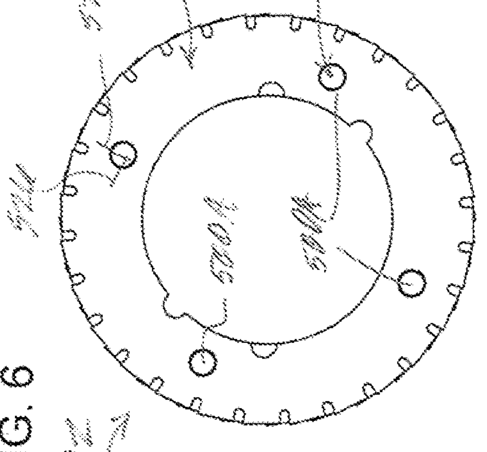
FIG. 6 is a rear elevation view of the assembly of FIG. 5.
Figure 8:
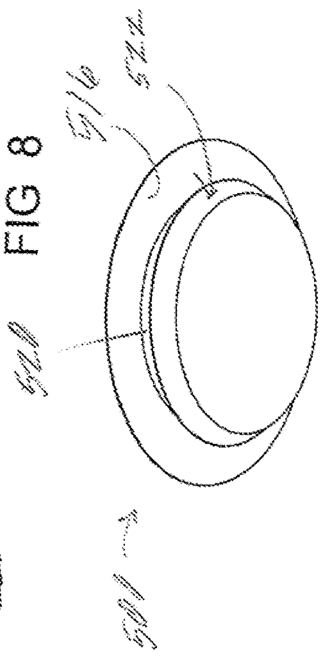
FIG. 8 is a lower isometric view of the spacer of FIG. 7.

The spacer 500 having first and second body portions can be held in position in an opening in the blade core 506 by any of a number of means, including interference fit, adhesive, welding, mechanical means or other means for reliably positioning the spacer in the opening in the blade core 506, and the first and second body portions are the only body portions in the spacer. An interference fit can be complete around the entire perimeter of a 360° contact, or may be partial with one or more points or one or more surfaces on the second body portion contacting respective surfaces in the opening in the blade core. The fit can be a close fit or no interference fit in an alternative configurations, and may be held in place by any of the other configurations described herein. Alternatively or additionally, the spacer 500 is held in place in an opening in the blade core by a third body portion 522. In the present example, the third body portion 522 extends in different directions parallel to a plane of the blade core, and in one example forming a circular body portion extending in mutually perpendicular directions 524 and 526 (FIG. 6). The third body portion may have other geometries. The third body portion 522 includes a bevel surface 528, but may have other edge geometries. The third body portion includes an inside face 530 and outside face 532, both of which are flat as illustrated, facing in opposite directions in the illustrated example, and the thickness is defined by the spacing between the inside and outside faces. In the present example, the third body portion has a height or thickness in a direction perpendicular to the directions 524 and 526 an amount that is selected to be equal to the desired spacing between adjacent blades 506 and 512 (FIG. 5) in a final assembly. The spacer 500 with the first, second and third body portions is formed monolithic, but can be formed from two or more parts. In one example when formed of two or more parts, one part with a second body portion fitting into an opening in the blade core can have a clearance fit or less than completely interference fit, and application of an additional body portion may produce an interference fit or a more complete interference fit. In another example (not shown), a third body portion may have a maximum outside dimension less than or equal to a maximum outside dimension of the second body portion and have a height or width providing the desired spacing between a blade core supporting the spacer and an adjacent blade core. In such an example, the third body portion provides little if any securement function holding the spacer in place on the blade core, with the remaining or all of the securement function for the spacer being provided by the second body portion and/or any additional structures or materials, such as fastenings, adhesives, or the like, along with lateral support provided by the first body portion.

In the present example, four spacers 500 are distributed equidistant from each other about the circumference of the blade core 506. Other numbers of spacers and/or distributions are possible. Additionally in the illustrated example, all of the spacers on a given blade core face in the same direction, but their orientation can be alternated or varied as desired. Generally, the arrangement and orientation of spacers on each blade core in an assembly will be consistent from one blade core to the next, for example so that stacking of blade cores into a blade assembly will produce the desired blade spacing and distribution of spacers about the circumference of the blade assembly. In the present example, the blade core 512 includes the same number of spacers 500A (spacers identical to spacers 500) as the blade core 506, in the present example four spacers, and the spacers are oriented on the blade core 512 the same way the spacers 500 are oriented on the blade core 506. When the blade cores are assembled to form a blade assembly, the blade core 506 and the blade core 512 are shifted about their central axis, for example shifted relative to each other on a blade shaft, so that the spacers 500A are shifted 45° relative to the spacers 500. This allows eight spacers to contribute to spacing of adjacent blades while having only four spacers on each blade core. Other numbers of spacers and distributions can be used.

It is noted that a spacer 500 supported in an opening in the blade core 506 will be spaced apart from a blade core 512 as illustrated in FIG. 5 based on a spacing defined by the third body portion 522, as well as the thicknesses of third body portions on any other spacers supported on the blade core 506. Similarly, the spacing between the blade core 506 and blade core 512 will also be determined by the first body portions 504 of spacers 500A placed in the blade core 512, as illustrated in FIG. 6, which is a rear elevation view of the assembly shown in FIG. 5. The spacers 500A are positioned in the blade core 512 the same as the spacers 500 are positioned in the blade core 506, so that the outside faces 518 of the spacers face in the same direction. Alternatively, spacers can be configured to face in opposite directions alternately about a given blade core. Additionally, as illustrated in FIGS. 5 and 6, the blade core 512 is shifted 45° so that the spacers in the blade core 506 on the one hand and the spacers 500A in the blade core 512 on the other hand are shifted relative to each other. Such a configuration allows for spacers on each blade core to provide spacing between adjacent blade cores at a different locations, for example eight locations in the illustrated example. Other combinations are possible.

The blade core 506 and spacers 500, or the blade core 512 and spacers 500A, can form an assembly of a blade core and spacers, and a plurality of blade core and spacer assemblies can be combined to form a blade assembly or blade head such as may be used on a groover or a grinder in the present illustrations. The blade core 506 and spacers 500 will be described, but it is understood that the other blades in a blade assembly will be identical or sufficiently similar to provide the desired blade makeup and spacing, and in the example illustrated in FIG. 5, adjacent blade cores are shifted 45° relative to each other so that the spacers in one blade core contact the adjacent blade core intermediate the spacers on the adjacent blade core.

The illustrated blade core 506 includes registration key slots 216 and 217, the registration key slots 216 being a pair diametrically opposite each other, and the registration slots 217 being a pair position diametrically opposite each other. The registration slots are formed extending radially outward from the blade shaft opening 402. The blade core 506 includes at least three and preferably four or more circular openings (not shown) for receiving respective spacers 500. In the example of four openings, the four openings are positioned equidistant from each other, namely 90° apart on the blade core positioned intermediate the blade shaft opening 402 and the perimeter 404. In the present example, the four or more openings are positioned on an annulus (not shown) that coincides or is aligned with the fasteners 220 in the compression plate 218 (FIG. 2), or an annulus defined by such fasteners (if threating of the compression plate onto the blade shaft does not result in a particular fastener being aligned with a particular opening in the blade core). In an example of more than four openings, the openings are positioned equidistant from adjacent ones of the openings on the compression annulus, though they need not be.

In an assembly of a blade core and spacers, the blade core 506 includes in the illustrated example four spacers 500 evenly distributed about the blade core, approximately intermediate the shaft opening 402 and the perimeter 404, while other radial positions are possible. More or fewer spacers can be distributed about the blade core, and the number may be a function of the size of the first body portion and the size of the third body portion, if a third body portion is included. The thickness of the first body portion and the thickness of the third body portion are preferably identical so that they produce the desired spacing between adjacent blade cores. The height or thickness of the second body portion is preferably as close as possible to the thickness of the blade core so that the float of the spacer in the circular opening in the blade core is as small as possible.

Each spacer is inserted into the respective circular opening in the blade core by pressing the outside face 518 so that at least a portion of the inside face 530 on the third body portion flexes, compresses or bends sufficient to pass the third body portion through the opening to the opposite side of the blade core 506. The inside face 516 of the first body portion contacts the facing surface of the blade core, and the inside face 530 of the third body portion faces the adjacent surface of the blade core. The outside faces 518 and 532 face in opposite directions and are substantially planar and parallel to the plane of the blade core when the spacer is in position. The remaining spacers are also inserted in like manner. While it is possible that a given blade core can have the spacers inserted from either side, consistent assembly helps to properly orient the blade on the blade shaft in final assembly, especially if blade rotation is intended to be in one direction. The spacers can be held in place by the existing inter-engagement, but other means can alternatively or additionally be used to maintain the spacers in place. The second blade core 512 and others are assembled in like manner, and the blades with working elements are assembled on a blade shaft, with adjacent blades shifted 45° if desired. If adjacent blades are not shifted, the spacing between adjacent blades would be twice the thickness of the first body portion, which would also typically be twice the thickness of the third body portion.

Figure 10:
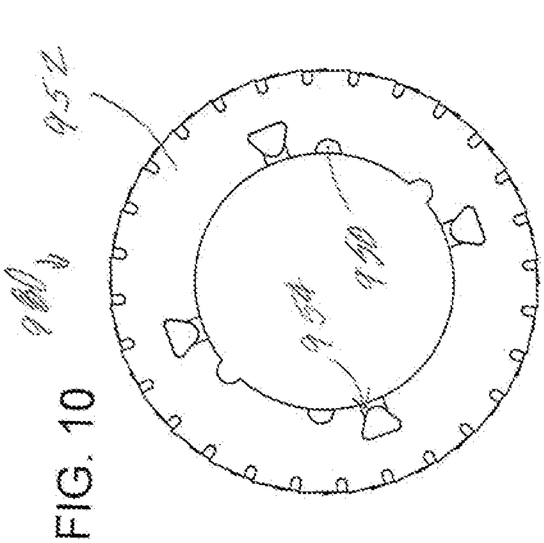
FIG. 10 is a rear elevation view of the assembly of FIG. 9.
Figure 9A:
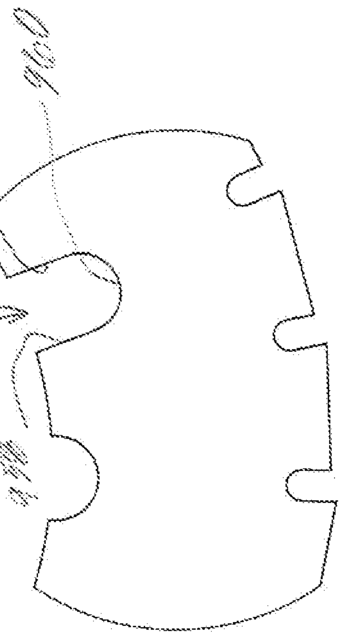
FIG. 9A is a detail plan view of a portion of a blade core showing a blade shaft opening and a perimeter, registration slot and an opening for receiving a spacer.
Figure 9:
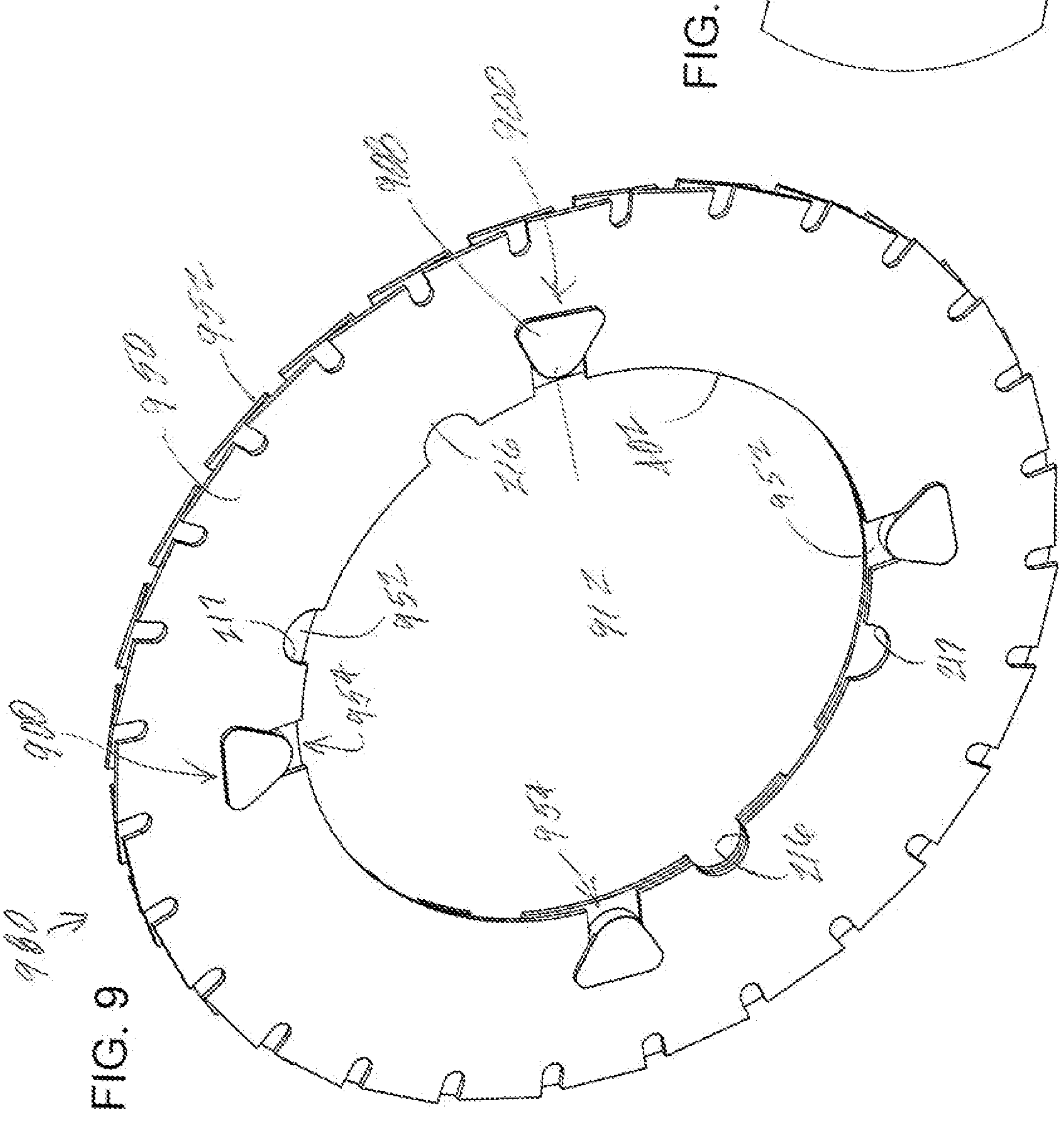
FIG. 9 is an upper isometric view of another example of a plurality of blades that can be assembled on a shaft such as that shown in FIG. 2 having another example of spacers to position adjacent blades relative to each other.
Figure 11:
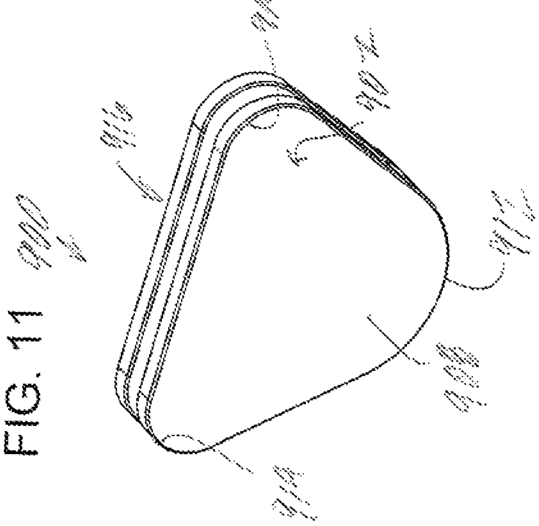
FIG. 11 is an upper isometric view of a spacer used in the assembly of FIG. 9.
Figure 12:
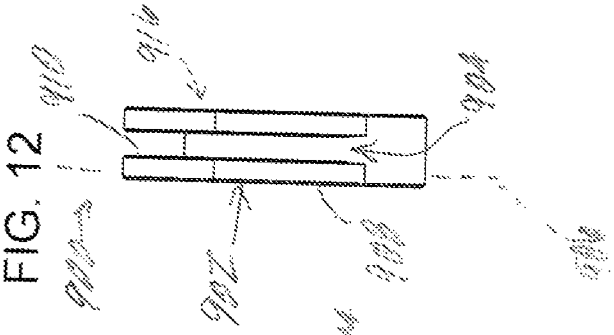
FIG. 12 is a side elevation view of the spacer of FIG. 11.
Figure 13:
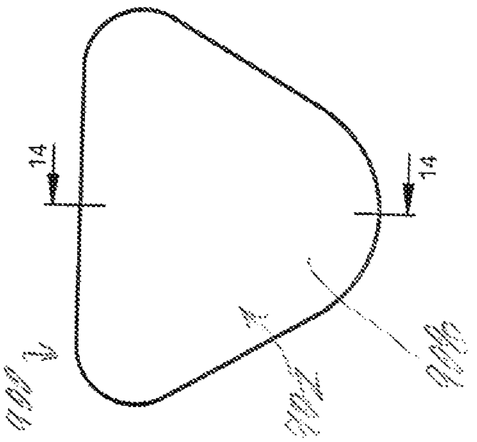
FIG. 13 is a front elevation view of the spacer of FIG. 11.
Figure 14:
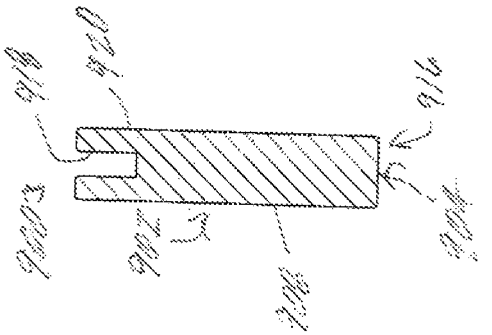
FIG. 14 is a vertical transverse cross-section of the spacer of FIG. 11 taken along line 14-14 in FIG. 13.
Figure 16:
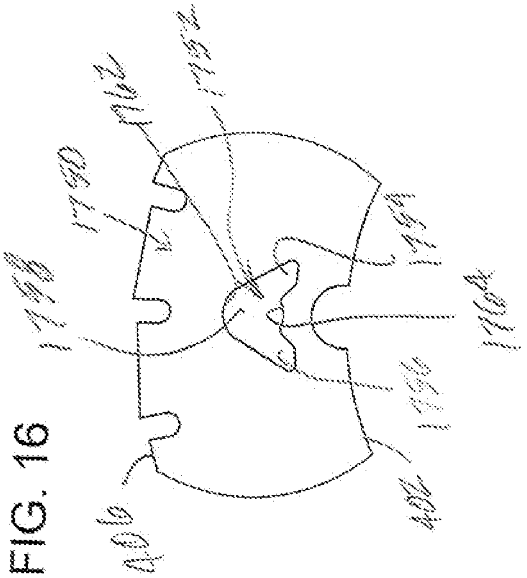
FIG. 16 is a front elevation view of a blade such as those used in the assembly of FIG. 15.

In another example of a spacer that is configured to be supported by a blade core, a spacer 900 (FIGS. 9-14) includes a first body portion 902 and a second body portion 904. The second body portion is configured to be supported by a blade core. The spacer can be used alone or with additional identical spacers on a blade core, or in combination with other spacers described herein. The first body portion 902 extends in a plane 906, in the present example parallel to a plane of a blade core such as the plane of a blade core 950. The first body portion has a height or thickness in a direction perpendicular to the plane 906 an amount that is selected to be equal to the desired spacing between adjacent blades, for example that using blade core 950 and the adjacent blade core 952 (FIGS. 9-10). The first body portion includes an outer surface 908, which in the present example is a flat surface extending parallel to the plane 906, and an inner surface 910 facing in a direction opposite that of the outer surface 908 and parallel to the plane 906.

The first body portion has a planar geometry that is deltoid, having three sides. The deltoid geometry includes a first junction 912 between adjacent sides that has a first radius of curvature, and second and third junctions 914 that have a smaller radius of curvature than the first junction, but the radius of curvature of the second and third junctions are substantially the same.

The second body portion 904 of the spacer extends away from, and as illustrated perpendicular to, the first body portion in a direction away from the inner surface 910. The second body portion is configured to contact a portion of the blade core 950 between oppositely-facing surfaces of the blade core. In the present example, the second body portion passes into and through an opening in the form of a slot 954 in the blade core 950. The second body portion contacts at least part of one or more walls in the blade core forming the slot 954. In the illustrated example, the second body portion 904 is a right circular cylinder, but the second body portion can take other geometric configurations that can also permit the second body portion to contact one or more walls of the slot in the blade core, for example so that the blade core can support the spacer, such as in a direction parallel to a plane of the blade core. In another example, a portion of the second body portion 904 adjacent the inner surface 910 is circular, for example a top portion of the second body portion, and opposite sides on each side of the circular portion may be straight, for example parallel or not. Straight sides can help to limit pivoting of the spacer 900 when positioned in a slot of a blade core, for example a slot having sides complementary to the adjacent surfaces of the second body portion, for example straight sides.

The first and second body portions 902 and 904 are formed monolithic and solid, but can be otherwise. With the spacer 900, the first and second body portions do not have the same geometries, but in the illustrated example, the lower portion of the second body portion and the lower portion of the first body portion forming the junction 912 are partly circular and have the same radius of curvature.

In the example of the right circular cylindrical second body portion and the spacer positioned in the slot 954 in a blade core, the blade core supports the spacer in a direction parallel to the blade core, and when the blade is spinning, centripetal force pushes the spacer against the closed end of the slot 954. As a result, the end of the slot supports the spacer 900 in a radial direction relative to a center of the blade core. The slot 954 also supports the spacer in other directions, but when the blade core is stationary, no structure supports the spacer in the radially inward direction toward the center of the blade core. If the spacer is held in place at the closed end of the slot 954 by mechanical means, adhesive, or otherwise, the spacer would be supported in the blade core at those locations.

In another example of the second body portion for the spacer 900, the second body portion includes first and second straight walls, in one example extending parallel to each other, extending on spaced apart sides of the second body portion. The straight sidewalls can be used to help position the spacer 900 in a respective opening in a blade core supporting the spacer. For example, as described below, an opening in a blade core having spaced apart straight sidewalls can help to position a spacer having a surface configuration in the second body portion complementary to one or more portions of the wall in the blade core opening.

The second body portion 904 in the spacer 900 has a thickness approximately the same as a thickness of the blade core 950, taking into account tolerances and the like. The second body portion may have a thickness that accommodates easy positioning of the spacer in the slot 954 while still allowing the first body portion 902 to maintain the desired spacing between the blade core 950 and the next adjacent blade core 952 when the blade cores are placed next to each other. The lateral dimensions of the second body portion can also be selected for the desired positioning of the spacer in the slot. In one configuration, the second body portion can have a diameter providing a clearance fit in the slot 954, so that the spacer can be moved easily in the slot. In another configuration, the second body portion can have a diameter providing a close fit, for example so that the spacer does not fall out of the slot without applying a force other than gravity. In a further example, the second body portion can have a diameter providing an interference fit, requiring a force to insert the spacer in the slot. Where the second body portion is other than a right circular cylinder, for example some other cylindrical shape, similar considerations can be applied to provide the desired fit in an opening in a blade core.

The spacer 900 having first and second body portions can be held in position in an opening in the blade core 950 (and similarly with respect to any other blade core of the same or similar configuration, such as blade core 552) by a number of means, including interference fit, adhesive, welding, mechanical means or other means for reliably positioning the spacer in the opening in the blade core. Alternatively or additionally, the spacer 900 is held in place relative to the plane of the blade core in the opening in the blade core by a third body portion 916. In the present example, the third body portion 916 extends transversely perpendicular to the right circular cylinder of the second body portion 904, parallel to the plane 906. The third body portion in combination with the first body portion forms a groove between them, the spacing for which is determined by the height or thickness of the second body portion. The third body portion can take a number of geometric configurations, for example circular, oval, polygon, or other shapes, but in the present example the third body portion has a deltoid geometry. Also in the present example, the third body portion has a deltoid geometry substantially the same as that of the first body portion, and is a mirror image of the first body portion parallel to the plane 906. The third body portion includes an inside face 918 an outside phase 920, facing in opposite directions, both of which are substantially flat in the illustrated configuration. The third body portion has a height or thickness in a direction perpendicular to the plane 906 an amount that is selected to be equal to the desired spacing between adjacent blades, for example 950 and 952 (FIG. 9) in a final assembly.

One or more spacers 900 can be used with a blade core, such as a blade core for grinders and groovers, having respective non-circular openings in the core for supporting a respective spacer. In one example, the blade core 950 includes a wall 402 defining the arbor opening in the blade core, and a plurality of registration slots 216 and 217. The blade core 950 has an arbor opening of at least 3 inches up to about 12 inches or more for being supported on the blade arbor for a grinding or grooving head. In the configuration shown in FIG. 9, the blade core includes four registration slots. The blade core 950 further includes an additional slot, namely slot 954, which is noncircular (see FIG. 9A), and in the illustrated configurations deeper than the registration slots. In the present example, the blade core 950 includes a plurality of noncircular slots 954, each of which are identical, and only one will be described in detail. Four noncircular slots are illustrated, arranged uniformly about the arbor opening, each extending radially outward therefrom, but more or less than four can be incorporated into the blade core 950. In the present example, each noncircular opening includes two spaced apart straight sidewalls 956 and 958 extending outward from the arbor opening. In one example, the straight sidewalls extend parallel to each other, and in another example they converge outwardly, or they may diverge. The two sidewalls can be other than straight, but straight sidewalls help to guide the insertion of the spacer 900. The two straight sidewalls terminate at an end wall 960, in the present example a semicircular wall terminating the slot 954. Even though the semicircular wall is partially circular, the shape of the entire opening is noncircular, or in other words the slot 954 has portions that make the slot a noncircular opening, namely the straight sidewalls. The depth of the slot 954 can be selected so as to position the respective spacer at the desired location relative to the shaft opening and the outer perimeter, and also to ensure the strength and integrity of the blade core is maintained, and in the present example the slot 954 is deeper than, or extends a greater distance outward from the blade shaft opening 402, the registration slots 216 and 217.

The configuration of the spacer 900 and the blade core 950 can be used to assemble a blade core and spacer assembly, and multiple blade core and spacer assemblies can be used to form a blade assembly or blade head. In the present example, first and second blade cores 950 and 952 are described and illustrated, with the understanding that this plurality of blade cores can form a blade core and spacer assembly, and such assemblies can include more than two such blade core and spacer assemblies. For example, blade heads for grinders and groovers can have as many as 40 blades or more. The second blade core 952 and the assembly of the blade core and associated spacers are identical to the first blade core 950, and they are arranged on a blade shaft with one rotated 45° relative to the other. Therefore, only the assembly of the blade core 950 and associated spacers 900 is described.

A blade core and spacer assembly 980 (FIGS. 9-10) includes the blade core 950 and one or more spacers 900, in the present example four spacers. Four slots 954 are distributed evenly around the shaft opening 402 and extend generally radially outward from a center of the blade core. Each spacer 900 is positioned in a respective slot 954 in the same manner. Each spacer is oriented so that the larger junction 912 is closer to the center of the blade core, and the two smaller junctions 914 are farthest from the center of the blade core. In that orientation, the side containing the smaller junctions 914 form the widest portion of the spacer, so that the surface area of the spacer increases as the spacer extends radially outward. Other orientations are possible, but the illustrated orientation presents a wider surface area closer to the working perimeter of the blade core.

When the spacer is in position, the first and third body portions sandwich the portion of the blade core between the two body portions, and the relative spacing between the two body portions and the thickness of the blade core at the slot 954 help to determine the ability of the spacer to move in the slot. If the spacing between the two body portions (or the height or thickness of the second body portion) is less than the blade core thickness, the dimensions provide an interference fit for the spacer on the blade core. If the spacing is approximately the same as the blade core thickness, the spacer has a close fit, and if greater has a clearance fit. Even if the spacer has a clearance fit, the spacer is maintained in the slot 554 once the assembly is placed on a blade arbor since the blade arbor prevents the spacer from coming out of the slot 954. During operation, the centripetal force produced during rotation apply than outward force on the spacer pushing it toward the closing wall 960 of the slot 954. The semicircular closing wall 960 of the slot 954 forms a surface complementary to the upper circular surface of the second body portion. Because the first and third body portions of the spacer are mirror images, the assembly has the same configuration whether the first body portion is on one side of the blade core or the other.

In the example where all of the spacers on the blade core 550 are the same, with the same orientation relative to the blade core, the assembly can be repeated with multiple blade cores and their respective spacers. Multiple blade core and spacer assemblies can be combined into a blade head. In the present example illustrated in FIGS. 9 and 10, the second blade core 952 is identical to the blade core and spacer assembly 950 and the two are positioned on a blade shaft shifted rotationally 45° relative to each other, while still having registration openings 216 aligning with each other. With the shift, each set of four spacers on the respective blade cores provide spacing functions of eight spacers for the two blade core assemblies facing each other. A different alignment configuration, spacer distribution, spacer density and spacer configuration can be used with these or similar blade cores for producing the desired assembly. In one example of a different configuration of the blade assembly, the blade cores are not shifted 45° relative to each other, in which case the spacing between the blades is the sum of the spacing provided by each of the spacer body portions in contact with each other, for example the third body portion on one blade core and the first body portion on the other blade core.

Another spacer that can be used with the blade core 950 (FIG. 9) is a spacer 1700 (FIGS. 15-22). The spacer is identical to the spacer 900 except that a wedge is removed from a center of the top portion of the deltoid structures of the first and third body portions. The spacer 1700 has a V-shape with the first body portion 1702 having diverging legs 1704 and 1706 joined together by a rounded body portion 1708, which is coincident with a circular second body portion 1710. The third body portion 1712 is a mirror image of the first body portion on a side of the second body portion opposite the first body portion. The spacer 1700 is otherwise identical to the spacer 900, and can be configured in the same way with the same function, and can be used with the blade core 950 or a plurality of such blade cores in the same way that the spacer 900 is used.

A further example of a blade core for a grinding or grooving machine includes one or more openings that are noncircular. In one example, a blade core 1750 (FIG. 15) includes a wall defining a central opening 402 for a blade shaft and registration slots 216 and 217 for positioning the blade core on a blade shaft. The blade core has an arbor opening of at least 3 inches up to about 12 inches or more for being supported on the blade shaft for grinding or grooving. The blade core includes a noncircular opening, and in the present example a plurality of noncircular openings 1752 (FIGS. 15-16) for receiving and supporting a respective spacer. In the illustrated example, there are four identical noncircular openings 1752, and only one will be described. In the present example, the opening 1752 has the same geometric profile as spacer 1700, and the dimensions of the profile are slightly greater than the dimensions of the spacer 1700 to allow either the first or third body portion to enter and pass through the opening 1752 from one side of the blade core to the other side. Where the dimensions of the first body portion and the second body portion of the spacer 1700 are identical, either of the first and third body portions can be pushed into the opening for positioning the spacer in the opening. Where the dimensions of one of the first and third body portions is greater than a dimension of the opening 1752, only the other of the body portions can be used to position the spacer in the opening.

The opening 1752 in the present example is an inverted V-shape relative to the center of the blade core, and includes walls defining first and second legs 1754 and 1756 converging toward the perimeter of the blade core at a junction 1758. The legs 1754 and 1756 and the junction 1758 generally conform to the legs 1704 and 1706 and the junction 1708 of the spacer 1700. The spacer 1752 is positioned radially on the blade core so that the center of the junction 1758 is at an approximate center of the blade core between the shaft opening 402 and the perimeter 404. The opening can be positioned at any desired location on the blade core.

In another example of a blade core and spacer assembly, a blade core and spacer assembly 1780 (FIG. 15) includes the blade core 1750 and the desired number of spacers 1700, and multiple such blade core and spacer assemblies can be combined adjacent each other to form a blade head. A second adjacent blade core 1760 includes the same spacers 1700 in four respective openings, and when assembled on a blade shaft, the second blade core and spacer assembly is rotated 45° relative to the first blade core and spacer assembly 1780, so that the spacers 1700 on the second blade core 1760 contact the first blade core 1750 on a portion of the surface intermediate adjacent spacers 1700 on the first blade core. The first and second blade core and spacer assemblies together can form a blade assembly or blade head, and for a grinding or grooving assembly, additional blade assemblies can be included, for example up to 40 or more.

A spacer 1700 is positioned on the blade core by first inverting the spacer relative to the central axis of the blade core so that the first and second legs 1704 and 1706 point to the shaft opening and the first body portion (or the third body portion) lines up with the opening 1752. The spacer is then pressed into the opening until the first body portion extends to the opposite side of the blade core and the second body portion 1710 is substantially lined up with the blade core. The spacer is then pivoted 180° so that the first and second legs on the first body portion and the first and second legs on the third body portion point outward toward the perimeter. The second body portion is then positioned between the outer edge 1762 having a partial circular curvature and an inner edge 1764 also having a partial circular curvature. The spacer is then supported by the blade core to limit movement of the spacer in the plain of the blade core. Additionally, the first and second legs 1704 and 1706 of the first and third body portions sandwich the adjacent portion of the blade core, to thereby limit axial movement of the spacer relative to the blade core.

Figure 15:
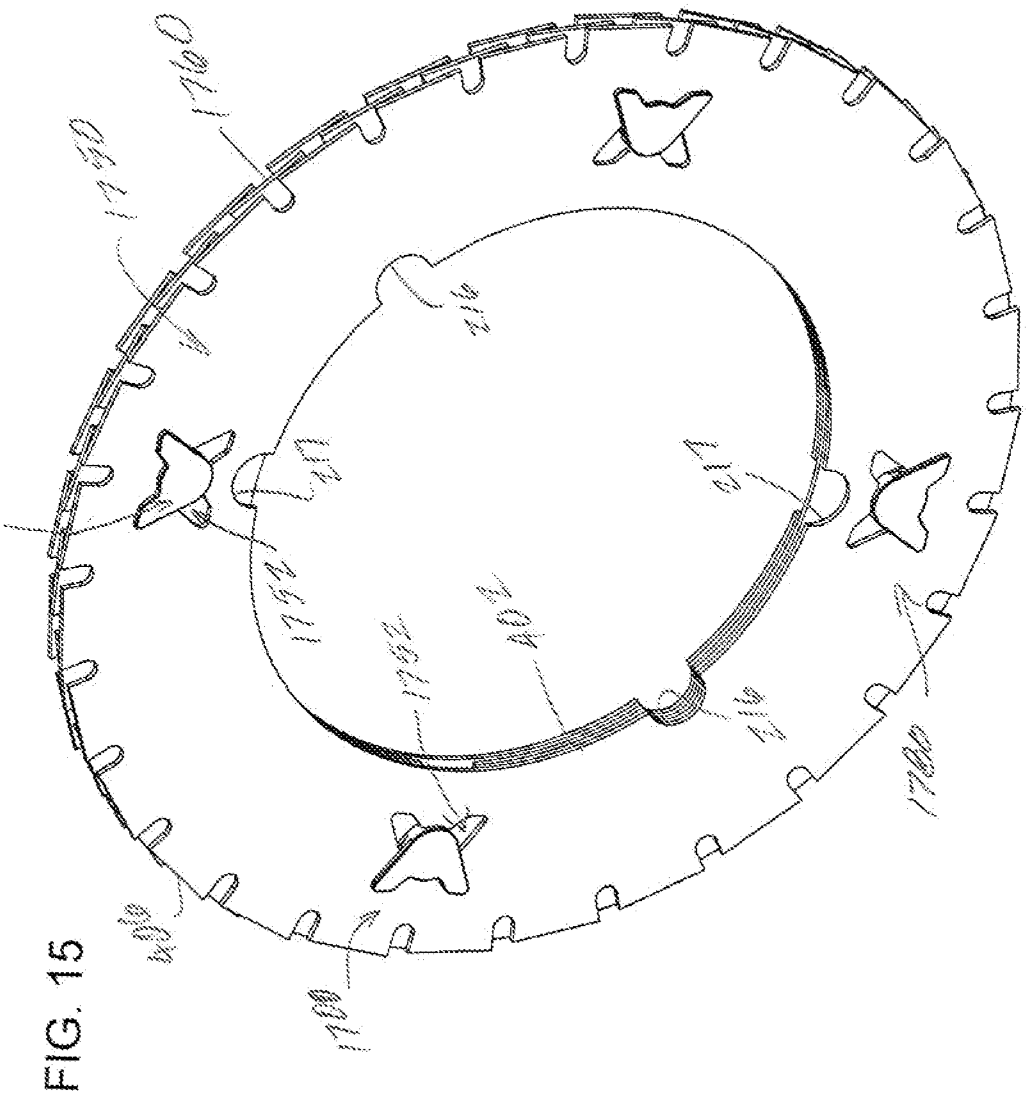
FIG. 15 is an upper isometric view of a further example of a plurality of blades that can be assembled on a shaft such as that shown in FIG. 2 having another example of spacers to position adjacent blades relative to each other.
Figure 17:
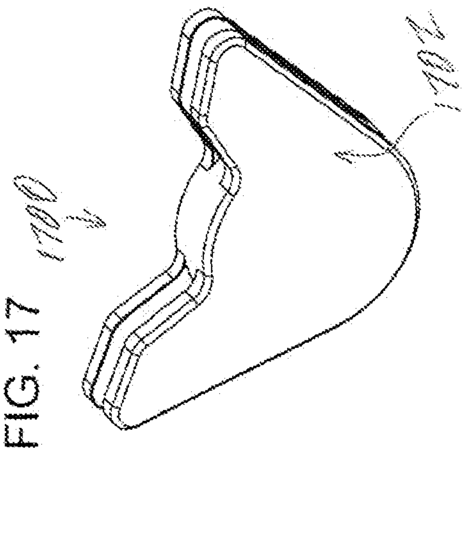
FIG. 17 is an upper isometric view of a spacer used in the assembly of FIG. 15.
Figure 18:
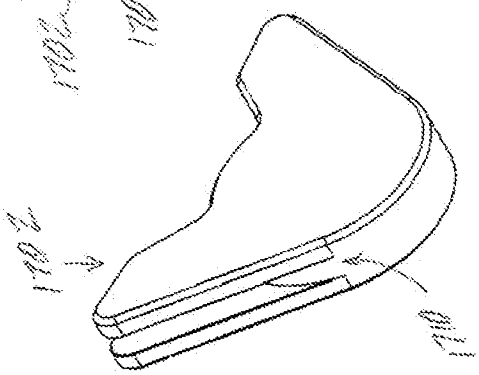
FIG. 18 is a lower isometric view of the spacer of FIG. 16.
Figure 19:
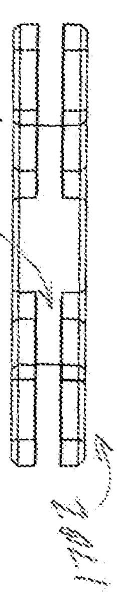
FIG. 19 is a top plan view of the spacer of FIG. 17.
Figure 20:
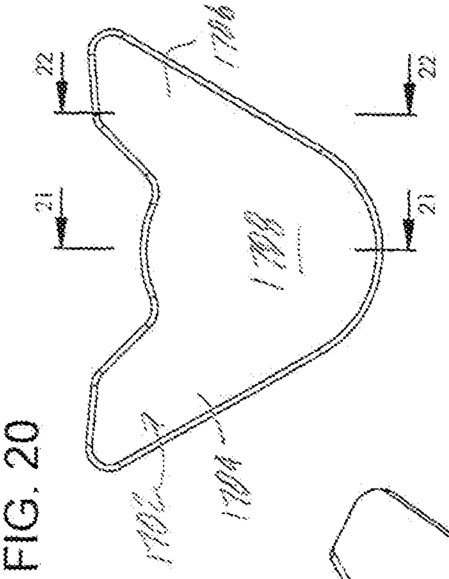
FIG. 20 is a front elevation view of the spacer of FIG. 17.
Figure 21:
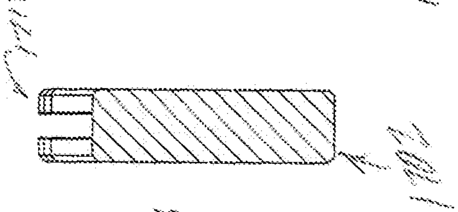
FIG. 21 is a vertical transverse cross-section of the spacer of FIG. 17 taken along line 21-21 in FIG. 20.
Figure 22:
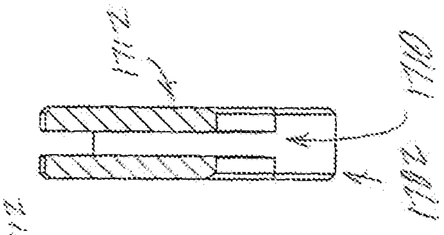
FIG. 22 is a vertical transverse cross-section of the spacer of FIG. 17 taken along line 22-22 in FIG. 20.

With the spacers positioned on the blade core as illustrated in FIG. 15, the widest portion of the spacer and the largest lateral coverage of the spacer across the adjacent surface of the blade core is closer to the perimeter than the rounded body portion 1708. This position of the spacer increases the effect of the spacing provided by the first and third body portions closer to the perimeter, where the blades are working on the subject material.

In another example of a spacer that can be used with blade cores and supported by a blade core, a spacer 2500 (FIGS. 23-31) is configured to be supported by a blade core, and in one configuration contact a portion of the blade core intermediate oppositely facing sides of the blade core, for example a wall of an opening formed in the blade core. The spacer 2500 includes a first body portion 2502 to serve as a spacer element between a blade core on which the spacer 2500 is supported and a next adjacent blade core. The first body portion is that portion of the spacer that extends along and outward from an adjacent surface of a blade core. The spacer 2500 also includes a second body portion 2504 extending away from the first body portion, for example substantially perpendicular to the first body portion. In the present illustrated example, the second body portion 2504 extends away from the first body portion a distance substantially equal to a thickness of a blade core on which the spacer 2500 is supported. The second body portion is defined by the thickness corresponding to the thickness of the blade core on which it is supported.

The spacer 2500 can be supported in a blade core, for example blade core 2600 (FIGS. 23 and 28-30), by a number of means. For example, the spacer can be supported in the blade core in an opening (not shown) that precisely fits the second body portion, for example in an interference fit or a close fit. Alternatively, the spacer can be supported in another opening such as that described with respect to FIGS. 23-23B that permits securement of the spacer in the opening mechanically, by welding, adhesive or other means for reliably holding the spacer in position.

In the present example, the spacer 2500 includes a third body portion 2506 (FIGS. 24-27) extending outward from the second body portion 2504 opposite the first body portion. The third body portion includes a wall that can help to position the spacer 2500 on the blade core, and also includes a structure to serve as a spacer element between the blade core on which the spacer is supported and a next adjacent blade core (different from the next adjacent blade core closest to the first body portion). While they can be different from each other, the first and third body portions are mirror images of each other about a plane bisecting the second body portion parallel to the blade core on which the spacer is supported. Therefore, the first body portion will be described in more detail.

The first body portion 2502 includes a first inner wall 2508 extending along an upper portion of the first body portion from a first end 2510 of the spacer to a second end 2512 and extends outward from the adjacent surface of the second body portion. The first inner wall extends outward substantially perpendicular to the second body portion, and is configured to extend substantially parallel to an adjacent surface of the blade core supporting the spacer. The height of the wall, or the recess of the second body portion is substantially the same between the first and second ends. The second body portion 2506 includes a first inner wall 2514 extending along the upper portion of the first body portion from the first end 2510 to the second end, and the height is substantially the same between the two ends. The second inner wall extends substantially parallel to the first inner wall, and to an adjacent surface of the blade core. The first inner walls of the first and second body portions form a channel 2516 extending between the first and second ends and has a channel bottom wall 2517, which is the upper, outwardly-exposed surface of the second body portion. The channel is configured to receive the exposed wall of an opening in the blade core so that the spacer can be positioned in the opening and supported by the blade core, which may be by either or all of contact with the channel bottom wall 2517 or being sandwiched between the first walls 2508 and 2514. Portions of the first and third body portions sandwich a portion of the blade core to help position the spacer laterally relative to the blade core. The spacing of the first walls of the first and third body portions can provide an interference fit, in which case the spacer can be reliably supported on the blade core during normal operation, especially with the centripetal force developed during rotation of the blade core. The spacing of the first walls can also provide a close fit, making it easier to position the spacer in the opening, but possibly allowing part of the spacer to disengage from the blade core, for example by an unintended impact. The closeness of the fit will help to determine how easy it is to position the spacer and how easy it is to dislodge it before a final assembly is complete. The spacing can also provide a clearance fit, in which case the spacer may be held in place by other means, such as a template, fixing structure or other temporary positioning device, or more permanent means such as welding, adhesive, or the like. Interference fit, close fit and clearance fit may apply equally over the entire length of the channel 2516, or the channel may have one fit configuration at one or several locations and other fit configurations at other locations of the channel, thereby providing some flexibility over the form of the fit between the spacer and the blade core.

In the present example, the first and third body portions include converging walls 2518 and 2520 (FIGS. 24, 25 and 27), respectively, at an approximate middle portion of the groove to assist in aligning the spacer with the blade core wall in the opening in which the spacer is to be positioned. The converging walls can extend along the groove 2516 as far as desired.

The first body portion includes an outwardly-facing wall 2522, facing opposite the first wall 2508. The outwardly-facing wall in the present example extends entirely around a perimeter of the first body portion, but other configurations can have the outwardly-facing wall arranged as segments around the perimeter of the first body portion or in selected locations of the first body portion. The thickness of the first body portion or the spacing between the first wall 2508 and the oppositely-facing wall 2522 directly opposite the first wall defines the desired spacing between adjacent blade cores. The oppositely facing wall 2522 is configured to contact the facing surface of an adjacent blade core. In one configuration, the oppositely facing wall 2522 can be a continuous flat surface top to bottom and side to side, forming the outermost surface of the first body portion, but in the illustrated example, the oppositely facing wall and all of the spacer is interrupted or discontinuous by way of an opening 2524 extending completely through the spacer. The opening 2524 can take any number of configurations, but in the present example has a geometry similar to the overall geometry of the spacer. Because of the existence of the opening 2524, the oppositely-facing wall 2522 forms a perimeter circuit around the first body portion.

In the spacer 2500, rather than the oppositely-facing wall 2522 forming the outermost surface of the first body portion, the first body portion also includes a boss or projection 2526 extending outwardly from the first body portion. The boss or projection 2526 forms a shoulder or perimeter wall 2528. The shoulder or perimeter wall 2528 in the present example extends around the entire portion of the first body portion, but may be formed in segments, bumps, dimples, tabs or other structures forming an equivalent or analogous structure to a shoulder or perimeter wall. The shoulder or perimeter wall is configured to engage an opening in an adjacent blade core having a geometry substantially matching that of the shoulder or perimeter wall. Engaging an opening in an adjacent blade core can be by interference fit, close fit or clearance fit, providing a desired amount of support between the two structures. With an interference or close fit, and in some respects a clearance fit, the spacer 2500 supported by its respective blade core can help to support the adjacent blade core, and vice versa.

In the illustrated configuration, the boss 2526 includes a substantially flat surface 2530. As described more fully below, the flat surface 2530 can bear up against a complementary flat surface on an adjacent spacer two blade cores away extending into the same opening in the adjacent blade core. Good contact between complementary flat surfaces can help to put an entire blade assembly under a compressive load to help strengthen the blade assembly and stabilize the blades in a blade head. Alternatively or additionally, the flat surface 2530 can define an outer boundary for the first body portion 2502 of the spacer to define the spacing between the blade core 2600 and the next adjacent blade core in the direction of the flat surface 2530. In one configuration, the spacing between such adjacent blade cores is represented by the spacing or thickness between the inside surface 2508 and the flat surface 2530 when the flat surface contacts the facing surface of such adjacent blade core. In a second configuration, the spacing between such adjacent blade cores is represented by twice the spacing or thickness between the inside surface 2508 and the flat surface 2530 when the flat surface contacts a corresponding flat surface on the boss or projection 2532 on a third body portion of a spacer supported by the next adjacent blade core. In the second configuration, the spacers on adjacent blade cores are not shifted 45°, and as a result, the spacers on adjacent blade cores are aligned.

In the present example of the spacer 2500, the third body portion includes an identical mirror image boss or projection 2532 and shoulder or perimeter wall 2534.

The spacer illustrated at 2500 has a deltoid geometry in front and rear elevation, and has substantially straight sides 2536 and 2538 (FIG. 26) meeting at the apex or junction in the area of the converging walls 2518 and 2520. In the other direction, they terminate at the first and second ends 2510 and 2512, respectively, to join the bottom 2540. The bottom 2540 has a concave curvature to accommodate a convex curvature in an opening in the blade core. The opening 2524 through the spacer converges to the center of the second body portion from the outside. The opening provides a measure of airflow through the blade cores and weight reduction in the overall assembly compared to a solid spacer configuration. Additionally, the geometry and/or the positioning of the spacer 2500 can be selected so as to provide a desired airflow in the spacing between adjacent blade cores, and/or between adjacent blade cores, for example through openings formed in a blade core and/or through the spacers. In one example, one side of the deltoid can be angled differently than another side of the deltoid to thereby affect fluid flow along the blade core and around the spacer.

Another example of a blade core for a grinding or grooving machine having one or more openings that are noncircular is illustrated in FIGS. 23-23B and 28-31. In this example, the blade core 2600 includes a wall defining a central opening 402 for a blade shaft and registration slots 216 and 217 for positioning the blade core on a blade shaft. The blade core has an arbor opening of at least 3 inches up to about 12 inches or more for being supported on the blade shaft for grinding or grooving. The blade core includes a noncircular opening, and in the present example a plurality of noncircular openings 2602 for receiving and supporting a respective spacer. In the example illustrated, there are four identical noncircular openings 2602, and only one will be described. In the present example, the opening 2602 has the same geometric profile as the spacer 2500, but the dimensions of the profile are different than the dimensions of the spacer 2500. As illustrated, the different dimensions allow the spacer to fit into a portion of the opening 2602 radially inward, and then allow the spacer to be moved radially outward to contact and engage a wall of the opening in a radially outward portion of the opening. The size of the spacer relative to the size of the opening allows either the first or third body portions to enter and pass through the opening 2602 from one side of the blade core to the other side. The geometric profiles can be different while the size of the spacer can be selected so as to permit the desired movement of the spacer in a respective opening in the blade core.

Figure 23:
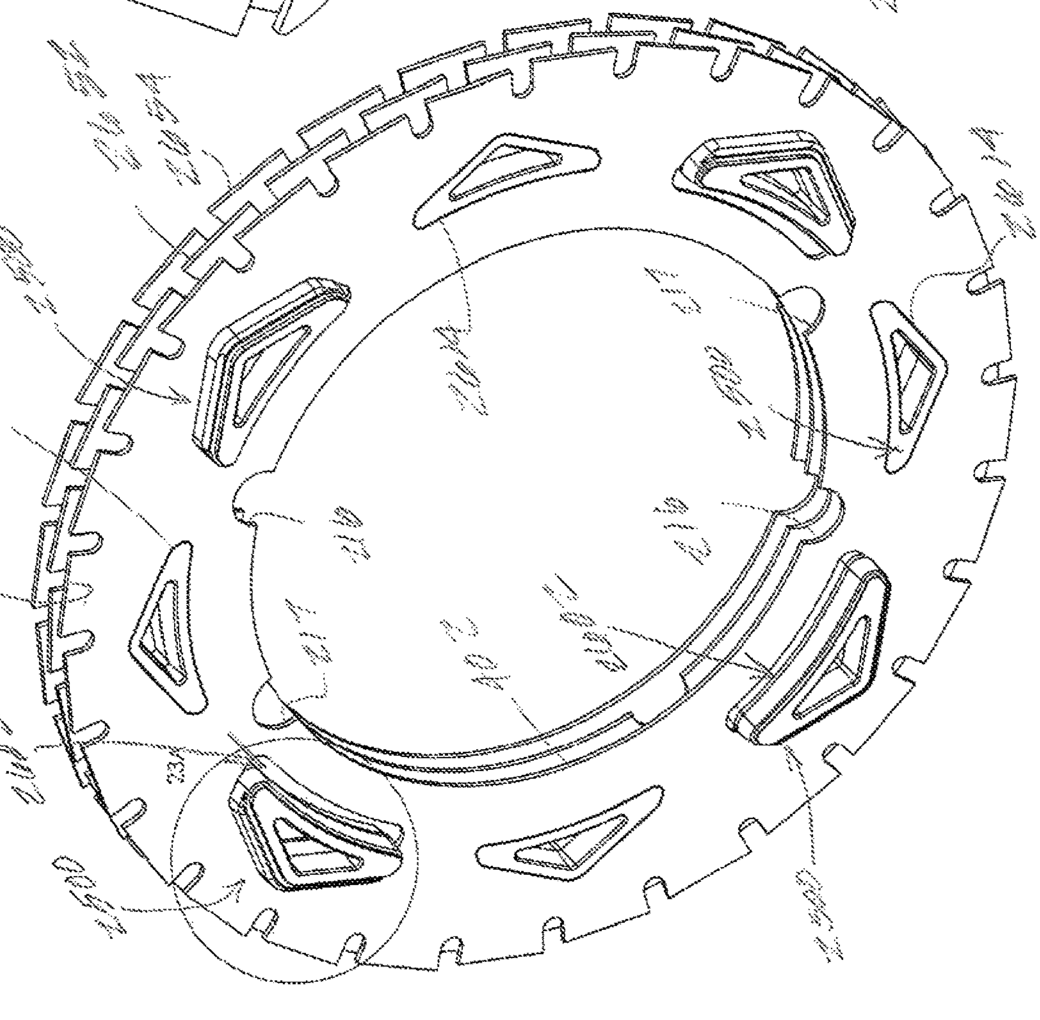
FIG. 23 is an upper isometric view of a further example of a plurality of blades that can be assembled on a shaft such as that shown in FIG. 2 having another example of spacers to position adjacent blades relative to each other.
Figure 23A:
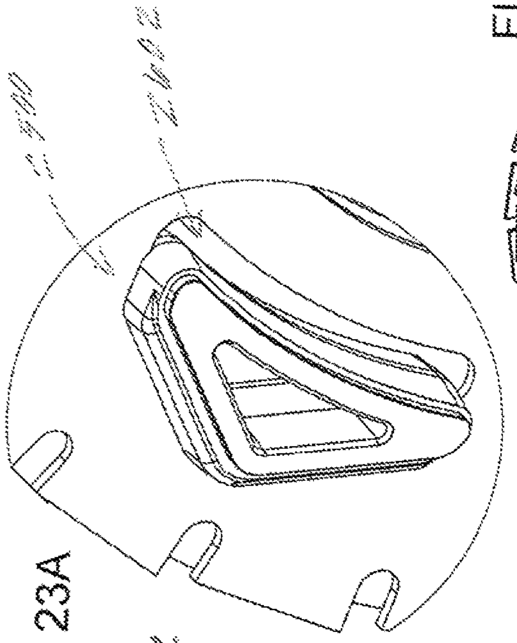
FIG. 23A is a detail view of a portion of the blade assembly of FIG. 23.
Figure 23B:
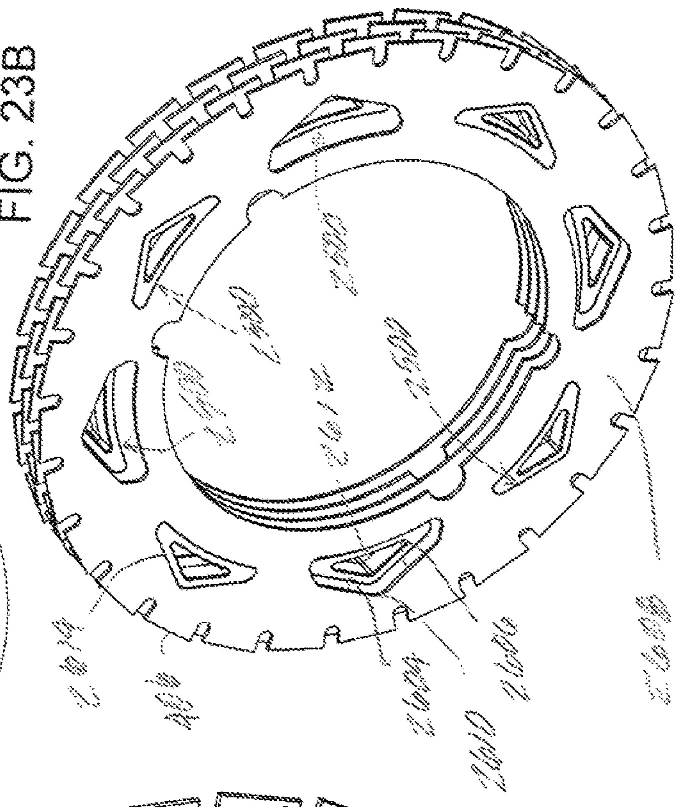
FIG. 23B is an upper isometric view of the blade assembly of FIG. 23 with an additional blade core positioned concentric with the other blade cores.
Figure 24:
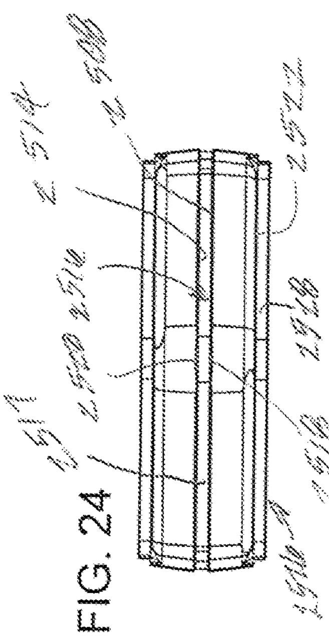
FIG. 24 is a top plan view of a spacer used in the assembly of FIG. 23.
Figure 25:
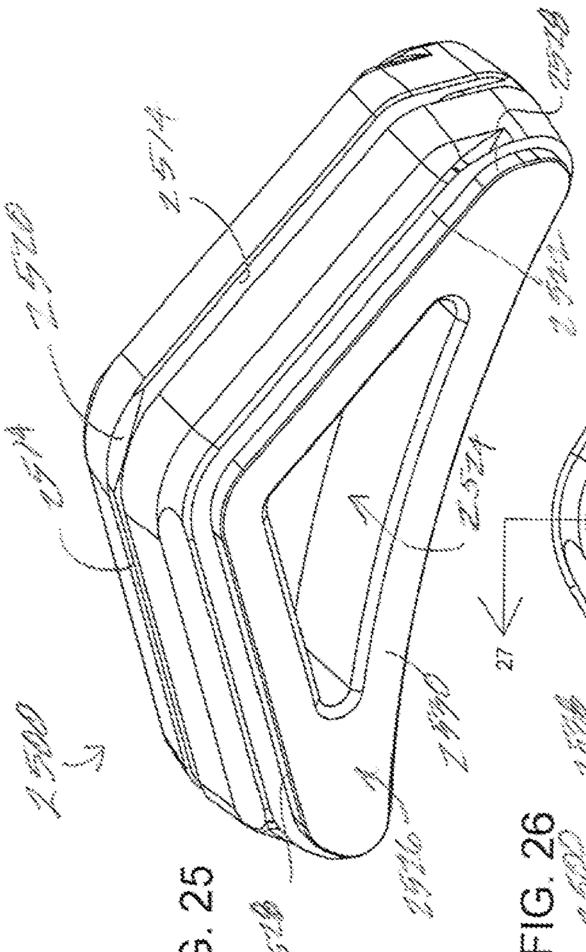
FIG. 25 is an upper isometric view of the spacer of FIG. 24.
Figure 26:
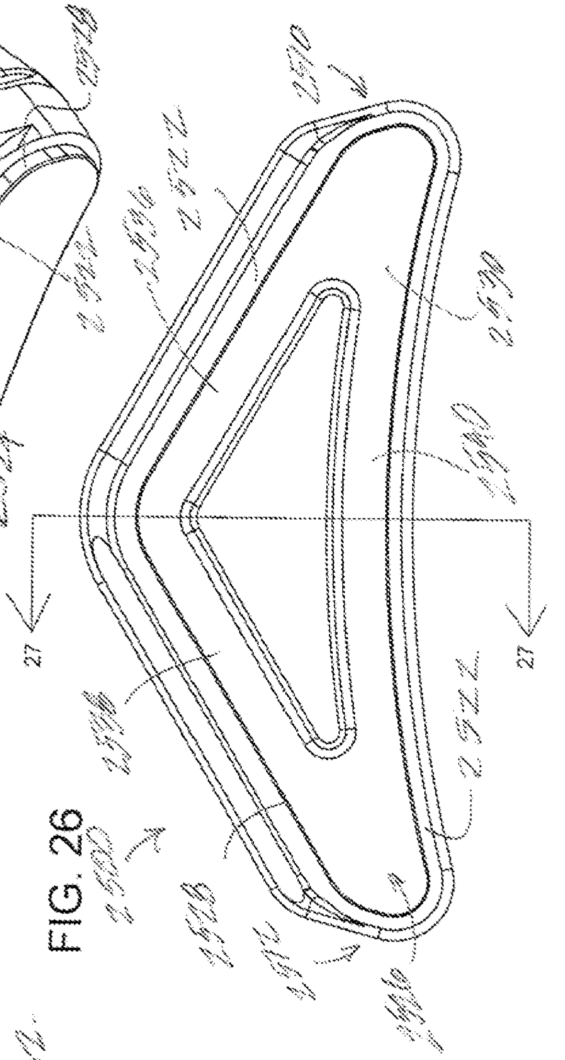
FIG. 26 is a front elevation view of the spacer of FIG. 24.
Figure 27:
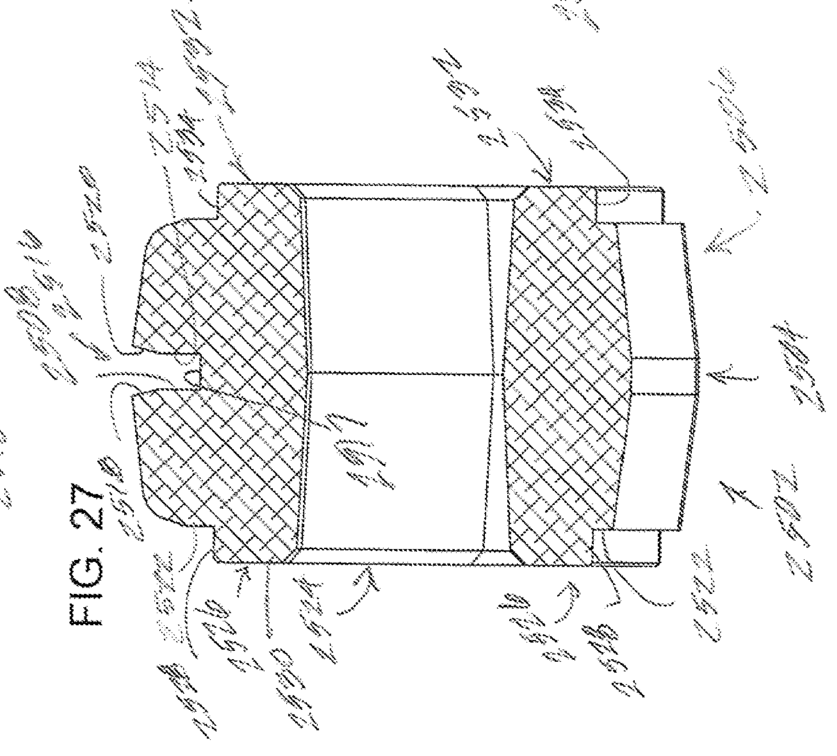
FIG. 27 is a vertical transverse cross-section of the spacer of FIG. 24 taken at the center of the spacer along line 27-27 in FIG. 26.
Figure 28:
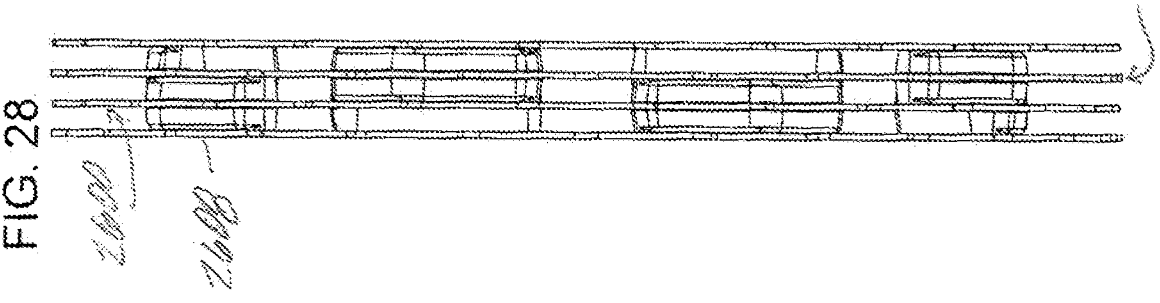
FIG. 28 is a side elevation view of the assembly of FIG. 23.
Figure 29:
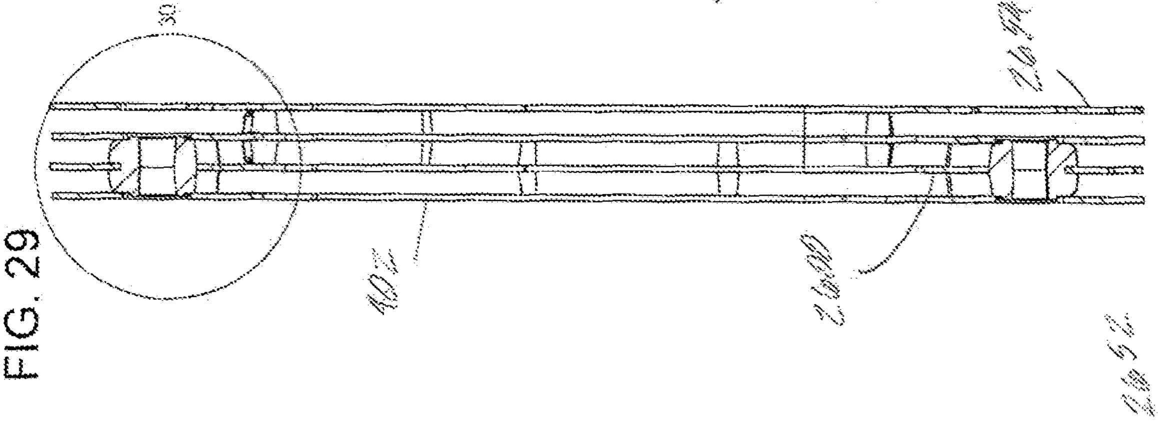
FIG. 29 is a transverse cross-section of the assembly of FIG. 23 taken at the location of diametrically opposite spacers.

In the present example, each opening 2602 has a deltoid configuration with first and second walls 2604 and 2606, shown for convenience on an adjacent blade 2608 in FIG. 23B, that converge toward each other to a junction 2610 outward in the direction of the perimeter 404. The walls are substantially straight outside the junctions 2610 and respective junctions with an opposite wall 2612, and are configured to fit into the groove 2516 in the respective spacer so that the bottom of the groove contacts respective portions of the exposed surfaces of the first and second walls 2604 and 2606, in other words the bottom of the groove contacts respective portions of the wall of an opening between the oppositely-facing surfaces of the blade core. The bottom of the groove can be configured to contact all or portions of the adjacent wall of the opening. The openings are substantially centered radially between the arbor opening 402 and the perimeter 404.

In one example of the blade core 2600 (not shown), the blade core 2600 can have one or more openings having the configuration and size shown in the drawings, and a plurality of such openings can be distributed substantially uniformly about the blade core, or otherwise. In one configuration, the blade core 2600 and have openings for receiving respective spacers only of the same configuration and size, and spacers 2500 or other suitable spacers are positioned in one or more of respective openings 2602 for providing desired spacing between the blade core 2600 and one or more adjacent blade cores such as a blade core 2600 having only openings substantially identical to opening 2602. In such a blade core and spacer assembly, the spacing between adjacent blade cores would be the spacing defined by the first or third body portion between the groove and the outermost face 2530 or 2532 in the situation where a spacer contacts and adjacent blade core surface intermediate adjacent openings 2602 (adjacent blade cores being shifted 45° with respect to each other), or would be the spacing defined by the spacer 2500 between the oppositely-facing side surfaces 2530 and 2532 on the first and third body portions (the spacer of one blade core contacting the adjacent spacer on the adjacent blade core).

Alternatively or additionally, the blade core 2600 can include an additional opening or a plurality of additional openings, each of which is different from the opening 2602. In the example illustrated in FIGS. 23-23B and 28-31, each blade core includes a secondary opening 2614 different from at least one characteristic of the openings 2602, which in the present example of the blade core 2600 may be termed primary openings 2602. The at least one characteristic of the openings 2602 in the present example is size, namely the surface area or dimensions of the openings 2614. In the illustrated configuration, the openings 2614 are smaller than the openings 2602, and specifically the opening size or the side profile is smaller in that the distance around the perimeter is less than that for the openings 2602. The shapes or geometry of the openings are substantially identical, and have a deltoid shape. In other configurations of the opening, the opening can be other than deltoid, the opening can be deltoid but having a different shape (triangular, oval, circular, or other shapes, such as where the spacer 2500 is deltoid but the bosses 2526 and 2532 are segmented and form only a triangular, oval, circular or other shape perimeter), or the opening can have a more simple (circular) or more complex geometry. The secondary openings 2614 can be larger than the openings 2602, and the spacers 2500 can be configured so that the bosses on the first and third body portions engage such larger openings, but spacers for being supported in openings 2602 and for engaging larger openings 2614 in adjacent blade cores may be more costly to manufacture.

The secondary openings 2614 can be positioned at any number of locations on the blade core 2600. As illustrated, the secondary openings 2614 are positioned intermediate the openings 2602, and in equal number. They are positioned radially approximately equidistant between the blade shaft opening 402 and the perimeter 404.

In a further example of a blade core and spacer assembly, a blade core and spacer assembly 2650 (FIGS. 23-23B and 28-31) includes the blade core 2600 (with or without secondary openings) and the desired number of spacers 2500, and multiple such blade core and spacer assemblies can be combined adjacent each other to form a blade head. A second adjacent blade core such as 2608 and/or further blade cores 2652 and 2654 can be assembled with respective sets of spacers 2500 supported by the blade core and assembled on a blade shaft to form a blade head. In the illustrated example, the second blade core 2608 includes the same spacers 2500 in four respective openings, the third blade core 2652 includes the same spacers 2500 in four respective openings, and the fourth blade core 2654 includes the same spacers 2500 in four respective openings. Each spacer is positioned in the same way on its respective blade core, with the first or third body portion of a spacer inserted into a respective opening 2602, at the radially-inward portion of the opening. When the channel 2516 aligns with the blade core, the spacer is maneuvered so that the blade core opening wall facing the channel injures the channel between the converging walls 2518 and 2520 and into the channel between the walls 2508 and 2514. In one configuration, the adjacent wall of the blade core opening will seat against the bottom wall 2517 of the channel, for example along the length of the entire surface of the bottom wall. The walls 2508 and 2514 of the channel can be configured to provide an interference fit, close fit or clearance fit over all or a portion of the channel with the adjacent surfaces of the blade core, as desired.

Figure 30:
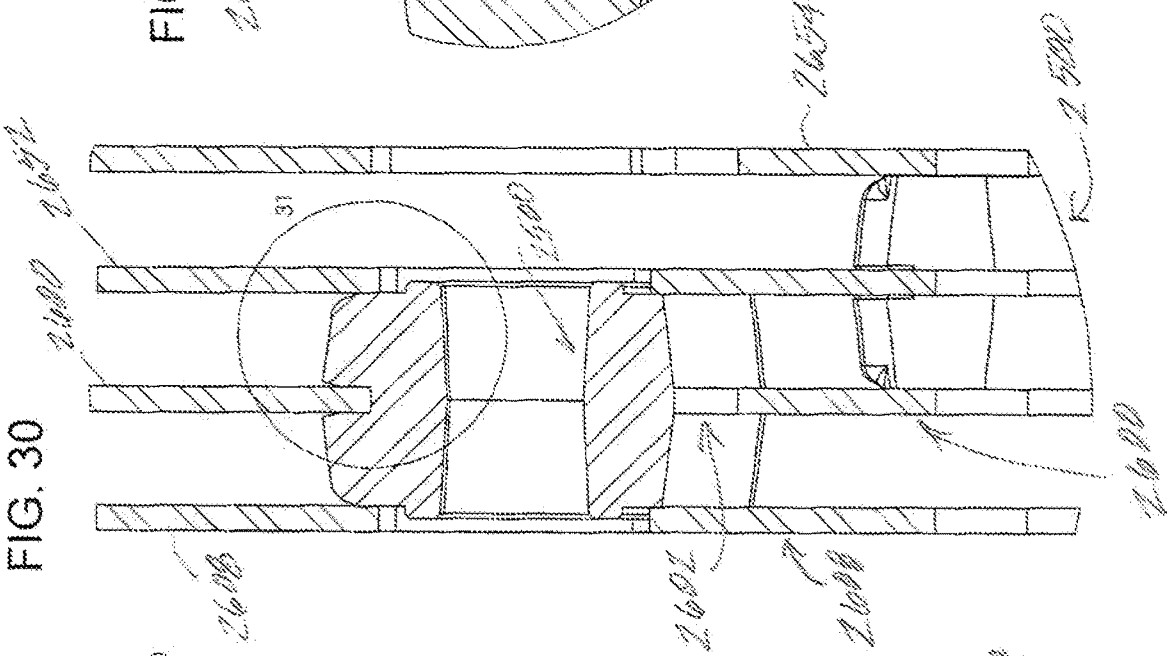
FIG. 30 is a detail of the cross-section of FIG. 29 of the blade assembly of FIG. 23.
Figure 31:
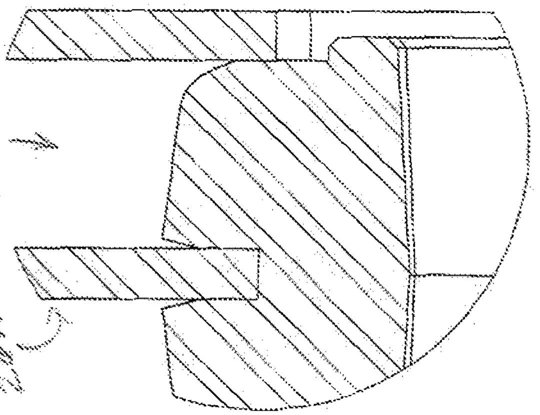
FIG. 31 is a detail of a spacer and blades illustrated in FIG. 30.
Figure 33:
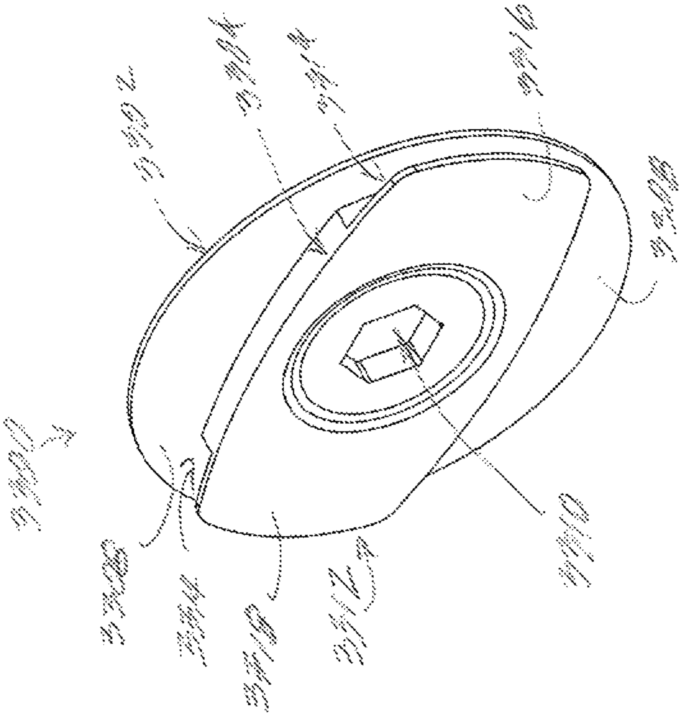
FIG. 33 is an isometric view of a spacer used in the assembly of FIG. 4.

When assembled on a blade shaft, the second blade core 2608 is rotated 45° relative to the first blade core 2600, the third blade core 2652 also rotated 45° relative to the first blade core, and the fourth blade core in the same orientation as the first blade core 2600, but rotated 45° relative to the third blade core 2652. In such configuration, spacers on a given blade core are supported by such blade core so that the spacer cannot move much in the direction of the blade perimeter, because of the blade in the channel, and in the present example engagement of the blade core with a respective channel 2516 in the spacer 2500 helps to support the spacer laterally or axially of the blade core. Spacers on a given blade core, for example on the blade core 2600 in the illustrated example, are configured so that the bosses 2526 fit into secondary openings 2614 on the adjacent blade core 2608, and so that the bosses 2532 on the third body portion fit into secondary openings 2614 on the additional blade core 2652. The adjacent side surfaces on the blade core 2608 contact the walls 2522 on the first body portion of the respective spacer, and the adjacent side surfaces on the blade core 2652 contact the walls on the third body portion of the respective spacer. The bosses on the spacer can be configured to provide an interference fit, close fit or clearance fit, a close fit providing reliable assembly and support of the blade cores with the spacers. Additionally, the spacers 2500 on the second blade core 2608 have the bosses 2532 on the third body portions extending into respective ones of secondary openings 2614 on the blade core 2600, and likewise with such spacers and an adjacent blade core on a side of the second blade core 2608 opposite the blade core 2600. Additionally, the blade core 2652 includes respective spacers similarly engaging the same secondary openings 2614 as are engaged by the bosses on the third body portion of the spacers 2600 on the second blade core 2608. The heights of the bosses 2526 and 2532 on the first and third body portions of the spacers are approximately, and preferably identical to approximately one half or between 40%-50% of the width of the blade cores in the blade head assembly so that a given blade core is engaged by respective spacers on adjacent blade cores on each side of the given blade core. For example, for a 2.67 mm blade thickness, the height of each boss 2526 and 2532 is about 1.30 mm, which provides a gap of approximately 0.07 mm between adjacent spacers 2500 on adjacent blade cores, for example 2600 and 2654 when the boss 2532 on the third body portion of one spacer is adjacent the boss 2526 on the first body portion of the adjacent spacer. The 0.07 mm gap allows for tolerance in the assembly, and a measure of compression if there is any spacing between a blade core and an adjacent spacer body portion. FIG. 30 illustrates a first spacer 2500 in the upper portion of the Figure and a second spacer 2500 in a lower portion of the Figure, the two spacers in the assembly being positioned 45° apart in the assembly.

Figure 70:
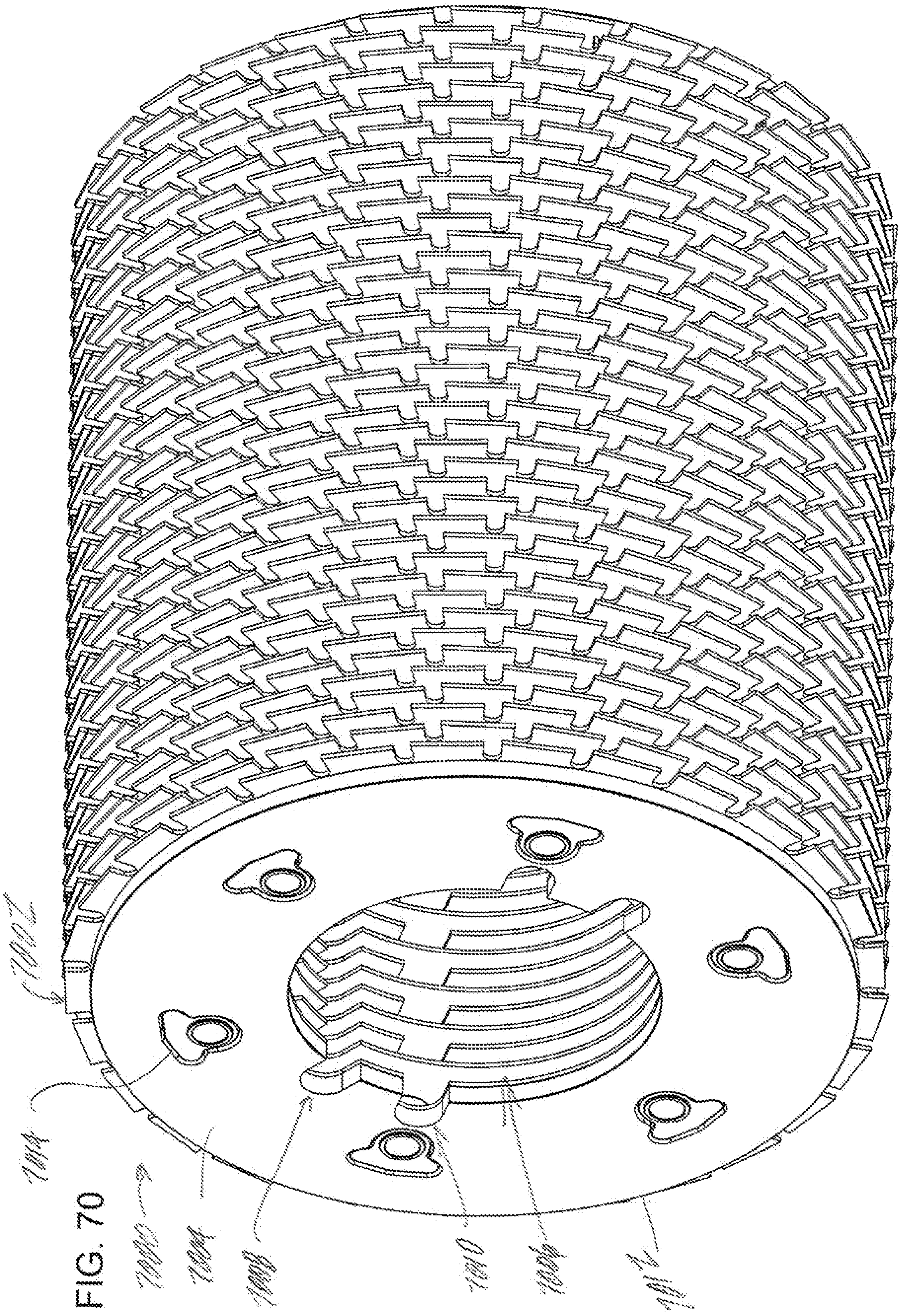
FIG. 70 is a side isometric view of an assembly of blades that can be assembled on a shaft such as those shown in FIGS. 2 and 3 with a structure for adapting a pressure plate two and assembly of blades having spacers.

The blade cores 2600 and 2608 together can form a blade assembly or blade head, and for a grooving or grinding assembly, additional blade assemblies can be included, for example up to 40 or more. The blade cores can be mounted on a blade shaft assembly such as that illustrated in FIG. 2, and respective adapter plates placed over respective ends of the blade assembly. An adapter plate, such as that shown in FIG. 70, is used to adapt an end blade core and its spacers to a pressure plate such as a pressure plate 212 on the shaft assembly to accommodate the un-mated spacers on the end blade core. A first adapter plate is placed against the base-plate 210 (FIG. 2) and then a first blade core and spacer assembly is positioned so that respective spacers are accommodated by recesses or cavities in the adapter plate and a registration slot 216 placed on the key 208. A next blade core and spacer assembly is then positioned on the first blade core and spacer assembly, but rotated 45°, so that a second registration key 217 registers with the key 208, and first bosses 2526 engage secondary openings in the second blade core, and bosses 2532 on the third body portion of a respective spacer fit into corresponding secondary openings in the first blade core and spacer assembly. Subsequent blade core and spacer assemblies are rotated and position in like manner until all of the blade core and spacer assemblies are placed on the blade shaft. Another adapter plate is placed on the last blade core and spacer assembly, with recesses or cavities fitting over corresponding spacers and against the last blade core, so that pressure applied by the pressure plate 212 produces compression of the entire blade assembly between the baseplate 210 and the pressure plate 212. Such a blade assembly is more stable and secure when pressure is applied to the blade assembly by the pressure plate. The resulting compression stabilizes each blade core in the area of each of the spacers, which is also in areas adjacent the perimeter where the working surfaces are applied.

In an assembly of blades such as those described with respect to FIGS. 23-31, the spacing between adjacent blades is determined by whether or not each adjacent blade core includes respective spacers, whether adjacent blade cores are rotated relative to each other, and whether or not each blade core includes secondary openings.

Figure 32:
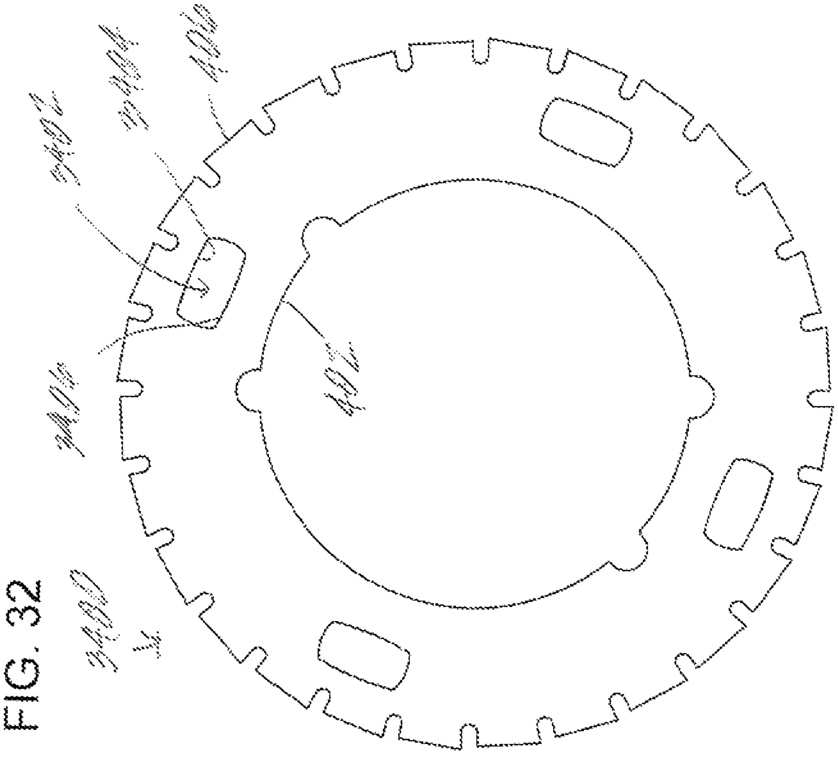
FIG. 32 is a front elevation view of a blade for use with the assembly of FIG. 4.
Figure 37:
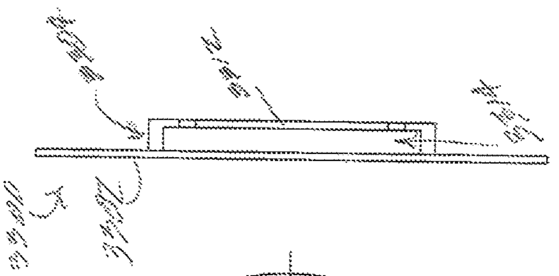
FIG. 37 is a side elevation view of the spacer of FIG. 36.
Figure 35:
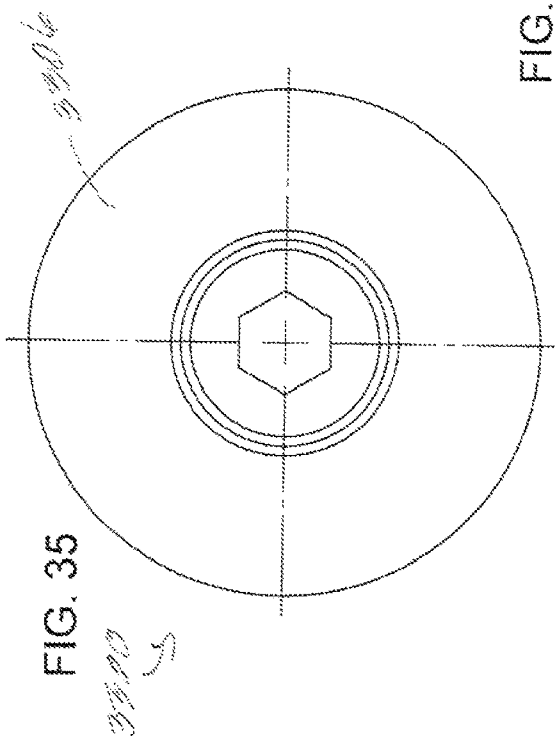
FIG. 35 is a front elevation view of a spacer used in the assembly of FIG. 4.
Figure 36:
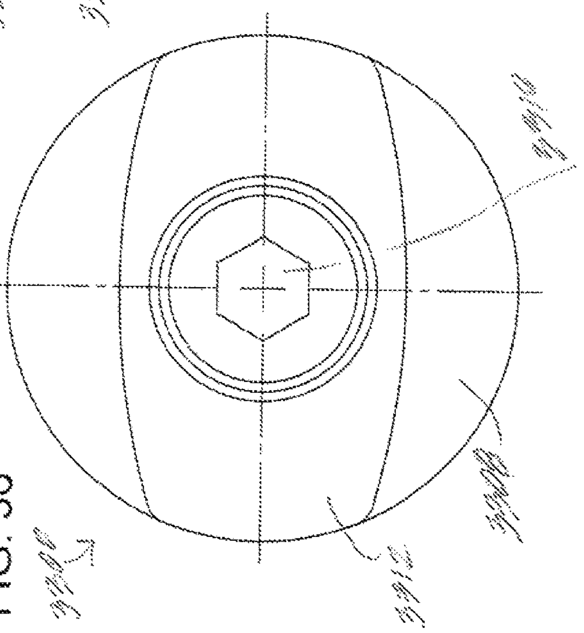
FIG. 36 is a rear elevation view of the spacer of FIG. 35.
Figure 34:
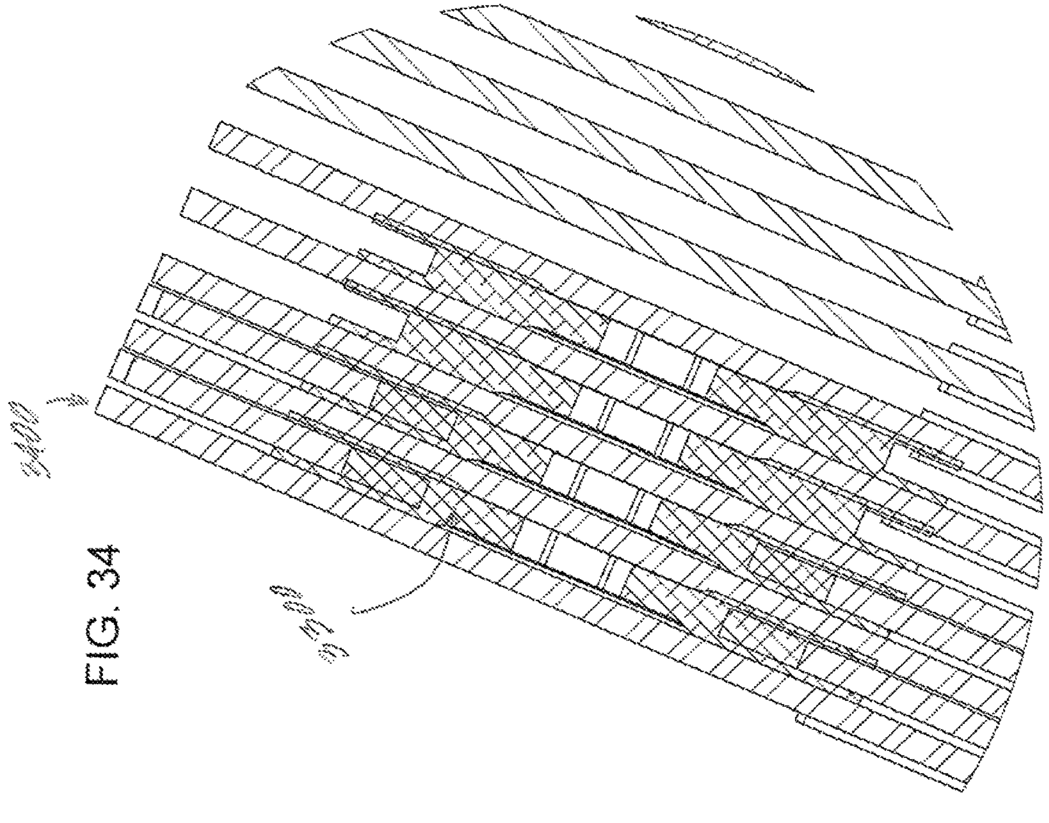
FIG. 34 is a detail of a cross-section of part of the assembly of FIG. 4 showing blades and spacers.

Another example of a spacer configured to be supported by a blade core includes spacer 3300 (FIGS. 32-37) having a first body portion 3302 and a second body portion 3304. The second body portion is configured to be supported by a blade core 3400 (FIGS. 32 and 34). The spacer can be used alone or with additional identical spacers on a blade core, or in combination with other spacers described herein. The first body portion 3302 extends in a plane substantially parallel to a blade core by which it is supported, and in the illustrated example is substantially flat and circular. The first body portion has a height or thickness in a direction perpendicular to a plane containing the first body portion an amount that is selected to be equal to the desired spacing between adjacent blade cores. The first body portion includes an outer surface 3306 to contact an adjacent blade core, and an inner surface 3308 for contacting an adjacent surface of the blade core supporting the spacer 3300, and the inner and outer surfaces face in opposite directions.

The second body portion 3304 extends away from the interface 3308 of the first body portion. The second body portion is configured to contact a portion of the blade core 3400 between oppositely-facing surfaces of the blade core through an opening 3402 (FIG. 32) through the blade core intermediate the blade shaft opening 402 and the perimeter 404. The height or thickness of the second body portion 3304 is substantially the same as the thickness of the blade core 3400. The geometry of the second body portion 3304 is substantially a rounded rectangle having curving or convex sidewalls and curving or convex end walls. The convex end walls are dimensioned to fit between curved sidewalls 3404 and 3406 in the blade core 3400. The walls of the second body portion contacts at least part of one or more walls in the blade core, so that the blade core can support the spacer at least in a direction parallel to a plane of the blade core, for example radially.

The first and second body portions 3302 and 3304 are formed monolithic and solid, but can be otherwise, and in the present example includes an opening 3310 for receiving a tool to pivot the spacer 3300. As illustrated, the opening 3310 is a hexagonal opening, which can receive a hexagonal wrench, for example. With the spacer 3300, the first and second body portions do not have the same geometries, but the first body portion can be noncircular. The spacer 3300 can be held in position by a number of means, including interference fit, adhesive, welding, mechanical means or other means for reliably positioning the spacer in the opening 3402 in the blade core. Alternatively or additionally, the spacer 3300 is held in place relative to the plane of the blade core in the opening in the blade core by a third body portion 3312. In the present example the third body portion 3312 extends outward from the opening 3310 and includes convex sidewalls and convex end walls slightly smaller than the walls of the opening 3402 in the blade core so that the third body portion can fit easily through the opening until the inner wall 3308 of the first body portion contacts the adjacent side of the blade core. The third body portion forms a pair of oppositely-facing grooves 3314 between wings 3316 and 3318 of the third body portion and respective opposite surfaces on the inside face 3308. The depth or width of the grooves is approximately the same as a thickness of the blade core 3400. The third body portion can take a number of geometric shapes or configurations, but in the present example the geometry of the third body portion is selected so as to fit into an opening in a blade core, for example blade core 3400, and to help secure the spacer in position on the blade core together with the first body portion when the spacer is pivoted at least partly in the opening 3402. In the example illustrated, the spacer is best held in position when the spacer is pivoted 90°. The third body portion has a height or thickness in a direction perpendicular to the plane of the blade an amount that is selected to be equal to the desired spacing between adjacent blades, and in the present example identical to the height or thickness of the first body portion 3302. As illustrated, the width of the grooves 3314 and therefore the blade core is greater than the width or height of the first and second body portions.

The configuration of the spacer 3300 and the blade core 3400 can be used to assemble a blade core and spacer assembly, and multiple blade core and spacer assemblies can be used to form a blade assembly or blade head. For example, blade heads for grinders and groovers can have as many as 40 blades or more, such as the blade core and spacer assembly represented in FIGS. 32-37, and adjacent blade core and spacer assemblies can be positioned so that the spacers on one blade core are offset 45° from the spacers on adjacent blade core. As illustrated, each blade core has for openings 3402, but can have fewer or more, with respective spacers 3300. The openings 3402 are distributed evenly about the blade core, and each opening is positioned approximately intermediate the blade shaft opening 402 and the perimeter 404, and in one example on an annulus coinciding with the circular arrangement of the fasteners of the pressure plate. Each spacer is positioned on the blade by inserting the third body portion 3312 into the respective opening 3402 until the second body portion 3304 is coplanar with the blade core. The spacer is then pivoted 90°, for example manually or with a tool, so that the first and third body portions sandwich the blade core, and adjacent portions of the blade core are positioned in the grooves 3314. The assembly of blade core and spacers can be repeated as desired to produce a blade assembly (blade core and spacer assemblies with working surfaces applied), and multiple blade core and spacer assemblies can be combined into a blade head. With adjacent blade core and spacer assemblies shifted 45° relative to each other, each set of four spacers in a respective blade core provides spacing functions of eight spacers for two blade core assemblies facing each other, and the spacing between adjacent blade cores is determined by the height or thicknesses of the first and third body portions. Different alignments can be used to produce different spacings.

Figure 39:
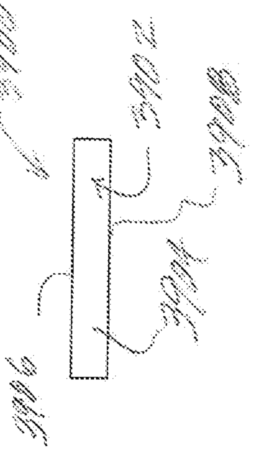
FIG. 39 is a side elevation view of a spacer used in the assembly of FIG. 38.
Figure 38:
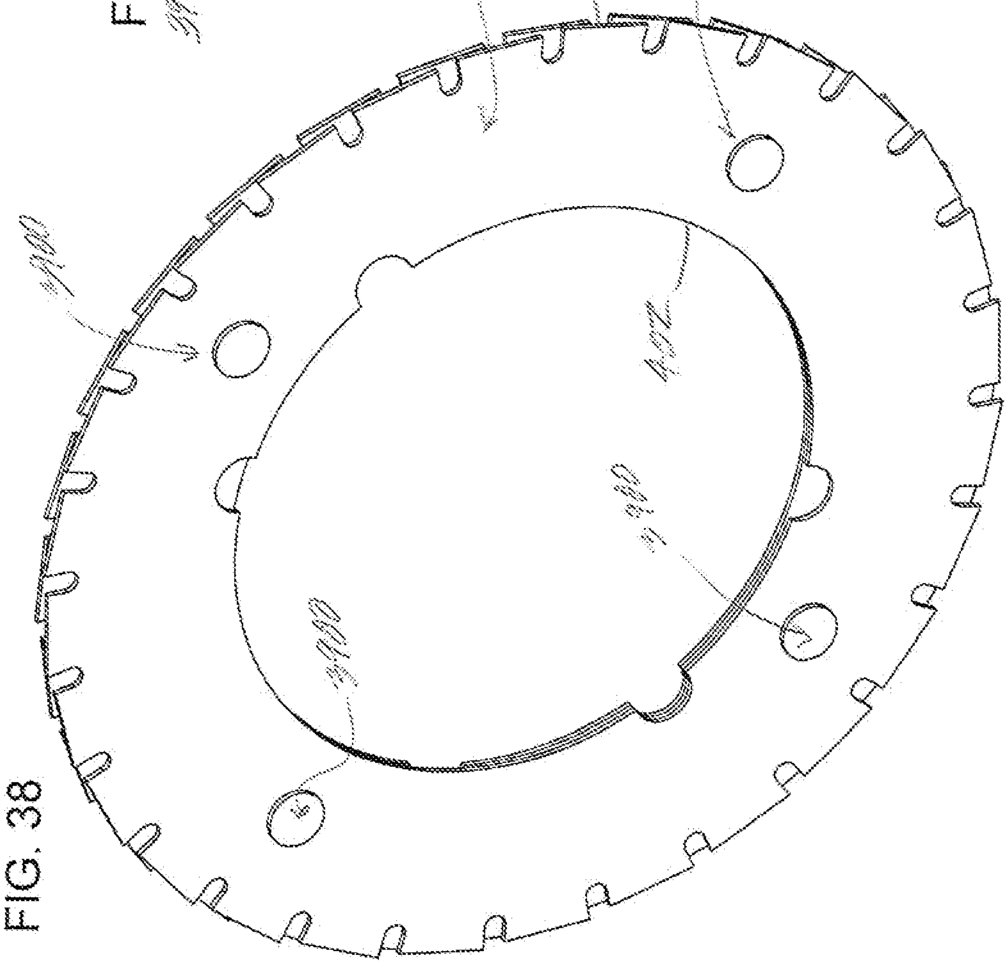
FIG. 38 is an upper isometric view of another example of a plurality of blades that can be assembled on a shaft such as that shown in FIG. 2 having another example of spacers to position adjacent blades relative to each other.
Figure 42:
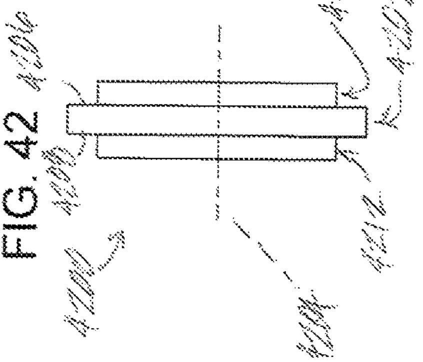
FIG. 42 is a side elevation view of the spacer shown in the assembly of FIG. 40.

In another example of a spacer for use with a blade core, for example a blade core for use in a grinding or grooving head, a magnetic spacer 3900 (FIGS. 38-39) includes a first body portion 3902. As illustrated, the first body portion is a right circular cylindrical disc, but can take any number of configurations. The magnet includes a circular perimeter surface 3904, a first flat surface 3906 and a second flat surface 3908, wherein one of the flat surfaces is placed against an adjacent surface of a blade core 3950. In one configuration, the surface of the blade core 3950 is uniformly flat, and the magnetic spacer 3900 is placed on the flat surface. In another configuration (not shown), the blade core includes a circular or other geometric depression corresponding to the geometry of the magnetic spacer 3900, and the spacer is placed in the depression. In the configuration of a flat surface, the blade core supports the spacer by a magnetic interaction between the magnet and the magnetic field produced by the magnet and the adjacent surface of the metal blade core. In the configuration of a blade core having a depression, the blade core supports the spacer both by a magnetic interaction and by mechanical interaction. In the present example, the spacer has only a first body portion, but in another example (not shown) the spacer can include a second body portion for extending into an opening formed in the blade core for supporting the spacer. The spacer alternatively or additionally can be held in position on a blade core by any number of other means, including those described herein.

The magnetic spacer can be used alone or in combination with identical spacers or with other spacers described herein. In the example illustrated, four spacers 3900 are distributed equidistant from adjacent ones of each other about the circumference of the blade core 3950. Other blade cores including adjacent blade cores making up the blade assembly include corresponding spacers, and in the example of magnetic spacers, the blades can be shifted 45° so that spacers on adjacent blade cores alternate positions, or each blade core can have magnetic spacers 3900 positioned on both sides of the same blade core at the same angular positions, and an adjacent blade core identically configured shifted 45° so that each blade core is supported by eight spacers. The spacers can be positioned as desired relative to the blade shaft opening 402 and the perimeter 404, but in the present example the spacers are positioned on an annulus substantially coincident with an annulus of the fasteners on the pressure plate. Multiple blade core and spacer assemblies can be combined on a blade shaft, for example that illustrated and described with respect to FIG. 2, to form a blade head, for example for a grinder or groover.

Figure 41:
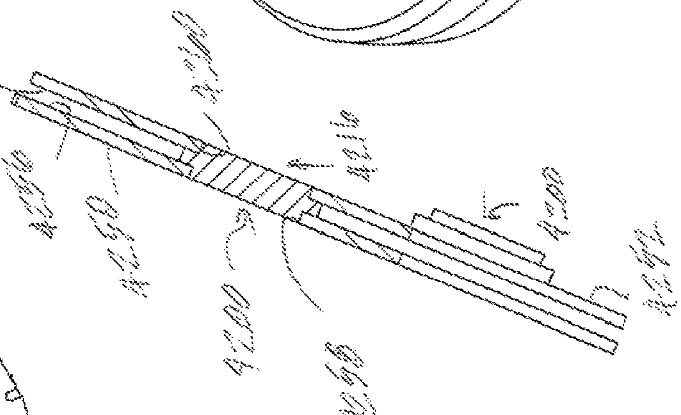
FIG. 41 is a detail of a cross-section of the assembly of FIG. 40 taken along 41-41 in FIG. 40 showing blades and spacers in the assembly.
Figure 40:
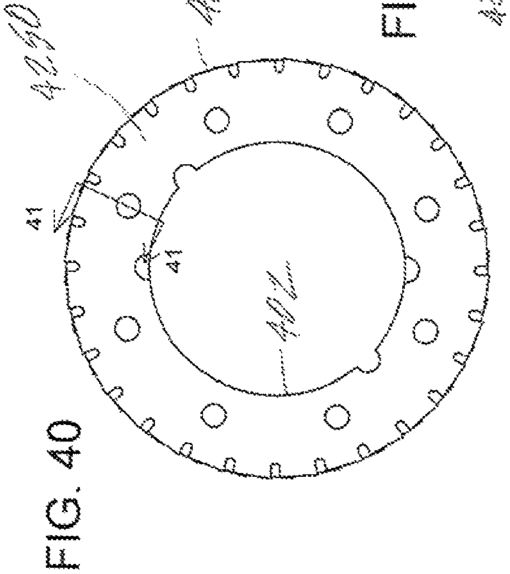
FIG. 40 is a front elevation view of another example of a plurality of blades that can be assembled on a shaft such as that shown in FIG. 2 having another example of spacers to position adjacent blades relative to each other.

In another example of a spacer for a rotary working blade core, a spacer 4200 can be configured to engage a portion of a blade core, for example a blade core for a grooving or grinding head, that can be used on a grooving or grinding machine. The spacer 4200 includes a first body portion 4202 that extends in a first direction, for example along an axis 4204 from a first side 4206 to a second side 4208. The distance in the first direction, for example from the first side 4206 to the second side 4208 of the first body portion can be used to define a spacing between adjacent blade cores, for example a first blade core 4250 and 4252 (FIGS. 40-41). In the present configuration, the thickness defines the maximum spacing between adjacent blade cores. The first body portion is mounted on or supported by the first blade core, and the axial distance or thickness of the first body portion is used as a spacer between the first blade core 4250 and the second blade core 4252, and likewise with other blade cores on which the spacer 4200 is used. The first body portion includes respective surfaces on the first and second sides 4206 and 4208 facing respective surfaces 4254 and 4256 (FIG. 41), and in the illustrated example, all of the respective surfaces are used to contact the adjacent blade core surfaces for providing the spacing defined by the thickness of the first body portion. In another configuration, the surfaces can include respective bosses, bumps or dimples, for example, that would contact the adjacent blade core surfaces, and the spacing defined by the first body portion would be the spacing defined by the maximum thickness between the outermost surfaces of such bosses, bumps or dimples.

The spacer 4200 first body portion extends outwardly to a perimeter surface 4210, which in the illustrated example is a circular circumferential surface, but can take other geometries. The first body portion extends in a direction parallel to a plane of the blade core in which the spacer is supported, and the first body portion in the illustrated configuration is a substantially right circular cylinder, though it can take other configurations.

The spacer 4200 also includes a second body portion 4212 extending adjacent the first body portion and along the axis 4204. In the present example, the first body portion and the second body portion are concentric about the axis. The second body portion forms a blade engagement structure for limiting movement of the spacer, for example the first body portion, in a direction parallel to the plane of the blade core. The second body portion is configured to contact a portion of the blade core 4250 between oppositely-facing surfaces of the blade core. In the present example, the second body portion extends into an opening, in the illustrated example a circular opening 4258 in the blade core 4250, but the geometry of the second body portion and the opening in the blade core can be other than circular. In many cases, the profile or geometry of the second body portion and the profile or geometry of the opening in the blade core are the same or substantially the same. In the illustrated example, the second body portion is a right circular cylinder, but can take other geometric configurations that can also permit the second body portion to contact a wall of an opening in the blade core, for example so that the blade core can support the spacer, such as in a direction parallel to a plane of the blade core. Also in the present example, the second body portion is solid, but need not be, and the first and second body portions have the same geometric profile in cross section, but can be otherwise. In the example of a cylindrical second body portion 4212 and a circular opening 4258 in the blade core, the blade core supports the spacer in a radial direction relative to a center of the blade core, and in all 360° in a plane of the blade core. For a noncircular opening in a blade core, it is possible that the spacer would not be supported by contact at all 360° directions in a plane parallel to the blade core. The second body portion 4212 has a thickness approximately the same as a thickness of the blade core 4250, taking into account tolerances and the like, and may have a thickness that accommodates easy positioning of the spacer in the opening in the blade core while still allowing the first body portion 4202 to maintain the desired spacing between the blade core 4250 and the adjacent blade core 4252 which the side 4206 will contact when the blade cores are assembled to be adjacent each other.

The spacer 4200 having first and second body portions can be held in position in an opening in the blade core 4250 by any number of means, including any of those discussed herein, including interference fit, adhesive, welding, mechanical means or other means for reliably positioning the spacer in the opening 4258 in the blade core 4250, and the first and second body portions are the only body portions forming the spacer. Additionally or alternatively, the spacer 4200 includes an additional or secondary second body portion 4216. The additional second body portion forms a blade engagement structure for limiting movement of the spacer, including the first body portion, in a direction in the plain of the blade core, for example blade core 4250, and the blade core 4252. In the present example, the first body portion 4202 and the primary second body portion 4212 and the additional second body portion 4216 are concentric about the axis 4204. The additional second body portion is configured to contact a portion of the blade core 4252 between oppositely-facing surfaces of the blade core. The additional second body portion generally has the identical structure and function as the primary second body portion 4212, but may be otherwise. In the present example, the additional second body portion extends into an opening, in the illustrated example a circular opening 4260 (FIG. 41) in the adjacent blade core 4252, but the geometry of the additional second body portion and the opening in the adjacent blade core can be other than circular. In many cases, the profile or geometry of the additional second body portion and the profile or geometry of the opening in the additional blade core are the same or substantially the same. In the illustrated example, the additional second body portion is a mirror image of the primary second body portion 4212, in the illustrated example a right circular cylinder extending away from the first body portion 4202 in a direction opposite the primary second body portion 4212. Alternatively, the additional second body portion can take other geometric configurations that can also permit the additional second body portion to contact a wall of an opening in the adjacent blade core, for example so that the adjacent blade core can support the spacer 4200 such as in a direction parallel to a plane of the blade core. Also in the present example, the additional second body portion is solid, but need not be, and the geometry of the additional second body portion can be different than the geometry of the first body portion and the primary second body portion.

In the example of a cylindrical additional second body portion 4216 and a circular opening 4260 in the blade core, the blade core supports the spacer in a radial direction relative to a center of the blade core, and in all 360° a plane of the blade core 4252. For a noncircular opening in a blade core supporting the additional second body portion, it is possible that the spacer would not be supported by contact at all 360° directions in a plane parallel to the blade core. The additional second body portion has a thickness approximately the same as a thickness of the blade core 4252, taking into account tolerances and the like, and may have a thickness that accommodates easy positioning of the spacer and the blade core with respect to each other while still allowing the first body portion 4202 to maintain the desired spacing between the blade core 4250 and the blade core 4252. As can be seen in the present configuration, the spacer has a first body portion and two second body portions, or in other words the second body portion extends on both sides of the first body portion. In the illustrated configuration, the primary and secondary second body portions can be considered to be continuous from one side of the first body portion to the other side of the first body portion, extending therethrough, or the primary and secondary second body portions can be considered to be spaced apart by the first body portion. Both of the primary and secondary second body portions are supported by respective blade cores, and supported in a direction parallel to a plane of a blade core. The spacer is not directly supported by the blade shaft, but instead supported directly by a blade core or blade cores. The spacer engages a blade core or adjacent blade cores by having the second body portion or second body portions extend into an opening in a blade core or openings in adjacent blade cores.

In the examples of the spacers 4200 described herein, the second body portion or the primary and secondary second body portions can have a depth or thickness in the axial direction approximately equal to a thickness of a blade core into which a second body portion is inserted. In an alternative, the depth or thickness in the axial direction of the second body portion or the primary and secondary second body portions is approximately half or less than approximately half of the thickness of a blade core, so that an opening in a blade core can receive the second body portions of two spacers, one from each side of the blade core.

In the examples of the spacers 4200 described herein, one or more spacers can be supported on a blade core 4250 and/or adjacent blade cores 4250 and 4252. In the illustrated example, four spacers 4200 are distributed equidistant from each other about the blade core 4250. Other numbers of spacers and/or distributions are possible. Additionally in the illustrated example, all of the spacers on a given blade core face in the same direction, for example so that the first body portions 4202 contact the side 4256 of the blade core 4250 and the second body portion 4212 extends into the opening 4258 in the blade core. However, the orientation of one or more spacers can be altered or varied as desired. Generally, the arrangement and orientation of spacers on each blade core in an assembly will be consistent from one blade core to the next, for example so that stacking of blade cores into a blade assembly will produce the desired blade spacing and distribution of spacers about the blade assembly. In the present example, the blade core 4250 includes the same number of spacers (4) as the blade core 4252, and when a blade core is assembled adjacent another blade core, the blade core is shifted about its central axis, for example shifted relative to each other on a blade shaft, so that the spacers on the blade core 4250 are shifted 45° relative to the spacers on the blade core 4252. In such a configuration, the blade cores 4250 and 4252 are separated from each other by four spacers, but they can have fewer or more than four spacers between them. In another configuration, the depth or thickness of the second body portions are approximately half or less than half the thickness of a blade core, and each blade core is assembled with eight spacers so that the blade core 4250 and the blade core 4252 are separated by eight spacers. In one example, the blade core 4250 is assembled with four equally spaced apart spacers, and the blade core 4252 is assembled with four equally spaced apart spacers and the blade cores positioned adjacent each other but shifted 45° so that the four spacers on each blade core will engage an adjacent opening in the other blade core.

The blade core 4250 and spacers 4200 and the blade core 4252 and spacers 4200 can be assembled to form a blade core and spacer assemblies, and a plurality of blade cores and spacer assemblies can be combined to form a blade assembly or blade head, such as may be used on a groover or a grinder in the present illustrations. The blade core 4250 and spacers 4200 will be described, but it is understood that the other blades in a blade assembly will be identical or sufficiently similar to provide the desired blade makeup and spacing, and in the example illustrated in FIG. 40, adjacent blade cores are shifted 45° relative to each other so that the spacers in one blade core contact the adjacent blade core intermediate the spacers on the adjacent blade core. The blade core 4250 includes in the illustrated example 4 spacers 4200 evenly distributed about the blade core, approximately intermediate the shaft opening 402 and the perimeter 404, while other radial positions are possible. The openings and the spacers in the present configuration generally coincide with an annulus defined by the fasteners in a pressure plate in a blade head in which the blade core and spacer assembly is assembled. More or fewer spacers can be distributed about the blade core, and the number may be a function of the size of the first and second body portions.

Each spacer is inserted into a respective circular opening in the blade core 4250 by pressing on the side of the spacer opposite the second body portion 4212 so that the second body portion 4212 fits into the opening 4258 in the blade core. The wall 4208 in the first body portion contacts the facing surface of the blade core 4250, and the second body portion 4212 is supported in the opening in the blade core. Additional spacers are also inserted in like manner, for example from the same side of the blade core. The number and distribution of spacers can be selected as desired, including with the configuration described herein. For example, each blade core can have for evenly distributed spacers and the adjacent blade cores 4250 and 4252 are spaced apart by four spacers, for example where the second body portions are approximately the same height or thickness as a thickness of the blade core. Alternatively, the height or thickness of the second body portions can be approximately half or less than the thickness of the blade core, and adjacent blade cores can be separated by eight spacers, or the number of spacers selected by the user. Other combinations are also possible. The spacers can be held in place by the existing inter-engagement, but other means can alternatively or additionally be used to maintain the spacers in place. The second blade core 4252 and others are assembled in like manner, and the blades with working elements are assembled on a blade shaft, with adjacent blades shifted 45° if desired. The actual spacing between adjacent blade cores will be determined by the selection of spacers, their orientations relative to spacers in adjacent blade cores, and whether or not each spacer includes a first body portion and a single second body portion, or a first body portion and primary and secondary second body portions. A plurality of blade cores can then be assembled on to a blade shaft such as that described with respect to FIG. 2 and used on a machine such as that described with respect to FIG. 1.

Figure 43:
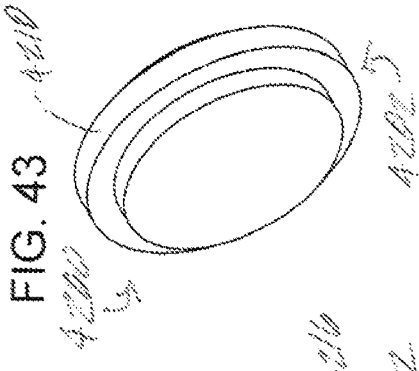
FIG. 43 is an upper isometric view of the spacer used in the assembly of FIG. 40.
Figure 43A:
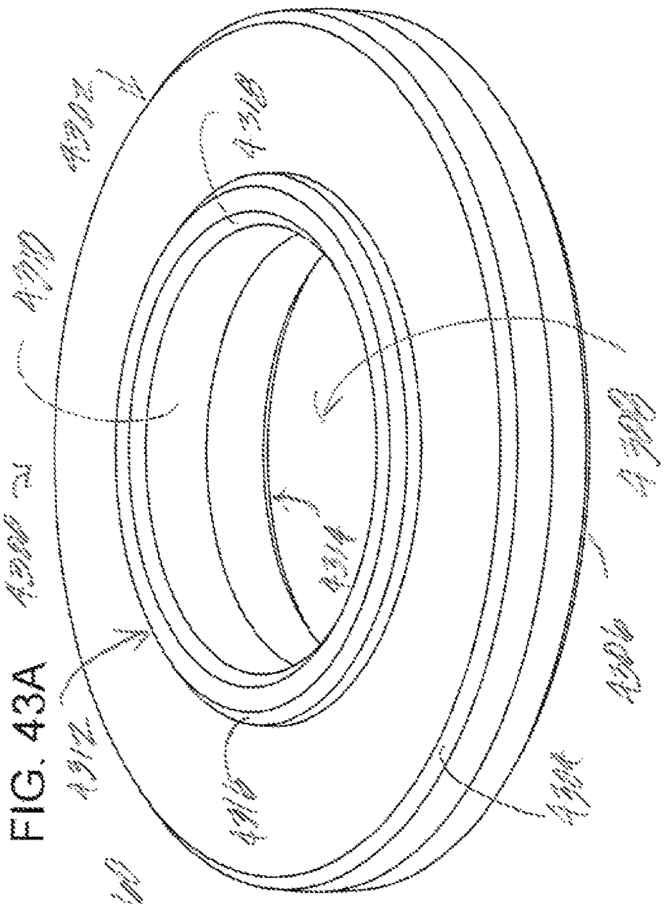
FIG. 43A is an enlarged trimetric view of a further example of a spacer similar to that shown in FIGS. 42-43 with a center opening.

In an alternative configuration of a spacer that can be used with blade cores and supported by a blade core and/or by a rod or shaft, a spacer 4300 (FIG. 43A) is identical in all respects to the spacer 4200 in each of the examples described with respect to the spacer 4200 (for example a single second body portion or primary and secondary second body portions), except as otherwise described herein. The spacer 4300 has a first body portion 4302 identical to the first body portion 4202 except that the first body portion includes beveled surfaces 4304 and 4306, and a center opening 4308, in the present example centered about an axis of rotation (not shown) the same as the axis 4204, so that the first body portion and the opening are concentric. The opening is formed by a cylindrical wall 4310 centered on a central axis. The spacer may but need not include a second body portion 4312 extending axially away from the first body portion 4302, concentric with the central axis. The spacer need not, but in the present example the spacer 4300 includes an additional or secondary second body portion that can be partially visualized at 4314. The primary and secondary second body portions 4312 and 4314 are substantially mirror images of each other, and have the same functions as the second body portions 4212 in 4216. The primary and secondary second body portions 4312 and 4314 are also hollow from the opening 4308 defined by the cylindrical wall 4310. In the present example, the second body portions 4312 include outer and inner beveled surfaces 4316 and 4318, for example to assist in assembling the spacer into a blade core, and assembling adjacent blade core and spacer assemblies together on a blade shaft. The spacer 4300 can be substituted for the spacer 4200 in all respects, in the manner described herein with respect to the spacer 4200. The spacer can be used on blade core assemblies for use on the blade shaft described and illustrated in FIG. 2. In the example where the spacer 4300 has only a first body portion 4302 and omits one or more of the second body portions 4312 and 4314, the spacer can be supported by an indexing rod or other support (not shown) extending through the opening 4308 between two or more blade cores and associated openings 4308 in similar spacers on adjacent blade cores to maintain the radial positions of the spacers 4300. Alternatively, the spacer 4300 can be assembled with blade cores and used in blade core assemblies to be assembled on a blade shaft such as that described with respect to FIG. 3, with threaded rods extending through corresponding openings in sets of four spacers 4300 in each of the blade cores. In the example where the spacer 4300 has only a first body portion 4302 and omits one or both of the second body portions 4312 and 4314, the spacer is supported on a respective threaded rod (FIG. 3) and extends between adjacent blade cores with a thickness selected according to the desired spacing between adjacent blade cores. In the example where the spacer 4300 includes one or both of the second body portions 4312 and 4314, each spacer is supported on a respective blade core, and on an adjacent blade core in the example of primary and secondary second body portions, and the spacers are also supported on the respective threaded rods.

Figure 46:
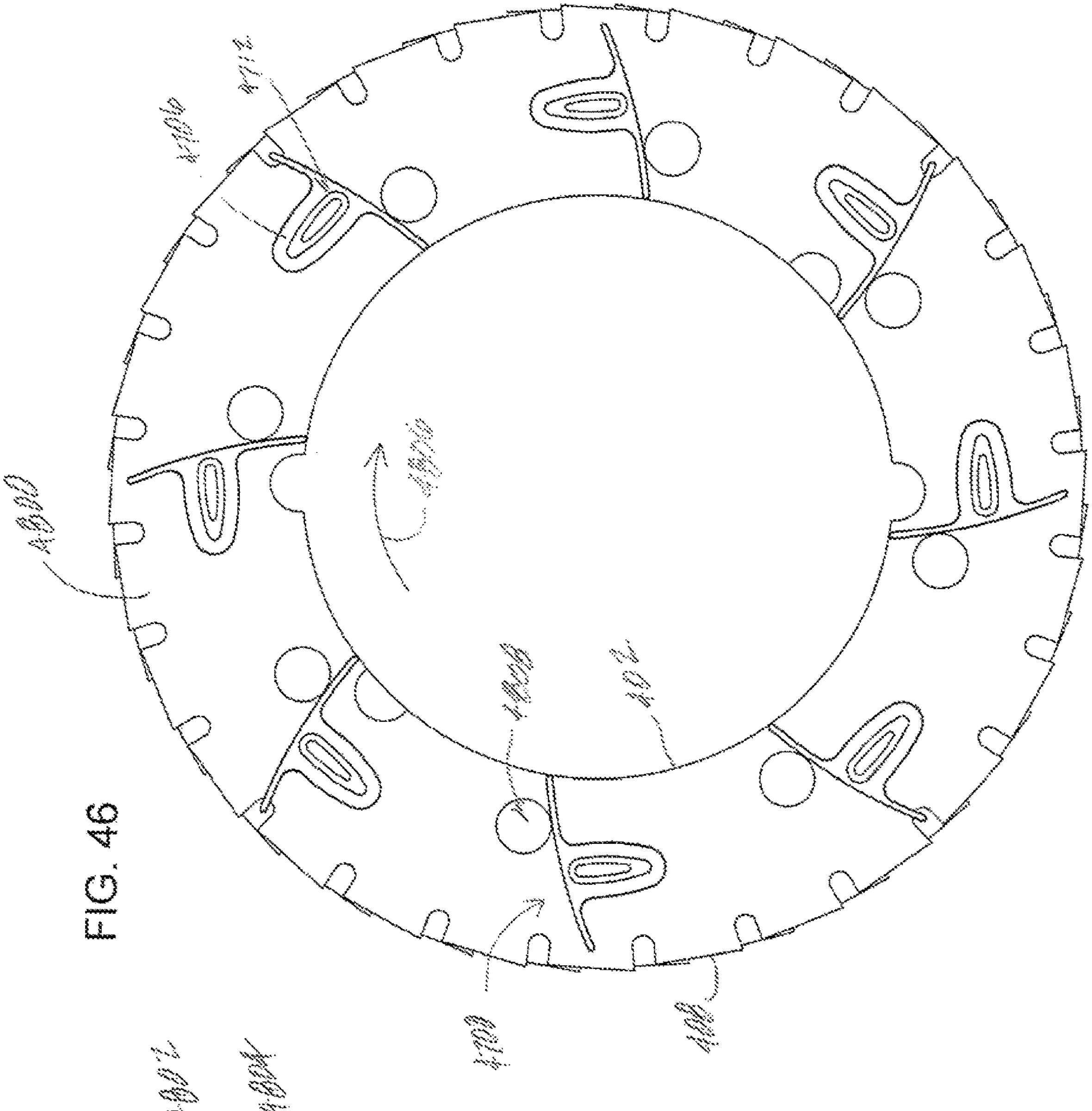
FIG. 46 is an enlarged front elevation view of the assembly of FIG. 45.
Figure 44:
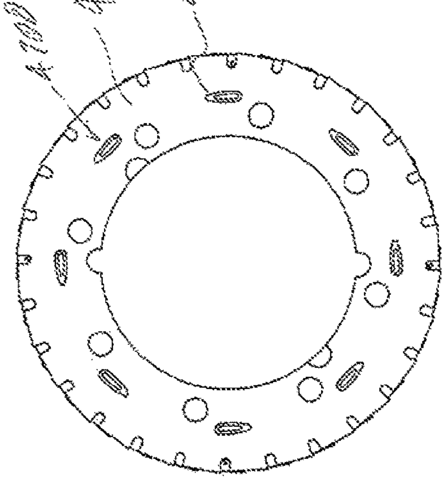
FIG. 44 is a front elevation view of a further example of a plurality of blades that can be assembled on a shaft such as that shown in FIG. 2 having another example of spacers to position adjacent blades relative to each other.
Figure 45:
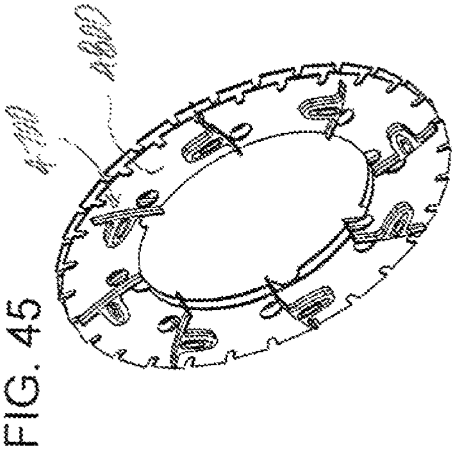
FIG. 45 is an upper isometric view of the assembly of FIG. 44 with the front blade shown in FIG. 44 removed.
Figure 47:
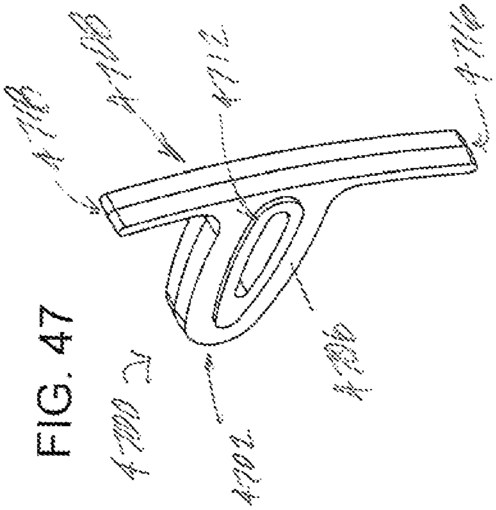
FIG. 47 is an upper isometric view of a spacer used in the assembly of FIG. 44.
Figure 48:
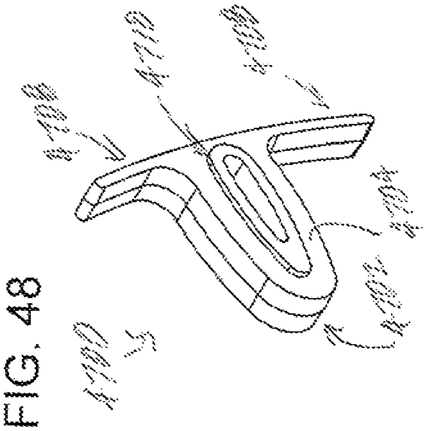
FIG. 48 is a lower isometric view of a spacer used in the assembly of FIG. 44.
Figure 49:
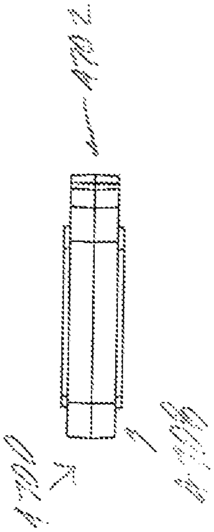
FIG. 49 is a left side plan view of the spacer of FIG. 47.
Figure 50:
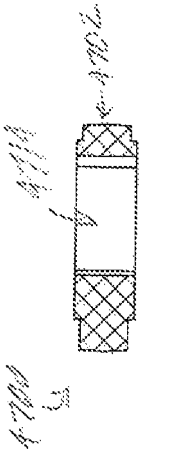
FIG. 50 is a vertical cross-section of the spacer of FIG. 47 taken through the center of an opening in the spacer.
Figure 51:
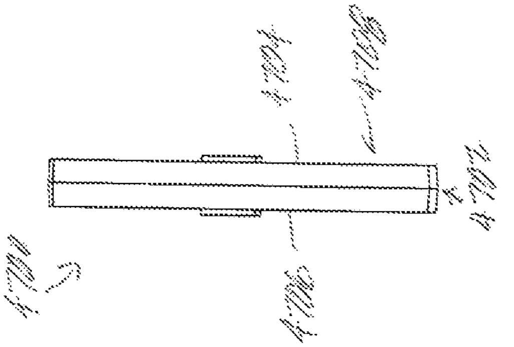
FIG. 51 is a top plan view of the spacer of FIG. 47.

In another example of a spacer for a rotary working blade core, a spacer 4700 (FIGS. 44-51) can be configured to engage a portion of a blade core, for example a blade core for a grooving or grinding head, that can be used on a grooving or grinding machine such as that illustrated in FIG. 1. The spacer 4700 includes a first body portion 4702 that extends outward along an axis from a first side 4704 to a second side 4706. The distance along the axis, for example from the first side 4704 to the second side 4706 of the first body portion can be used to define a spacing between adjacent blade cores, for example a first blade core 4800 and a second blade core 4802 (FIGS. 44-46). In the present configuration, the thickness defines the maximum spacing between adjacent blade cores. The first body portion is mounted on or supported by the first blade core, and the axial distance or thickness of the first body portion is used as a spacer between the first blade core 4800 and the second blade core 4802, and likewise with other blade cores on which the spacer 4700 is used. The first body portion include respective surfaces on the first and second sides 4704 and 4706 facing respective surfaces on the blade cores, and in the illustrated example, all of the respective surfaces are used to contact the adjacent blade core surfaces for providing the spacing defined by the thickness of the body portion. In another configuration, the surfaces can include respective bosses, bumps or dimples, for example, that would contact the adjacent blade core surfaces, and the spacing defined by the first body portion would be the spacing defined by the maximum thickness between the outermost surfaces of the bosses, bumps or dimples.

The spacer 4700 first body portion 4702 has a partially elliptical geometry, but may have other geometries. The first body portion extends in a direction parallel to a plane of the blade core in which the spacer is supported.

The first body portion 4702 of the spacer includes a flow diversion structure 4708 supported on a portion of the first body portion. The flow diversion structure in the present example is an extended structure with a surface that will extend in a space between adjacent blade cores, and in the present example, has the same thickness or spacing as the first body portion. In the illustrated configuration, the flow diversion structure 4708 is configured to extend in a general direction from an inner portion of a blade core to an outer portion of a blade core, and the structure may be curved to provide a curved flow surface for fluid, such as air or liquid.

The spacer 4700 also includes a second body portion 4710 extending adjacent the first body portion and along the axis of an away from the first body portion, and may, but need not, include an additional or secondary second body portion 4712. In the illustrated configuration, the primary and additional or secondary second body portions are mirror images of each other relative to a plane perpendicular to the axis and through the first body portion, and have the same structure and function, but they can be configured differently. The second body portions form a blade engagement structure for limiting movement of the spacer, for example the first body portion, in a direction parallel to a plane of a blade core. The second body portions are configured to contact portions of respective blade cores between oppositely-facing surfaces of the respective blade core. In the present example, the second body portion 4710 extends into an opening, in the present example a partly elliptical opening 4804 (FIG. 44) formed in the blade core 4802. The second body portions and the opening can have other geometries, while still allowing the second body portion to be supported by the blade core in a direction parallel to a plane of the blade core. The profile are geometry of the second body portions and the profile or geometry of the opening in the blade core can be the same or substantially the same, but can also be different while the opening in the blade core can still support the second body portion and therefore the spacer at least partly in a plane of the blade core. Also, the second body portion can be solid, but in the illustrated configuration the second body portions include an opening 4714 (FIG. 50) extending between the primary and secondary second body portions and through the first body portion.

Figure 7:
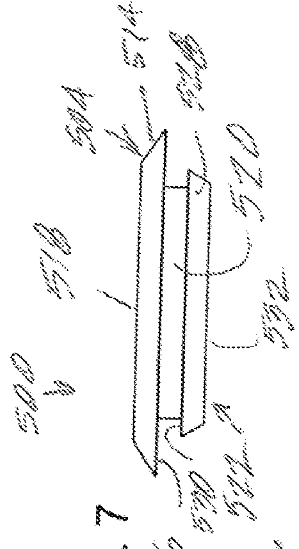
FIG. 7 is a side elevation view of a spacer used in the assembly of FIG. 5.

The spacer can be formed from any one or more of the materials described herein, and can also be made from a material other than a working material. The spacer can be formed monolithic or out of multiple pieces. The spacer 4700 can alternatively be formed to have first and third body portions on opposite sides of a second body portion, analogous to the general structure of the spacer 500 (FIG. 7). The spacer can be held in position in a respective opening in the blade core by any number of means, including those discussed herein, including interference fit, adhesive, welding, mechanical means or other means for reliably positioning the spacer in an opening in a blade core. The primary and secondary second body portions can have a thickness approximately equal to the thickness of a blade core, or may have a thickness approximately one half or less than one half the thickness of a blade core.

In the examples of the spacers 4700 described herein, one or more spacers can be supported on a blade core 4800 and/or adjacent blade cores 4848 02. In the illustrated example, eight spacers are distributed equidistant from each other about each blade core, while other numbers of spacers and/or distributions are possible. In the illustrated example, all of the spacers on a given blade core are oriented generally the same as a function of the arcuate position on the blade core, for example so that a leading edge 4716 (FIG. 47) is closer to the blade shaft opening 402 (FIG. 46) and a trailing edge 4718 is closer to a perimeter 404 of the blade core, when the direction of rotation of the blade and spacer assembly is as indicated in FIG. 46 at 4806. However, the orientation of one or more spacers can be altered or varied as desired. Generally, the arrangement and orientation of spacers on each blade core in an assembly will be consistent from one blade core to the next, for example so that stacking of blade cores into a blade assembly will produce the desired blade spacing and distribution of spacers about the blade assembly, for example if improved fluid flow is a consideration. In the illustrated example, the adjacent blade cores have the same number of spacers mounted on each blade core before the blade core and spacer assemblies are assembled onto a blade shaft, such as that described and illustrated in FIG. 2. Adjacent blade cores will be pivoted 45° relative to each other as they are assembled into a blade core assembly.

Each blade core, for example 4800 and 4802, includes one or more, and in the present example 8, airflow openings 4808. As illustrated, the airflow openings 4808 are circular openings formed through each blade core, and in the present example positioned adjacent a leading portion of each flow structure. Additionally or alternatively, airflow openings can be positioned at other locations on a blade core. As adjacent blade cores are assembled on a blade shaft, airflow openings positioned at a given arcuate position on a blade core relative to a center of the blade shaft will be aligned with each other.

The blade cores 4800 and 4802 and spacers 4700 can be assembled to form a blade core and spacer assemblies, and a plurality of blade cores and spacer assemblies can be combined to form a blade assembly or blade head, such as may be used on a groover or a grinder in the present illustrations. The spacers are assembled onto a respective blade core in a manner similar to the assembly of the spacers 4200 on a blade core 4250. The openings in the blade cores and the spacers supported in those openings in the blade cores generally coincide with an annulus defined by the fasteners in a pressure plate in a blade head in which the blade core and spacer assembly is assembled.

Figure 53:
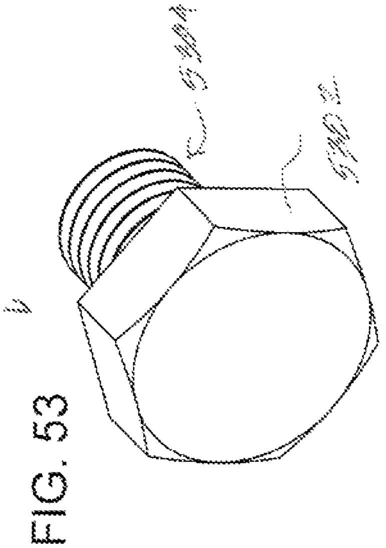
FIG. 53 is an upper isometric view of one component of the spacer used in the assembly of FIG. 52.
Figure 54:
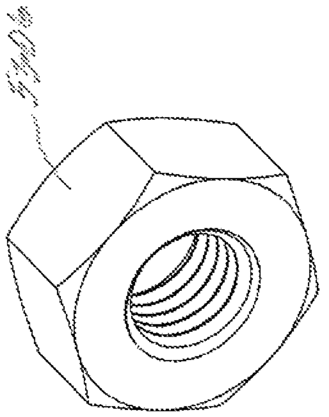
FIG. 54 is an upper isometric view of a second component of the spacer used in the assembly of FIG. 52.
Figure 52:
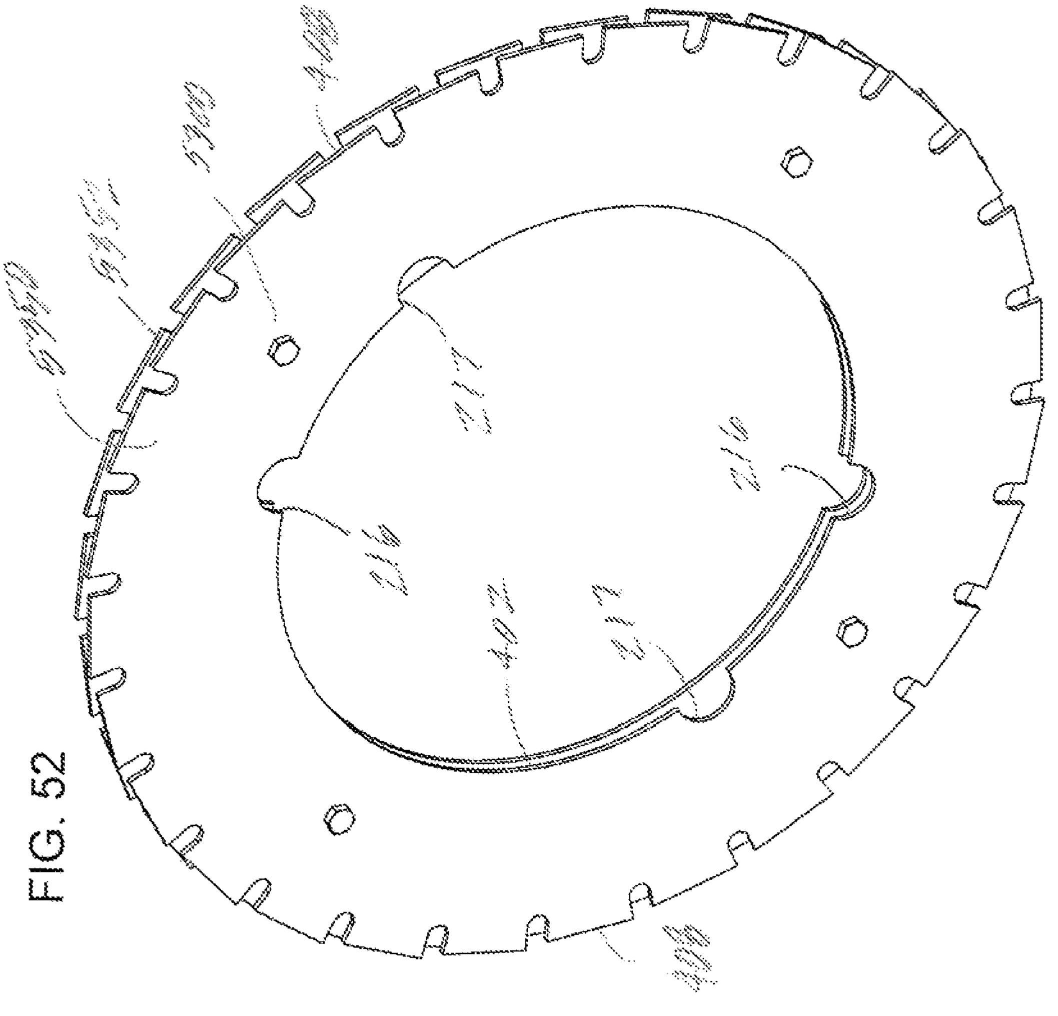
FIG. 52 is an upper isometric view of a further example of a plurality of blades that can be assembled on a shaft such as that shown in FIG. 2 having another example of spacers to position adjacent blades relative to each other.

Another example of a spacer assembly includes a two-piece assembly 5300 (FIGS. 52-54) having a first body portion 5302 and a second body portion 5304. The first body portion extends outward from a central axis and has a maximum height or thickness in a direction parallel to the axis an amount that is selected to be equal to the desired spacing between adjacent blade cores 5350 and 5352 in a final assembly. The second body portion 5304 extends away from the first body portion along the axis, and in the present example the length of the second body portion along the axis is a combination of a length sufficient to extend into and through an opening in a blade core, so that the blade core can support the spacer in a direction parallel to a plane of the blade core, and an amount sufficient to receive a third body portion 5306 so that the third body portion can be secured on the second body portion to form the spacer assembly 5300. The thickness of the third body portion 5306 will be the same as the thickness of the first body portion 5302 where the first and third body portions are used to determine the spacing between respective adjacent blade cores. Where the third body portion 5306 is used to determine the spacing between respective adjacent blade cores, the length of the second body portion will be such as to ensure that it does not extend beyond the outermost surface of the third body portion 5306 when the spacer is fully installed on a blade core. Alternatively, if the second body portion is used to determine the spacing between a blade core supporting the spacer 5300 and an adjacent blade core adjacent the third body portion 5306, the thickness of the third body portion 5306 is selected so as to fully thread on the second body portion 5304 such that the second body portion extends beyond an outside and surface of the third body portion 5306. Other configurations can be used for the spacer 5300 in a two-part form, and other means than threads can be used to secure the multiple components together to form the spacer assembly. For example, any of the spacers described herein can be formed as 2-part spacers or multiple-part spacers.

Each blade core 5350 and 5352 can be configured to support a 2-part spacer or multi-part spacer, for example the spacer 5300 or any of the other spacers described herein that could be formed as a 2-part spacer or multi-part spacer. In one example, the blade core 5350 includes an opening for receiving a respective spacer 5300, and in the present example such opening is a circular opening in the blade core. In the illustrated configuration, four spacers 5300 are supported through respective openings in the blade core, distributed evenly about the blade core, and positioned so that they are coincident with an annulus defined by fasteners on a pressure plate. Other openings and circular and other distributions can be used as desired.

The blade core 5350 and the spacers 5300 can form an assembly of a blade core and spacers, and a plurality of blade core and spacer assemblies can be combined to form a blade assembly or blade head such as may be used on a groover or a grinder in the present illustrations. The illustrated blade core 5350 includes registration key slots 216 and 217, each being part of a pair of diametrically opposite pairs of registration key slots. The blade core includes at least three and preferably four or more circular openings between the blade shaft opening 402 and the perimeter 404. In an assembly of a blade core and spacers, the spacers are assembled on the blade core, and the blade core and spacer assembly mounted or positioned on a blade shaft. A next adjacent blade core and spacer assembly is then positioned on the blade shaft, pivoted 45°, or otherwise as selected. Multiple blade core and spacer assemblies are similarly positioned on a blade shaft to form a blade head, for example for use on machines described herein.

Any of the spacers described herein can be used to support one or more components that can have additional functions different than or in addition to a spacing function. In another example of a spacer having first and second body portions, a spacer 5700 (FIGS. 55-58) includes first and second body portions 5702 and 5704, respectively, which first and second body portions can have structures and/or functions analogous, similar or identical to the first and second body portions of spacers described herein. In the illustrated configuration, the first and second body portions have structures and functions identical to those described with respect to the first and second body portions 4202 and 4212 of the spacer 4200 (FIGS. 40-43) except as described herein, and similar to the structures and functions of the first and second body portions 514 and 520 of the spacer 500 (FIGS. 5-8). The first body portion 5702 extends outwardly parallel to a plane of a blade core, and along a central axis centered in the spacer. The first body portion has a maximum height or thickness in the direction of the central axis an amount that is selected to be equal to the desired spacing between adjacent blade cores 5750 and 5752 (FIG. 55) in a final assembly. The first body portion can be any of a number of geometries, but in the illustrated configuration is substantially circular in profile.

The second body portion 5704 extends away from the first body portion along the central axis, and in the illustrated configuration is concentric with the first body portion, but can be otherwise. The second body portion is configured to contact a portion of the blade core 5750 between oppositely-facing surfaces of the blade core, and in the illustrated example, the second body portion passes through an opening in the blade core and contacts at least part of a wall forming the opening in the blade core. In the present example, the opening in the wall of the blade core would be a circular opening, but can be otherwise, preferably while still providing support for the spacer in a direction parallel to a plane of the blade core. As illustrated, the second body portion 5704 is a right circular cylinder, but it can take other geometric configurations that can also permit the second body portion to contact a wall of an opening in the blade core, for example so that the blade core can support the spacer, such as in a direction parallel to a plane of the blade core. Also in the present example, the second body portion is solid, but need not be, and could be hollow. The depth or thickness of the second body portion 5704 can be the same or less than a thickness of a blade core on which the spacer would be supported, and can be approximately equal to or less than one half the thickness of a blade core on which the spacer would be supported.

The spacer 5700 can be held in position in an opening in the blade core 5750 by any number of means, including interference fit, adhesive, welding, mechanical means or other means for reliably positioning the spacer in the opening in the blade core. An interference fit can be complete around the perimeter of a 360° contact, or may be partial with one or more points or one or more surfaces on the second body portion contacting respective surfaces in the opening in the blade core. The fit can be a close fit or no interference fit in an alternative configuration, and may be held in place by any of the other configurations described herein.

Figure 55:
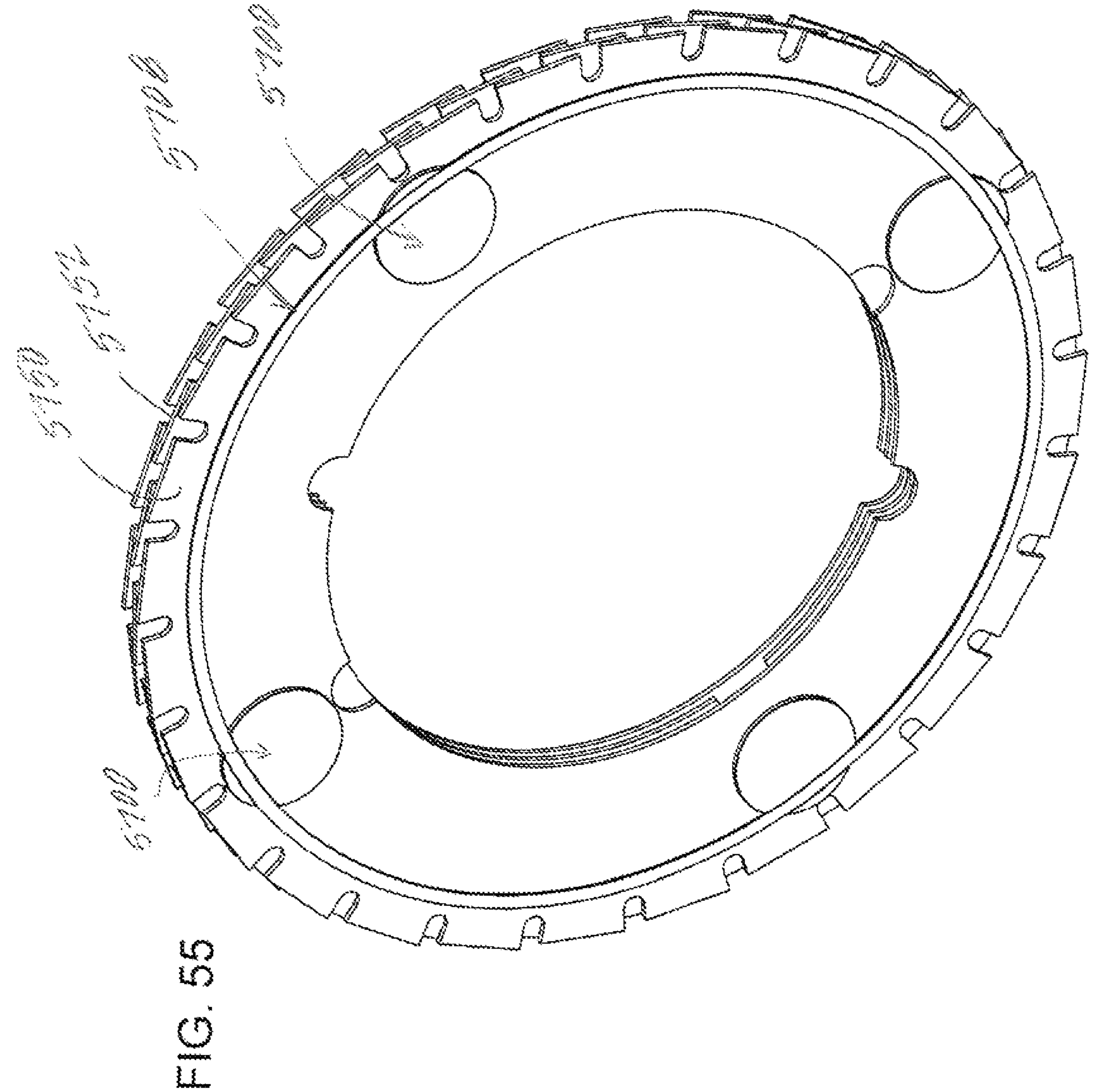
FIG. 55 is an upper isometric view of a further example of a plurality of blades that can be assembled on a shaft such as that shown in FIG. 2 having another example of spacers to position adjacent blades relative to each other.
Figure 58:
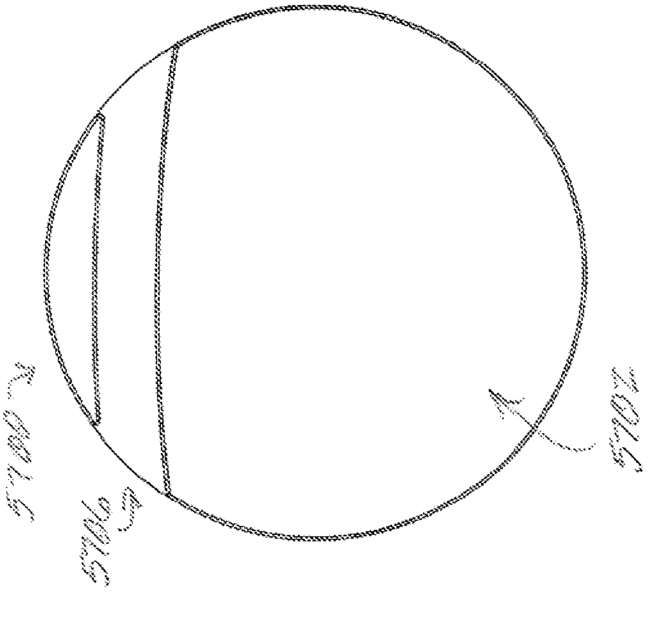
FIG. 58 is a front elevation view of the spacer of FIG. 57.
Figure 57:
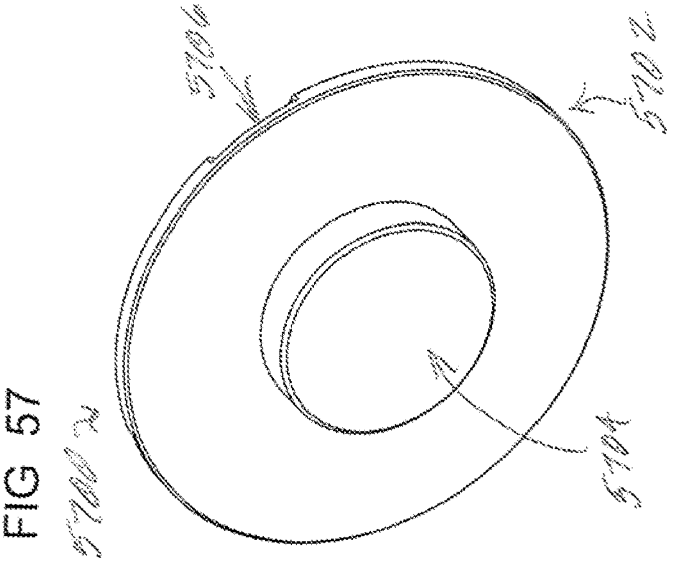
FIG. 57 is a rear isometric view of a spacer used in the assembly of FIG. 55.
Figure 56:
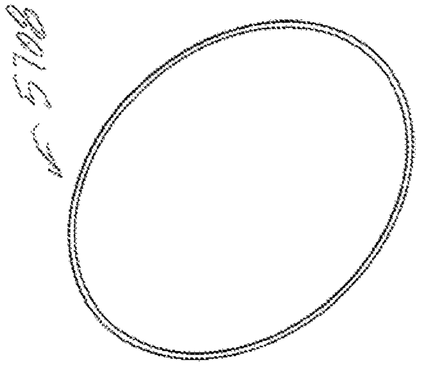
FIG. 56 is an upper isometric view of a ring used in the assembly of FIG. 55.

The illustrated spacer 5700 includes an engagement structure in the form of a groove 5706. The groove supports an additional structure that may be a spacer structure or a structure with a different function, or one having a spacer and additional function. In the present example, the groove is an arcuate groove for supporting a guard ring 5708 (FIGS. 55-56). The guard ring is an annular strip of material configured to fit in the groove 5706 of the spacer 5700 and similar grooves in spaced apart spacers 5700 on the blade core 5750, so that the guard ring 5708 is adequately supported on the blade core through the associated spacers. The guard ring has a flat surface adjacent the facing surface of the blade core 5750, and a flat surface on the oppositely-facing side of the guard ring. The thickness of the guard ring can be such as to allow the guard ring to provide a spacing function between adjacent blade cores. When the guard ring is assembled on the supporting spacers 5700, the guard ring helps to resist intrusion of debris between the blade cores during operation. The guard ring can be held in place by any number of means, including interference fit or other mechanical securement, adhesive, welding, mechanical means or other means for reliably positioning the guard ring on the spacers. The guard ring may be formed from any number of materials, including steel, aluminum, thermoplastic and thermosetting materials or composite materials.

The blade core 5750 and the spacers 5700 can form an assembly of a blade core and spacers, and a plurality of blade core and spacer assemblies can be combined to form a blade assembly or blade head such as may be used on a groover or a grinder in the present illustrations, all of which may be accomplished in a manner identical or similar to the assembly of spacers and blade cores described herein with respect to other examples. In the assembly illustrated in FIG. 55, a blade core and spacer and guard ring assembly can be assembled on a blade shaft, and a next adjacent blade core, spacer and guard ring assembly positioned on the blade shaft pivoted 45°. Additional blade core and spacer and guard ring assemblies can be positioned in a similar manner to produce a blade assembly or blade head for use on a machine.

In another example of a spacer, a spacer can have first and second body portions, where the first body portion provides a spacing function and a second body portion provides a support function for the spacer in a blade core, and additionally or alternatively, the first body portion can support a component for positioning the component on a blade core, and the spacer can be provided as a single monolithic part, or as two parts to be combined. As two parts, the first and second body portions can have structures and functions analogous to the first and second body portions in the spacer assembly 5300 (FIGS. 52-54), and the spacer can have a third body portion analogous to the third body portion 5306. In a further example of such spacers, a spacer 5900 (FIGS. 59-68) can have a first component 5902 (FIGS. 59-62) having a first body portion 5904 and a second body portion 5906, having functions the same as first and second body portions in the other spacers described herein. In the illustrated configuration, the first body portion 5904 extends outwardly parallel to a plane of a blade core, and along a central axis extending through the spacer perpendicular to a plane of a blade core in which the first component 5902 is supported. The first body portion has a maximum height or thickness in the direction of the axis an amount that is selected to be equal to the desired spacing between adjacent blade cores, for example 5908 and 5910 (FIG. 59) in a final assembly. The first body portion can be any of a number of geometries, but in the illustrated configuration has a deltoid.

The second body portion 5906 extends away from the first body portion along the axis, and in the illustrated configuration has a deltoid configuration with the geometry smaller than the deltoid configuration of the first body portion, but can be otherwise. The second body portion is configured to contact a portion of the blade core 5908 between oppositely-facing surfaces of the blade core, and in the illustrated example, the second body portion passes through an opening in the blade core and contacts at least part of a wall forming the opening in the blade core. In the present example, the opening in the wall of the blade core has a deltoid configuration, but can be otherwise, while preferably still providing support for the spacer in a direction parallel to a plane of the blade core. The second body portion 5906 can take other geometric configurations while also permitting the second body portion to contact a wall of an opening in the blade core, for example so that the blade core can support the spacer, such as in a direction parallel to a plane of the blade core. Also in the illustrated configuration, the first and second body portions are solid, but need not be, and could include hollow portions defined by one or more walls defining openings to produce the hollow portions. The depth or thickness of the second body portion 5906 can be the same or less than a thickness of a blade core on which the spacer would be supported, or could be greater than a thickness of the blade core, for example for providing a spacing structure on a side of the blade core opposite the first body portion 5904, and/or for providing an engagement structure for an additional component, such as a third body portion.

The spacer 5900 can be held in position in an opening in the blade core 5908 by any number of means, including interference fit, adhesive, welding, mechanical means or other means for reliably positioning the spacer in the opening in the blade core. An interference fit can be complete around the perimeter of a 360° contact, or may be partial with one or more points or one or more surfaces on the second body portion contacting respective surfaces in the opening in the blade core. The fit can be a close fit or no interference fit in an alternative configuration, and may be held in place by any of the other configurations described herein.

Figure 59:
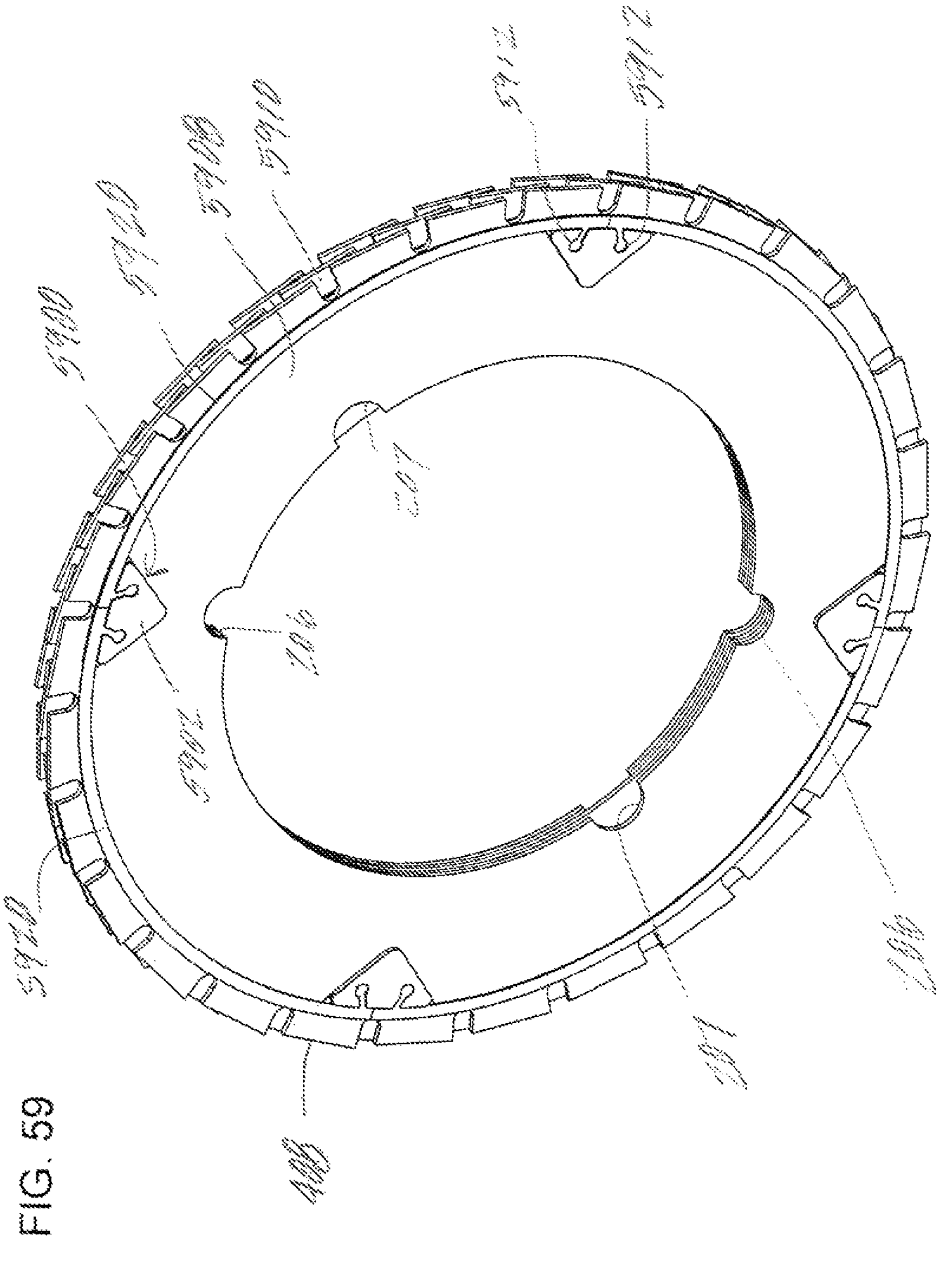
FIG. 59 is an upper isometric view of another example of a plurality of blades that can be assembled on a shaft such as that shown in FIG. 2 having another example of spacers to position adjacent blades relative to each other.
Figure 69:
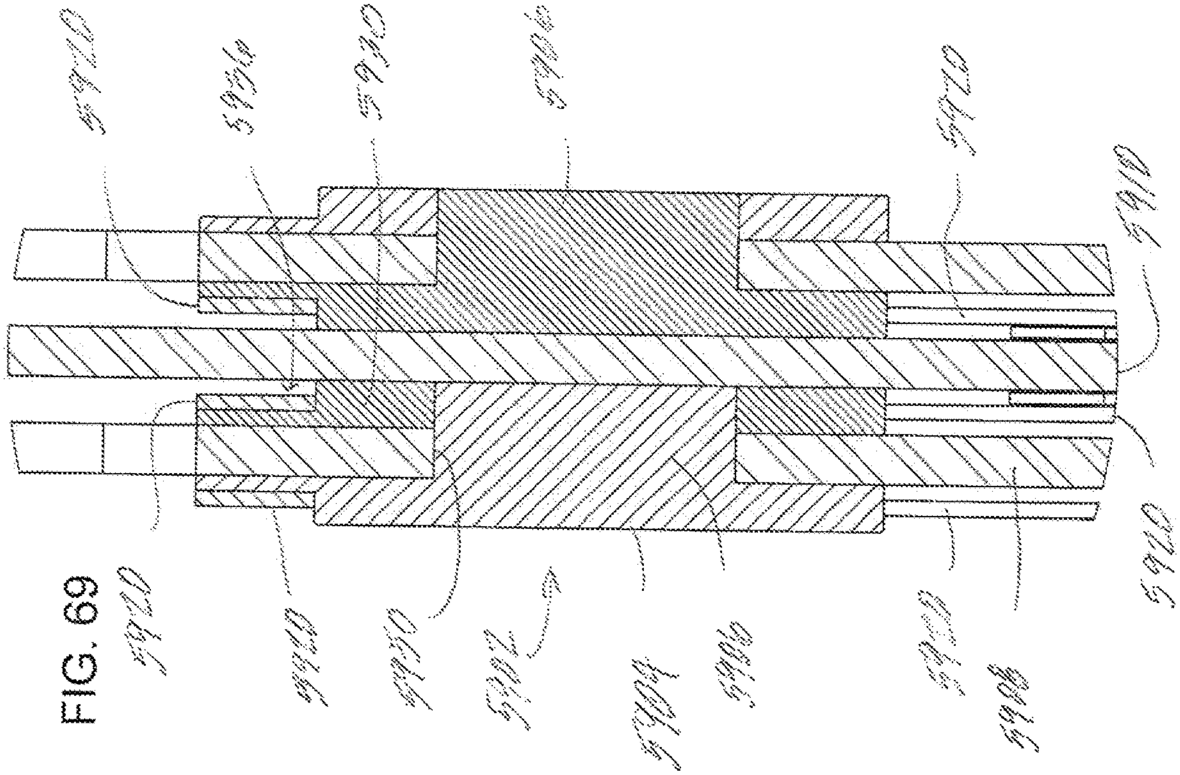
FIG. 69 is a detail cross-section of part of the assembly of FIG. 59 showing blades and spacer assemblies.

In the illustrated configuration, the first spacer component 5902 includes an engagement structure in the form of one or more slots 5912 (FIGS. 59 and 61). In the present example, the slots 5912 are a plurality of slots, extending away from a perimeter 404 of the blade core when the first component 5902 is positioned on a blade core. Each slot preferably has a non-radial geometry, for example to reduce the possibility of a component coming out of the slot under centripetal forces developed during rotation of the blade core. In the illustrated configuration, each slot is recessed into an outer face of the first body portion 5904. The slot includes a straight walled portion 5914 and a rounded portion 5916, where the rounded portion is at an internal end of the straight walled portion. The outer face of the first body portion also includes a recessed arcuate portion 5918, which may have a radius of curvature similar to a portion of the blade core in which the first component 5902 is supported. The slots and the recessed arcuate portion in the present example are configured to receive one or more additional components to be supported on the blade core, for example in an area of a perimeter portion of the blade core. In the illustrated configuration, each first component 5902 supports a pair of oppositely-extending guard components 5920 (FIGS. 59 and 69). The guard components are similar in function to the guard ring 5708 (FIGS. 55-56), and the guard components combined into an assembly form a guard ring in the area of the perimeter of each blade guard. Alternatively or additionally, the guard components can provide spacing functions in the assembly. In the present example, the guard components are held in place by mechanical engagement, but they can be held in place by any number of means, including interference fit or other mechanical securements, adhesive, welding, mechanical means or other means for reliably positioning the guard components on the spacers. The guard ring may be formed from any number of materials, including steel, aluminum, thermoplastic and thermosetting materials or composite materials.

The spacer assembly 5900 includes a second component 5930 (FIGS. 64-68) that can be combined with the first component 5902 to form the spacer assembly 5900. In the illustrated configuration, the second component forms a third body portion 5932, which can serve as a spacer structure either completely for a side of the blade core 5908 opposite the first body portion 5904, or in combination with a portion of the second body portion 5906 that extends beyond the opening in the blade core, for example as illustrated in FIG. 69. The third body portion 5932 is supported on the second body portion 5906, which in turn is supported in a plane of the body core by the opening in the body core. The first and second components 5902 and 5930 can be secured together by any one or more of a number of means, including interference fit, adhesive, welding, mechanical means or other means for reliably securing the two parts together.

The third body portion can take a number of geometries, but in the illustrated example has a deltoid with a deltoid opening 5934 for receiving the second body portion 5906. The third body portion includes a thickness 5936 (FIGS. 67-68), in the present example selected to be equal to the desired spacing between adjacent blade cores, but can be otherwise, for example where the second body portion 5906 is relied upon for providing all of the spacing function for the side of the spacers 5900 opposite the first body portion 5904.

The second component 5930 includes an arcuate recess 5936 for receiving a guard component supported on a spacer on an adjacent blade core, for example as illustrated in FIG. 69. As shown in FIG. 69, the recess 5936 in the second component 5930 on the blade core 5908 supports a guard component 5920 against a surface of the recess 5936. The guard component 5920 supported in such a way is supported through interlocking engagement with one or more spacer assemblies 5900 positioned on the adjacent blade core 5910.

Each blade core, for example blade cores 5908 and 5910, can support one or more of the spacers 5900. In the illustrated configuration, each blade core supports four spacers and four ring guards, as well as four additional ring guards from and immediately adjacent blade core, supported on the arcuate recess is 5936 on the second components 5930. Other numbers and configurations of spacers 5900 or other spacers can be included on each blade core.

A blade core and spacer assembly is formed by inserting a first component 5902 in an opening 5950 in the blade core 5908 so that the second body portion 5906 extends into and through the opening. The openings can be formed in the blade core 5908 in an annular area coincident with an annulus formed by an assembly of fasteners arranged on a pressure plate such as illustrated in FIG. 2, or in the illustrated example, the openings can be placed closer to the perimeter 404 of the blade core, for example to position the guard components 5920 closer to the gullets 408 in the blade cores. The second component 5930 is then placed over the second body portion so that the blade core 5908 is sandwiched between the first and third body portions. The other spacers 5900 are assembled onto the blade core 5908 through respective openings in a similar manner. First and second guard components 5920 are then inserted in respective slots 5912 in the first component 5902, and the opposite ends of the guard components and additional guard components are placed in respective slots 5912 on respective spacers on the blade core 5908.

A plurality of blade core and spacer assemblies can be positioned on a blade shaft to form a blade assembly or blade head, such as may be used on a groover or grinder in the present illustrations. The blade core and spacer assembly can be positioned on a blade shaft so that the registration key slots 206 align with a registration key on the blade shaft. A second blade core 5910 and spacer assembly can be positioned on the driveshaft, with the blade core shifted 45°. The first and third body portions along with part of the second body portion of each spacer provides spacing between each adjacent blade core, and the recesses 5936 on the second component 5930 of each spacer on a given blade core helps to support the guard components 5920 on an adjacent blade core.

An example of blade and spacer assemblies assembled into a blade head is illustrated in FIG. 70 (not showing the blade shaft and mounting hardware and working elements), and illustrates an assembly that can be composed of any of the blade core and spacer assemblies described herein, which would be placed on a blade shaft one or several at a time as described herein. Additionally, any of the blade core and spacer assemblies described herein can be assembled into a blade head and mounted on a blade shaft with adapter plates at each end of the complete assembly of blades to serve as an interface between the end-most blades and spacers and end plates or pressure plates used to secure the blades in the blade head, for example as illustrated in FIGS. 2 and 3. The blade assembly 7000 (FIG. 70) includes a plurality of blades 7002 assembled and arranged as described herein. The blades can be mounted on a blade shaft such as that described with respect to FIG. 2, or a blade shaft such as that described with respect to FIG. 3. The blade assembly includes an adapter plate 7004 at a first end of the blade assembly and a like adapter plate (not shown) at the opposite end of the blade assembly. Only one adapter plate will be described. In the illustrated configuration, the adapter plate is a disc, made from metal or other suitable material that can withstand the expected compressive loads. The adapter plate is a substantially flat annular disc having an opening 7006 for the blade shaft from which registration key slots 7008 and 7010 extend radially outward. One or the other pair of the registration key slots will align with a registration key or keys on the blade shaft. For blade assemblies to be used on grinding and grooving machines, the opening 7006 for the blade shaft has an inside diameter ranging between 3 inches up to 10 or 12 inches or more. The adapter plate extends radially outward to an outer perimeter 7012, in the present example approximately at the gullets of the blades.

The adapter plate includes openings for accommodating spacers and any other structures projecting outward from the end-most blade core. Alternatively, the end-most blade core can be assembled with half spacers, which do not project beyond the outermost surface of the end-most blade, in which case a pressure plate or endplate can bear up against the respective end-most blade core and any clamping pressure would be uniformly distributed over the blade core.

The adapter plate 7004 includes a cavity 7014 for receiving each of a respective spacer (described more fully below) on an end-most blade core. In the illustrated example, the cavity 7014 is an opening extending completely through the adapter plate from one side surface through to the other side surface, and the thickness of the adapter plate is selected so that any spacer or other projection on the end-most blade core is at least flush with or recess below the outer side surface of the adapter plate 7004. Each cavity 7014 can be circular or other geometry suitable for receiving the spacer or projection, and in the illustrated example, the cavity geometry is the same as the geometry of the spacer extending into the cavity. Generally, the adapter plate 7004 will have the same number of cavities or openings as there are spacers and/or projections on the blade core. In another configuration, the geometry of the cavity can be a uniform or generic geometry, such as a circle or a rectangle, to accommodate a variety of spacer geometries, for example when one blade assembly is changed out for a different blade assembly having different spacers.

Figure 71:
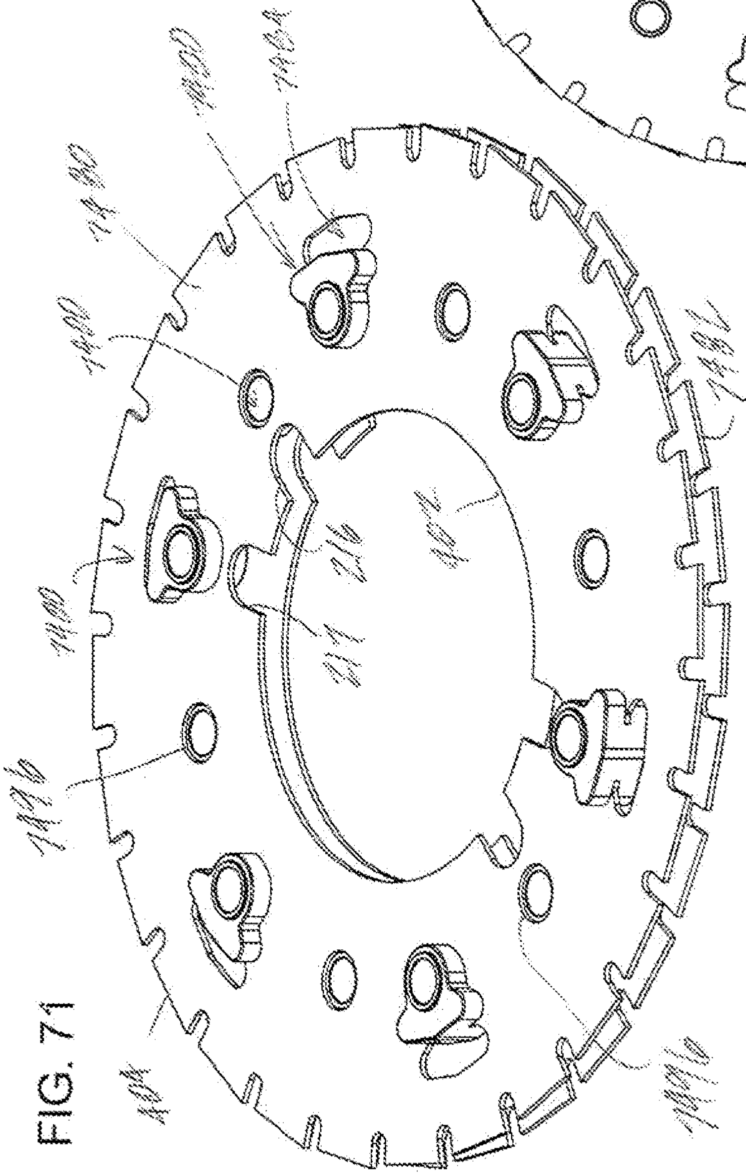
FIG. 71 is an isometric view of another example of a plurality of blade cores and spacers.
Figure 72:
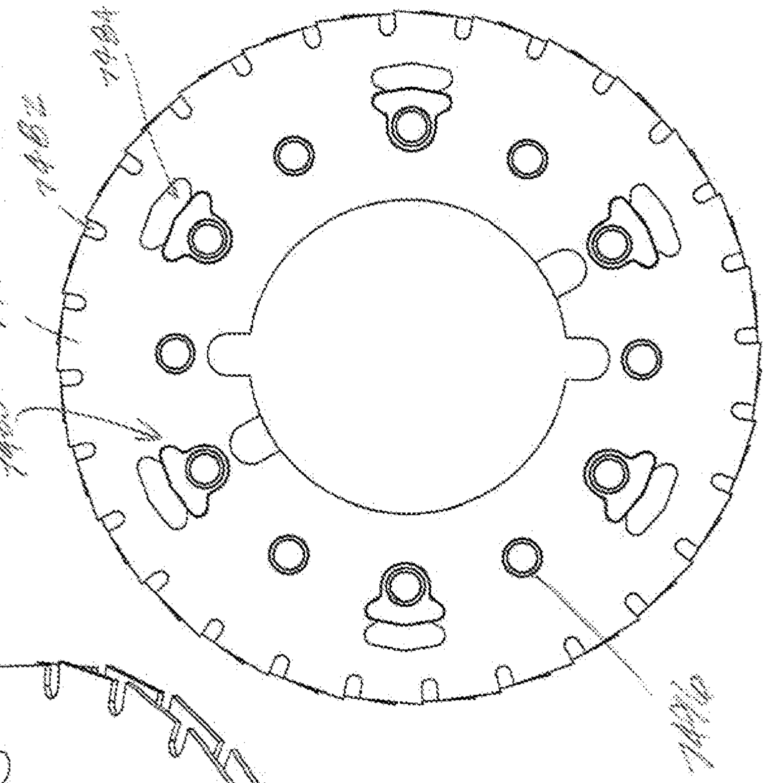
FIG. 72 is a front elevation view of the assembly of FIG. 71.

In another example of a spacer that can be used with blade cores and supported by a blade core and/or by a rod or shaft, a spacer 7400 (FIGS. 70-77) is configured to be supported by a blade core, and in one configuration contact a portion of the blade core intermediate oppositely-facing sides of the blade core, for example a wall of an opening formed in the blade core. The spacer 7400 includes a first body portion 7402 to serve as a spacer element between a blade core on which the spacer 7400 is supported and a next adjacent blade core. The first body portion is that portion of the spacer that extends along and outward along an axis 7403 from an adjacent surface of a blade core. The first body portion extends in a first direction from a plane including a first surface 7404 to a second surface 7406. The distance in the first direction, for example from the first side 7404 to the second side 7406 of the first body portion can be used to define the spacing between adjacent blade cores, for example a first blade core 7480 and a second blade core 7482 (FIGS. 71-72). In the present configuration, the thickness defines the maximum spacing between adjacent blade cores. The first body portion is mounted on or supported by the first blade core, and the axial distance or thickness of the first body portion is used as a spacer between the first blade core 7480 and the second blade core 7482, and likewise with other blade cores on which the spacer 7400 is used. The first body portion includes respective surfaces on the first and second sides 7404 and 7406, respectively, and the surface on the side 7404 faces the oppositely-facing surface on the blade core on which the spacer is supported, and the surface on the side 7406 faces the oppositely-facing surface on the next adjacent blade core. In one configuration (not illustrated), the second side 7406 can be completely flat over the entire extent of the first body portion for contacting the surface of the adjacent blade core. Alternatively (also not illustrated), the second side 7406 can be other than flat so that the outer-most surfaces on the second side would be used to define the thickness of the first body portion and therefore the spacing between adjacent blade cores.

The first body portion 7402 of the spacer 7400 extends outwardly to a perimeter surface 7408, which can take a number of configurations, but in the illustrated example includes an inner circular portion 7410 and an outer arm, branch or lobed portion 7412. As described more fully below, the outer lobed portion will be positioned radially outward of the circular portion 4710 when positioned on a blade core, and the outer lobed portion provides an extended structure for providing the spacing function and for compressive loading.

The spacer 7400 also includes a second body portion 7414 extending adjacent the first body portion and extending along the axis 7403. The second body portion forms a blade engagement structure for limiting movement of the spacer, for example the first body portion, in a direction parallel to the plane of the blade core. The second body portion is configured to contact a portion of the blade core 7480 or 7482 between oppositely-facing surfaces of the blade core. In the present example, the second body portion extends into an opening, in the illustrated example an opening 7484 having a suitable for receiving laterally a spacer 7400 into the opening and then allowing the spacer to move parallel to a blade core to a final position. The geometry of the opening can take a number of configurations, which may be selected at least in part as a function of the configuration of a spacer. The geometry of the spacer and of the opening or selected so that the blade core can reliably support the spacer during normal operation. The second body portion includes a semicircular portion 7416 and a straight walled portion 7418. The semicircular portion allows the second body portion to be reliably seated in an opening, and the straight walled portions can be used to limit pivoting of the spacer 7400, as a function of the geometry of the opening 7484 into which the spacer is positioned. The second body portion has a thickness approximately the same as a thickness of the blade core 7480/7482, taking into account tolerances and the like, and may have a thickness that accommodates easy positioning of the spacer in the opening 7484 in the blade core while still allowing the first body portion 7402 to maintain the desired spacing between the blade core 7480 and an adjacent blade core 7482 which the sides 7406 will contact when the blade cores are assembled to be adjacent each other.

In a configuration of the spacer 7400 having only a first body portion 7402 and a second body portion 7414 (not illustrated), or in the illustrated configuration, the spacer can be supported in a blade core, for example blade cores such as 7480/7482, by any number of means. For example, the spacer can be supported in the blade core in an opening with an interference fit or a close fit, by mechanical means including for example by rods if used (such as with an assembly with a blade shaft 302 described with respect to FIG. 3), welding, adhesive or other means for reliably holding the spacer in position. In the illustrated configuration, the spacer is supported on a blade core partly by a third body portion.

The spacer 7400 includes a third body portion 7420 extending along the axis 7403 away from the second body portion and away from the first body portion. The third body portion includes a wall that can help to position the spacer 7400 on the blade core, and also include a structure to serve as a spacer element between the blade core on which the spacer is supported and a next adjacent blade core (different from the next adjacent blade core closest to the first body portion). In the illustrated configuration, the first and third body portions are mirror images of each other about a plane bisecting the second body portion parallel to the blade core on which the spacer is supported and perpendicular to the axis 7403. The third body portion includes first and second sides 7422 and 7424, respectively (FIG. 74-75), and the surface on the side 7422 faces the oppositely-facing surface on the blade core in which the spacer is supported, and the surface on the side 7424 faces the oppositely-facing surface on the next adjacent blade core. In one configuration (not illustrated) the second side 7424 can be completely flat over the entire extent of the third body portion for contacting the surface of the adjacent blade core. Alternatively (also not shown), the second side 7424 can be other than flat so that the outer-most surfaces on the second side would be used to define the thickness of the third body portion and therefore the spacing between adjacent blade cores.

The first sides of the first and third body portions, and the perimeter surface of the second body portion form a channel 7426 (FIG. 74) extending about a majority of the perimeter of the second body portion. The channel is configured to receive the exposed wall of an opening in the blade core so that the spacer can be positioned in the opening and supported by the blade core, which support may be by either or all of contact with the channel bottom formed by the surface of the second body portion, or being sandwiched between the first walls 7404 and 7422 of the first and third body portions. Portions of the first and third body portions sandwich a portion of the blade core to help position the spacer laterally relative to the blade core. The spacing of the first walls of the first and third body portions can provide an interference fit, in which case the spacer can be reliably supported on the blade core during normal operation, especially with the centripetal forces developed during rotation of the blade core, for example if the second walls 7406 and 7424 of the first and third body portions are completely flat. The spacing of the first walls can also provide a close fit, making it easier to position the spacer in the opening, and the closeness of the fit will help to determine how easy it is to position the spacer and how easy it is to shift the spacer before a final assembly is complete. The spacing can also provide a clearance fit, in which case the spacer may be held in place by other means, such as a template, fixing structure or other temporary positioning device until assembly is complete, or more permanent means such as welding, adhesive, or the like. The form of the fit may apply equally over the entire length of the channel 7426, or the channel may have one fit configuration at one or several locations and other fit configurations at other locations of the channel, thereby providing some flexibility over the form of the fit between the spacer in the blade core.

In the illustrated example, the first and third body portions include converging walls 7428 and 7430 (FIGS. 75-76), respectively, at an approximate middle portion of the channel 7426 to assist in aligning the spacer with the blade core wall in the opening in which the spacer is to be positioned. The converging walls can extend along the walls of the groove or channel as far as desired.

The spacer 7400 (and therefore the first, second and third body portions) include a wall 7432 concentric with the axis 7403 extending through the spacer. The opening provides for lighter parts and may be used to accommodate blade shaft rods such as positioning rods 308 described with respect to FIG. 3 when the spacers 7400 are used on blade cores that would be assembled into a blade head on a blade shaft such as 302. The spacers can also be used with blade cores that would be assembled onto a blade head on a blade shaft such as that described with respect to FIG. 2, and indexing rods (not shown) or other structures can extend through the openings 7432 to help support the spacers and maintain their radial position. Alternatively, if the spacers 7400 are to be supported with positioning rods 308 or indexing rods or similar structures, the spacers 7400 can be configured to omit the second body portions 7414, 7434 and 7436, and include the first body portion 7402 and the third body portion 7420 as separate spacers on opposite sides of a blade core supported by rods 308 or indexing rods, as desired. In such a configuration, the first and third body portions would typically be identical spacers positioned on a rod or other structure to maintain the desired radial spacing from the main shaft. The inner circular portion for each body portion would form a ring segment, in the present example a complete circular ring segment, for extending around the rod or other structure. The outer lobed portions 7412 form branches that branch out from the opening 7432 to provide additional support for spacing and withstand compression from the pressure plates. Each outer lobed portion in the illustrated example is an integrated structure, but the structure can be formed as multiple discrete structures, branches extending outwardly, or the like. The outer perimeter of each lobed portion extends approximately arcuately. Other configurations for the outer lobed portions are possible.

The spacer 7400 may also include, as illustrated, additional or auxiliary second body portions 7434 and 7436 on either or both of the first and third body portions 7402 and 7420, respectively. The additional, secondary or auxiliary second body portions 7434 and 7436 have structures and functions identical to the additional, secondary or auxiliary second body portions 4312 and 4314 described with respect to FIG. 43A, and they engage corresponding openings in adjacent laid cores substantially as described with respect to the spacer 4300. The additional or secondary second body portions 7534 and 7536 are formed as bosses or projections extending outwardly from the respective body portions, and form a shoulder or perimeter wall extending in a circle. Alternatively, the secondary second body portion may be formed in segments, bumps, dimples, tabs or other structures forming an equivalent or analogous structure to a shoulder or perimeter wall, for example intermittent or segmented. The secondary second body portion is configured to engage an opening in an adjacent blade core having a geometry substantially matching that of the secondary second body portion. Engagement in such an opening in an adjacent blade core can be by interference fit, close fit or clearance fit, providing a desired amount of support between the two structures.

The outermost surface of each secondary second body portion includes a substantially flat surface, and the height of the secondary second body portion from the adjacent first/third body portion can be equal to or less than a thickness of the blade core into which the secondary second body portion extends. In the illustrated configuration, the height of the secondary second body portion is approximately one half or less than one half the thickness of the adjacent blade core, so that respective secondary second body portions on opposite sides of the adjacent blade core can extend into the opening with the desired contact between the secondary second body portions or without any contact, as desired.

The spacer 7400 can also include a flow device 7700 (FIG. 77), if desired. The flow device can take a number of configurations, but in the illustrated configuration includes a support structure 7702 for mounting on the spacer 7400. The flow device can be mounted in other configurations, for example on other spacers having different configurations, in which case the support structure may have a different geometry. In the illustrated configuration, the support structure includes an opening 7704 complementary to the outer profile of the spacer 7400. The thickness of the support structure, and the spacer overall, may be approximately equal to the thickness of a first or third body portion on which the flow device may be supported, namely approximately the thickness of a spacing between adjacent blade cores, or can be less than the thickness. The flow device also includes a flow structure 7706 having a structure and function substantially the same as the flow structure 4708 described with respect to FIGS. 44-51. The positioning of the flow device will also be similar to that described with respect to the flow structure 4708.

Each spacer 7400 is substantially solid except for the channel 7426 and the through opening 7432, and the first, second, third and secondary second body portions are formed monolithic and otherwise solid, but can be otherwise. Each spacer 7400 can be formed from multiple parts, or each spacer 7400 and a flow device such as flow device 7700 can be formed monolithic.

Figure 73:
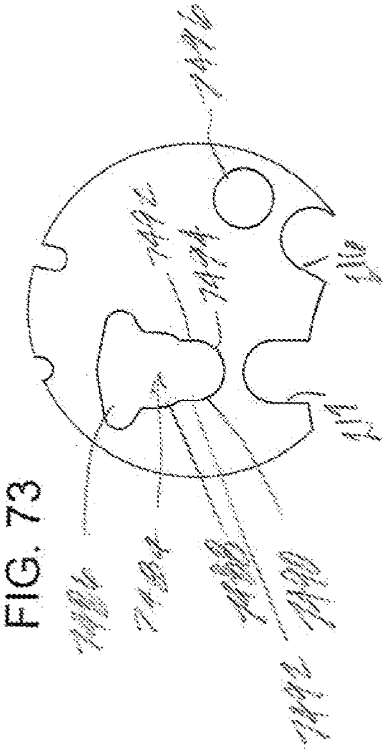
FIG. 73 is a detail view of one of the blade cores illustrated in FIG. 71.
Figure 74:
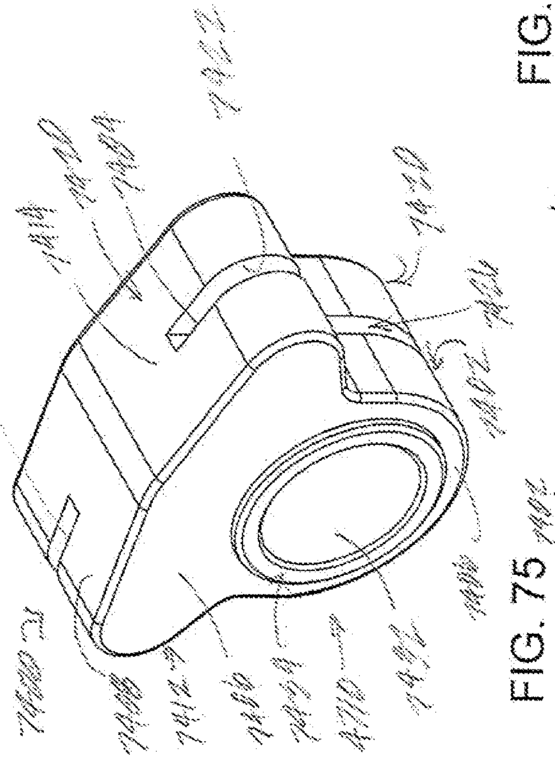
FIG. 74 is an upper isometric view of a spacer in the assembly of FIG. 71.
Figure 75:
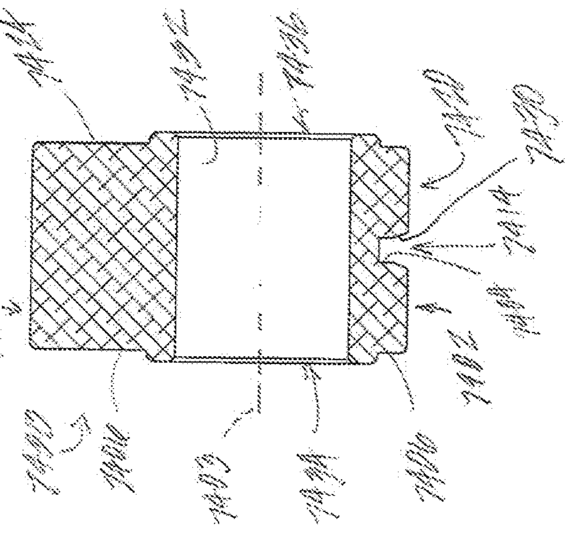
FIG. 75 is a longitudinal cross-section of the spacer of FIG. 74.
Figure 76:
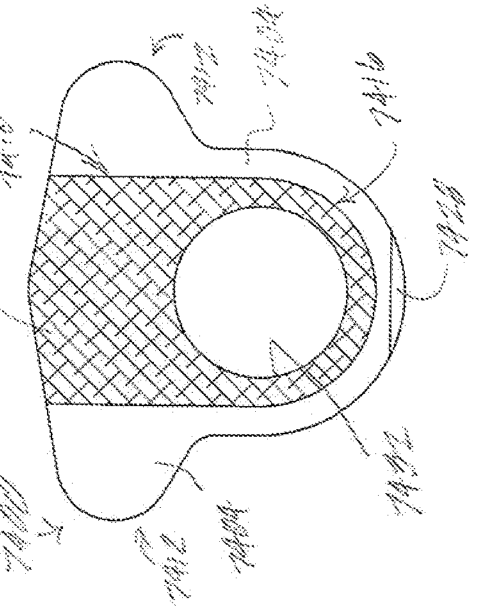
FIG. 76 is a transverse cross-section of the spacer of FIG. 74.
Figure 77:
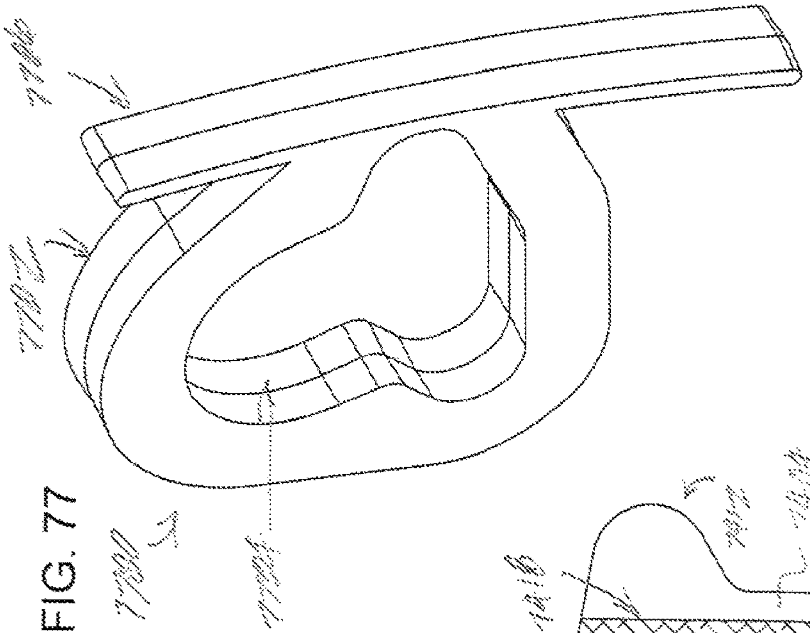
FIG. 77 is a lower isometric view of a flow direction device for use with the assembly of FIG. 71.

Another example of a blade core for a grinding or grooving machine having one or more openings illustrated in FIGS. 71-73 includes a blade shaft opening 402 and a perimeter 404 with registration key slots 216 and 217. The blade core has an arbor opening of at least 3 inches up to about 12 inches or more for being supported on the blade shaft for grinding or grooving. The blade core includes a noncircular opening, and in the present example a plurality of noncircular openings 7484 for receiving and supporting respective spacers 7400. In the example illustrated, there are six identical noncircular openings 7484, and only one will be described. The noncircular openings 7484 include a first somewhat elliptical portion 7486 closer to the perimeter 404 than the remainder of the opening 7484. The elliptical portion joins a intermediate converging wall portion 7488 in an intermediate portion of the opening 7484, which in turn converges to an end portion 7490 having straight walls 7492 ending at a semicircular wall 7494. As illustrated, the geometry of the opening 7484 allows the spacer to fit into the elliptical and intermediate portions laterally or sideways relative to the blade, and then allow the spacer to be moved radially inward so that the second body portion can contact and engage the straight walls and the semicircular wall of the opening. The size of the spacer relative to the size of the opening allows either the first or third body portions to enter and pass through the opening 7484 from one side of the blade core to the other side. The geometric profiles can be different while the size of the spacer can be selected so as to permit the desired movement of the spacer in a respective opening in the blade core.

The openings 7484 are distributed uniformly about the blade core, and the portion 7490 of the opening can be selected so as to be positioned approximately on the annulus defined by the fasteners applying pressure to the pressure plate. More or fewer than six openings can be used as desired. In the illustrated configuration, the blade core also includes circular openings 7496 (FIGS. 71-73). The openings 7496 can be distributed substantially uniformly about uniformly about the blade core, or otherwise, but in the illustrated configuration, the openings 7496 are configured to receive one or both of secondary second body portions on spacers supported by adjacent blade cores. In another configuration (not shown), the openings and the secondary second body portions that extend into such openings may have a different configuration than circular, including for example a profile more similar to the profile of the first and third body portions on the spacer 7400.

In a further example of a blade core and spacer assembly, blade cores 7480 and 7482 can include the desired number of spacers 7400, and multiple such blade core and spacer assemblies can be combined adjacent each other to form a blade head on a blade shaft, such as either of those described with respect to FIG. 2-3. Adjacent blade cores are assembled with a first blade core pivoted 30° relative and immediately adjacent blade core so that the secondary second body portions on the immediately adjacent blade core can extend into the circular openings 7496 of the subject blade core. When the desired number of blade core and spacer assemblies are positioned on the blade shaft, and the secondary second body portions of each spacer extend into respective circular openings in the immediately adjacent blade cores on each side, the assembly as well supported arcuately and axially, and positioning of the adapter plates 7004 sandwich the blade core and spacer assemblies together. Application of a pressure plate applies a compressive load to the assembly, substantially locking all of the components together in a blade head.

The assembly can also include flow devices such as flow devices 7700 positioned on all or fewer than all of the spacers 7400. The flow surfaces would generally be directed in the same way relative to a radius of the blade core, but they can be directed otherwise to produce the desired flow configuration. Fluid flow, for example air or liquid flow, can be directed at least partly radially outward, and flow may also be assisted by the outer portions 7486 of the openings 7484.

In a further example of a spacer that can be used with blade cores, including on a blade head, a spacer 7800 (FIGS. 78-79) is configured to be supported radially by a rod or other structure, for example a rod 308 in a blade head 300 or other structure in a blade head. The rod or other structure will support the spacer at a desired radial distance from the main blade shaft 302. The spacer is configured to contact a portion of a blade core face on one side 7802 and contact a portion of another blade core face on a second side 7804, and the thickness of the spacer 7800 is chosen to define the desired spacing between adjacent blade cores, for example a first and second blade core. In the present example, the thickness of the spacer 7800 is substantially the same over the entire spacer structure.

In the illustrated example, the spacer 7800 is a monolithic structure having substructures wherein each substructure includes multiple components, and all of the substructures are formed together as a monolithic structure extending generally in a circle. In the present example, the substructures are substantially identical, but they can be different from each other or different from at least one other substructure, according to the desired configuration. The spacer 7800 can be formed in a number of ways, including cut from a plate or other solid material, or formed and assembled from individual substructures. In the present example, the spacer 7800 is an extruded structure and cut and finished to the desired thickness for the desired spacing between adjacent blade cores. The spacer can be formed from any of a number of materials, and in the present example extruded aluminum, but may also be formed from engineered plastics, including thermosets and thermoplastic materials. The spacer web elements are substantially solid and formed by the web elements described herein.

As with a number of the foregoing spacers, including several of the configurations of the spacers 4300 and 7400 described herein, the spacers can be connected with webbing or other structures to form the spacers into a connected structure, for example at least two adjacent spacers or more spacers can be connected to each other so that they can be used to be positioned between a pair of spaced apart blade cores. In the illustrated example of spacer 7800, the spacer is formed from a plurality of substructures 7806, and in the present example the substructures are all identical and repeated next to each other forming a circular spacer 7800, but the substructures can be other than identical. As an extrusion, the substructures can be easily identical or different. In the following description, only one substructure 7806 will be described, for the present spacer 7800, which has eight substructures, but reference numbers may be included in web elements of other substructures illustrated for purposes of clarity in the illustration. The number of substructures in the spacer can be selected as desired. Eight substructures can accommodate a blade head having 4 rods and a blade head having 8 rods. In the present example where the substructures are substantially identical, the transition from one substructure to an adjacent substructure can be selected as desired, but in the present description, the substructure will be centered on the structure being supported by a rod or other support structure as defined by imaginary radial cuts 7808 and 7810 centered on a center 7812, coincident with a central axis of a main blade shaft of the blade head.

In the spacer 7800, the substructure 7806 (and each of the other substructures in the illustrated configuration) includes a first body portion 7814 to serve as a spacer element between adjacent blade cores. The first body portion extends in the direction of the axis at the center 7812 to define a thickness between oppositely facing surfaces 7802 and 7804, each of which define respective planes containing the oppositely-facing surfaces. The thickness defines the maximum spacing between adjacent blade cores.

The spacer 7800 includes at least one ring segment 7816. In the present example, the ring segment forms a complete circle having an inner circumference defining an inner surface 7818, but in other configurations the ring segment can form a semi circle or a partial circle. The inner surface 7818 can be smooth and substantially conform to an outer surface of a rod 308 with a diameter greater than or equal to an outer diameter of the rod, but alternatively the inner surface can be other than smooth so that inward projecting surfaces can contact an outer surface of the rod while intermediate surfaces between the inward projecting surfaces are spaced apart from the rod surface. The ring segment is configured to be supported at least in part by a rod 308 in the blade head assembly. The ring segment includes an outer surface 7820 that in the present example is also substantially circular except for the outwardly extending web components described herein, but the outer surface may be other than circular. If the ring segment is only a partial circle, one or more openings in the ring segment can be formed anywhere around the perimeter of the ring segment, but an opening is preferably made on the portion of the ring segment facing at least partly inward toward the center 7812 to minimize exposure to the opening of dust and debris.

The spacer 7800 includes at least one and in the present example a plurality of lobes or branches extending away from the ring segment. One or more lobes or branches can extend inwardly toward the center 7812 or outwardly away from the center. In the present example, the spacer includes a first branch 7822 extending radially inward from a center of the ring segment, and a second branch 7824 extending radially outward from a center of the ring segment. In one configuration, the first and second branches extend approximately at least an annular distance to coincide with an envelope formed by and between the first and second pressure plates 310 and 312. In the illustrated example, the first branch 7822 extends inwardly while leaving a gap so as to be spaced apart from the outer surface of any main blade shaft on which the blades are to be mounted and supported. The first and second branches and any structures attached to them provide extended structures for providing the spacing function and for receiving compressive loading.

The first branch in the present configuration includes at least one arm and in the present example two arms 7826 and 7828 extending away from the first branch. In the present example, the first and second arms extend away from an end of the first branch, but the first branch can extend further radially inward if desired, and may include one or more additional arms or other structures. In the illustrated configuration, the first and second arms extend arcuately in opposite directions from the first arm 7822. They have a curvature similar to or the same as a curvature of the ring segment 7816, and a radius of curvature less than a radius of curvature of a blade with which the spacer is to be used, but they may be curved otherwise or may be straight. The first and second arms may be configured to be within an envelope of the first and second pressure plates 310 and 312.

The second branch in the present configuration includes at least one arm and in the present example first and second arms 7830 and 7832 extending away from the second branch. In the present example, the first and second arms extend away from an end of the second branch, but the second branch can extend further radially outward if desired, and may include one or more additional arms or other structures. In the illustrated configuration, the first and second arms 7830 and 7832 extend arcuately in opposite directions from the second arm, and they have a curvature forming an arc of a circle defined by a radius from the center 7812 to the first and second arms 7830 and 7832. They may take another curvature or may be straight or follow another profile as desired. The first and second arms 7830 and 7832 may be configured to be within an envelope of the first and second pressure plates 310 and 312. In the present example, the first and second arms 7830 and 7832 extend over an arc defined by almost ⅛ of a circle containing the first and second arms centered on the center 7812, but they may extend more or less than the relative distance illustrated.

The spacer 7800 includes in the present example additional lobes or branches extending away from the ring segment 7816, for example a third branch 7834 extending laterally of the ring segment, and also in the present example a fourth branch 7836 extending laterally of the ring segment in a direction opposite the third branch. The third and fourth branches extend arcuately from the ring segment and not only provide spacing and compression functions, but also are used to connect respective adjacent spacers or substructures. The third and fourth branches have radii of curvature to extend arcuately along a circle centered on the center 7812 on a radius at which the third and fourth branches are positioned, and corresponding approximately to a radius between the center 7812 and a center 7838 of the ring segment 7816. The third and fourth branches extend to and connect with respective fourth and third branches in respective adjacent spacers or substructures. If a ring segment is less than a complete circle, any opening formed in the ring segment is preferably interior to the third and fourth branches 3834 and 3836, to minimize injury inside the ring segment of dust, moisture or debris.

Each of the third and fourth branches includes respective radial arms 7840 and 7842, respectively, in the present example extending on respective radii from the center 7812. Each radial arm includes a portion extending radially outward from its branch and a portion extending radially inward from its branch.

A given spacer can be defined by a single substructure such as substructure 7806, but in the example illustrated, the spacer 78 includes a plurality of substructures, each connected to respective ones of a pair of adjacent substructures. The spacer in the example illustrated may include anywhere from one, two, three, etc., up to eight substructures, in any desired combination. For example, a spacer assembly can be formed from four pairs of two substructures, two pairs of four substructures, or two pairs of three substructures and one pair of two substructures, etc. Separate substructures can be made separately and attached together, may be overlapping, or may have a gap between separate but adjacent substructures.

With spacers 7800, a cutting head may be assembled with a main shaft, for example the main shaft 302 (FIG. 3) and a plurality of blades 304 supported on the main shaft and positioned using the rods 308 extending parallel to the main shaft. The rods extend into respective openings in the blades, and spacer elements 7800 are positioned between adjacent blades so that the rods extend through the openings of respective ring segments 7816. Where the cutting head includes 4 rods, the rods will extend through the openings in alternating ring segments in the spacer 7800, and where the cutting head includes 8 rods, a rod will extend through each of a respective ring segment. In one configuration, the spacer will include lobes, branches and/or arms extending away from a respective ring segment while still falling at least partly within an envelope defined by the pressure plates 310 and 312, specifically within an annulus defined by the outside diameter of the main shaft and the outside diameter of pressure plates 310 and 312.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A method of assembling a working blade with a spacer so that the spacer will help to maintain a selected distance between the working blade and a second blade, wherein the working blade includes a center opening for receiving a support shaft for supporting the working blade and also includes a wall defining a spacer opening in a body of the working blade between the center opening and a perimeter of the working blade, wherein the spacer includes first and second body portions wherein the first body portion has first and second surfaces defining a thickness that is approximately equal to the selected distance to help maintain the selected distance between the working blade and the second blade, wherein the second body portion is configured to extend into the spacer opening in the body of the working blade, the method comprising positioning the second body portion in the spacer opening in the body of the working blade in such a way that the first surface on the first body portion is positioned adjacent a surface of the working blade adjacent and radially outside the spacer opening in the body.

2. The method of claim 1 wherein the spacer opening in the body of the working blade is circular and including positioning the second body portion in the circular spacer opening of the body of the working blade.

3. The method of claim 1 including positioning the second body portion in the spacer opening of the body of the working blade with one of a close fit and an interference fit.

4. The method of claim 1 wherein the working blade includes a working element formed from a working material, and including selecting the spacer formed from a material other than the working material and positioning a portion of the spacer in the spacer opening of the body of the working blade.

5. The method of claim 1 further including positioning the working blade on the support shaft.

6. The method of claim 5 wherein positioning the working blade on the support shaft includes positioning the working blade on the support shaft wherein the support shaft has a diameter greater than 3 inches.

7. The method of claim 1 wherein the first and second body portions are substantially circular and including positioning the second body portion in the spacer opening of the body of the working blade.

8. The method of claim 1 wherein the wall defining the spacer opening in the body of the working blade does not intersect the center opening and is spaced apart from the center opening and from the perimeter, including positioning the second body portion in the spacer opening in the body of the working blade spaced apart from the center opening and the perimeter.

9. The method of claim 1 further including positioning a plurality of spacers, each spacer having a first and second body portion, in respective spacer openings in the body of the working blade.

10. The method of claim 9 further including positioning the second blade against the first body portion of each of the spacers.

11. A method of assembling a working blade with a spacer so that the spacer will help to maintain a selected distance between the working blade and a second blade, wherein the working blade includes a center opening for receiving a support shaft for supporting the working blade and also includes a wall defining a spacer opening in a body of the working blade between the center opening and a perimeter of the working blade, wherein the spacer includes first and second body portions wherein the first body portion has first and second surfaces defining a thickness that is approximately equal to the selected distance to help maintain the selected distance between the working blade and the second blade, wherein the second body portion is configured to extend into the spacer opening in the body of the working blade, the method comprising positioning the second body portion in the spacer opening in the body of the working blade in such a way that the first surface on the first body portion is positioned adjacent a surface of the working blade adjacent the spacer opening in the body, and wherein the spacer opening in the body of the working blade is noncircular and including positioning the second body portion in the noncircular spacer opening of the body of the working blade with one of a close fit and an interference fit.

12. A method of assembling a working blade with a spacer so that the spacer will help to maintain a selected distance between the working blade and a second blade, wherein the working blade includes a center opening for receiving a support shaft for supporting the working blade and also includes a wall defining a spacer opening in a body of the working blade between the center opening and a perimeter of the working blade, wherein the spacer includes first and second body portions wherein the first body portion has first and second surfaces defining a thickness that is approximately equal to the selected distance to help maintain the selected distance between the working blade and the second blade, wherein the second body portion is configured to extend into the spacer opening in the body of the working blade, the method comprising positioning the second body portion in the spacer opening in the body of the working blade in such a way that the first surface on the first body portion is positioned adjacent a surface of the working blade adjacent the spacer opening in the body, and wherein the spacer includes a third body portion and further including positioning an opening of the second blade and the third body portion together.

13. The method of claim 12 wherein the opening of the second blade is substantially circular and positioning the third body portion in the second blade opening with one of a close fit and interference fit.

14. The method of claim 13 wherein the second and third body portions include respective thicknesses and further including positioning the second body portion substantially completely in the spacer opening in the body of the working blade and positioning the third body portion substantially completely in the opening of the second blade.

15. A method of assembling a working blade with a spacer so that the spacer will help to maintain a selected distance between the working blade and a second blade, wherein the working blade includes a center opening for receiving a support shaft for supporting the working blade and also includes a wall defining a spacer opening in a body of the working blade between the center opening and a perimeter of the working blade, wherein the spacer includes first and second body portions wherein the first body portion has first and second surfaces defining a thickness that is approximately equal to the selected distance to help maintain the selected distance between the working blade and the second blade, wherein the second body portion is configured to extend into the spacer opening in the body of the working blade, the method comprising positioning the second body portion in the spacer opening in the body of the working blade in such a way that the first surface on the first body portion is positioned adjacent a surface of the working blade adjacent the spacer opening in the body, and wherein the spacer includes a wall defining an opening through the spacer, and further including positioning the working blade and spacer such that a rod extends through the spacer opening.

16. A method of spacing apart first and second working blades having respective center openings for being supported on a support shaft and respective working perimeter portions for working on work materials, the method comprising having a spacer having first and second body portions extending axially relative to the shaft wherein the first body portion extends a distance transverse to the axis greater than the second body portion, placing the spacer adjacent the first working blade such that the first body portion is adjacent a facing surface of the first working blade and at least a portion of the second body portion extends adjacent a wall defining a spacer opening in the first working blade so that the portion of the second body portion extends into the spacer opening, and placing a surface on the second working blade against a surface on the first body portion.

17. A method of spacing apart first and second working blades having respective center openings for being supported on a support shaft and respective working perimeter portions for working on work materials, the method comprising placing a spacer having first and second body portions adjacent the first working blade such that the first body portion is adjacent a facing surface of the first working blade and a portion of second body portion extends adjacent a wall defining a spacer opening in the first working blade so that at least a portion of the second body portion extends into the spacer opening, and placing a surface on the second working blade against a surface on the first body portion, and wherein the spacer includes a third body portion and placing the second working blade and the spacer such that the third body portion extends at least partly into a spacer opening in the second working blade.

18. The method of claim 17 further including placing a plurality of spacers each having first and second body portions against respective portions of the first working blade such that respective second body portions extend into respective spacer openings in the first working blade, and placing the surface on the second working blade against respective surfaces on respective ones of the first body portions.

19. The method of claim 18 wherein the respective spacer openings in the first working blade are positioned outboard of the center opening and inboard of the working perimeter portion and wherein the plurality of spacers are a first plurality of spacers and are placed against the facing surface of the first working blade and a second plurality of spacers are placed against a second surface of the first working blade facing in a direction opposite the facing surface of the first working blade.

20. An assembly of spaced apart first and second working blades having respective center openings for being supported on a support shaft and respective perimeter portions for working on a work material, the assembly comprising a plurality of spacers wherein each spacer includes first and second body portions and wherein the plurality of spacers are placed adjacent the first working blade such that respective first body portions are placed in contact with adjacent respective facing surfaces of the first working blade, and portions of respective second body portions extend at least partly into corresponding spacer openings in the first working blade, and wherein the second working blade is adjacent the first working blade with at least one of the spacers contacting both the first and second working blades.

21. A method of assembling a working blade with a spacer so that the spacer will help to maintain a selected distance between the working blade and a second blade, wherein the working blade includes a center opening for receiving a support shaft for supporting the working blade and also includes a wall defining a rod opening in a body of the working blade between the center opening and a perimeter of the working blade, wherein the spacer includes a first body portion wherein the first body portion has first and second surfaces defining a thickness that is approximately equal to the selected distance to help maintain the selected distance between the working blade and the second blade, and wherein the spacer includes a wall defining a spacer opening through the spacer and further including positioning the working blade and spacer such that a rod extends through the spacer opening and the rod opening and wherein the spacer includes a perimeter that is contained within a space between the center opening and the perimeter of the working blade.

* * * * *